US012611595B2

(12) United States Patent (10) Patent No.: US 12,611,595 B2
Aman et al. (45) Date of Patent: Apr. 28, 2026

(54) DESTINATION INTERACTIVE GAMING SYSTEM FOR DIRECTING GUESTS TO GAME ACCESS POINTS

(71) Applicants: James Andrew Aman, Celebration, FL (US); Jeffrey Paul Cheesman, Hamburg, NJ (US)

(72) Inventors: James Andrew Aman, Celebration, FL (US); Jeffrey Paul Cheesman, Hamburg, NJ (US)

( * ) Notice: Subject to any disclaimer, the term of this patent is extended or adjusted under 35 U.S.C. 154(b) by 51 days.

(21) Appl. No.: 18/829,443

(22) Filed: Sep. 10, 2024

(65) Prior Publication Data

US 2025/0025774 A1 Jan. 23, 2025

Related U.S. Application Data

(60) Division of application No. 18/297,090, filed on Apr. 7, 2023, now Pat. No. 12,115,444, and a
(Continued)

(51) Int. Cl.
| | |
|---|---|
| *A63F 13/25* | (2014.01) |
| *A63F 13/213* | (2014.01) |
| *A63F 13/216* | (2014.01) |
| *A63F 13/218* | (2014.01) |
| *A63F 13/30* | (2014.01) |
(Continued)

(52) U.S. Cl.
CPC ............ *A63F 13/25* (2014.09); *A63F 13/213* (2014.09); *A63F 13/216* (2014.09); *A63F 13/218* (2014.09); *A63F 13/30* (2014.09); *A63F 13/50* (2014.09); *A63F 13/79* (2014.09);

*A63G 31/00* (2013.01); *A63G 31/16* (2013.01); *A63G 33/00* (2013.01); *G08C 17/02* (2013.01)

(58) Field of Classification Search
CPC ...... A63F 13/25; A63F 13/213; A63F 13/216; A63F 13/218; A63F 13/30; A63F 13/50; A63F 13/79; A63F 13/00; A63G 31/00; A63G 31/16; A63G 33/00; G08C 17/02
USPC ................................................ 463/31, 30, 1
See application file for complete search history.

(56) References Cited

U.S. PATENT DOCUMENTS 6,608,563 B2 8/2003 Wetson et al.
6,682,074 B2 1/2004 Wetson et al.
(Continued)

FOREIGN PATENT DOCUMENTS

CA 2928599 A1 * 8/2008 ......... G07F 17/3237

*Primary Examiner* — Edwyn Labaze

(57) ABSTRACT

An interactive gaming system comprising a multiplicity of game access points used by guests to engage with an on-going destination game. Game access points comprise traditional destination activities as well as additional game parts. Gaming guests carry one or more electronic means and are tracked throughout the destination locations and activities. At least one electronic means comprises a visual display for receiving requested directions or a system summons to a game access point. The electronic means comprises a direct view lens system such that the guest looks directly through the electronic means to a destination map or destination scene, where directions are overlaid onto the direct view and registered to the map or scene. The mobile device further comprises a front view camera for capturing images of the guest's direct view of a destination game part, where the image is used as actionable game information.

20 Claims, 18 Drawing Sheets

Related U.S. Application Data continuation-in-part of application No. 16/055,078, filed on Aug. 4, 2018, now Pat. No. 10,861,267, and a continuation-in-part of application No. 16/027,301, filed on Jul. 4, 2018, now Pat. No. 10,688,378, and a continuation-in-part of application No. 15/975,236, filed on May 9, 2018, now Pat. No. 10,719,134.

(60) Provisional application No. 62/564,306, filed on Sep. 28, 2017.

(51) Int. Cl.

| | |
|---|---|
| A63F 13/50 | (2014.01) |
| A63F 13/79 | (2014.01) |
| A63G 31/00 | (2006.01) |
| A63G 31/16 | (2006.01) |
| A63G 33/00 | (2006.01) |
| G08C 17/02 | (2006.01) |

(56) References Cited

U.S. PATENT DOCUMENTS

| | | | |
|---|---|---|---|
| 6,761,637 B2 | 7/2004 | Wetson et al. |
| 6,796,908 B2 | 9/2004 | Wetson et al. |
| 6,967,566 B2 | 11/2005 | Wetson et al. |
| 7,066,781 B2 | 6/2006 | Wetson et al. |
| 7,445,550 B2 | 11/2008 | Wetson et al. |
| 7,488,231 B2 | 2/2009 | Wetson et al. |
| 7,500,917 B2 | 3/2009 | Wetson et al. |
| 7,524,246 B2 | 4/2009 | Wetson et al. |
| 7,614,958 B2 | 11/2009 | Wetson et al. |
| 7,674,184 B2 | 3/2010 | Wetson et al. |
| 7,850,527 B2 | 12/2010 | Wetson et al. |
| 7,878,905 B2 | 2/2011 | Wetson et al. |
| 7,896,742 B2 | 3/2011 | Wetson et al. |
| 8,089,458 B2 | 1/2012 | Wetson et al. |
| 8,164,567 B1 | 4/2012 | Wetson et al. |
| 8,169,406 B2 | 5/2012 | Wetson et al. |
| 8,184,097 B1 | 5/2012 | Wetson et al. |
| 8,226,493 B2 | 7/2012 | Wetson et al. |
| 8,248,367 B1 | 8/2012 | Wetson et al. |
| 8,330,284 B2 | 12/2012 | Wetson et al. |
| 8,368,648 B2 | 2/2013 | Wetson et al. |
| 8,373,659 B2 | 2/2013 | Wetson et al. |
| 8,384,668 B2 | 2/2013 | Wetson et al. |
| 8,475,275 B2 | 7/2013 | Wetson et al. |
| 8,491,389 B2 | 7/2013 | Wetson et al. |
| 8,608,535 B2 | 12/2013 | Wetson et al. |
| 8,686,579 B2 | 4/2014 | Wetson et al. |
| 8,702,515 B2 | 4/2014 | Wetson et al. |
| 8,708,821 B2 | 4/2014 | Wetson et al. |
| 8,711,094 B2 | 4/2014 | Wetson et al. |
| 8,753,165 B2 | 6/2014 | Wetson et al. |
| 8,758,136 B2 | 6/2014 | Wetson et al. |
| 8,790,180 B2 | 7/2014 | Wetson et al. |
| 8,814,688 B2 | 8/2014 | Wetson et al. |
| 8,817,043 B2 | 8/2014 | Nemeth et al. |
| 8,827,810 B2 | 9/2014 | Wetson et al. |
| 8,888,576 B2 | 11/2014 | Wetson et al. |
| 8,913,011 B2 | 12/2014 | Wetson et al. |
| 8,915,785 B2 | 12/2014 | Wetson et al. |
| 8,961,260 B2 | 2/2015 | Wetson et al. |
| 8,961,312 B2 | 2/2015 | Wetson et al. |
| 9,039,533 B2 | 5/2015 | Wetson et al. |
| 9,149,717 B2 | 10/2015 | Wetson et al. |
| 9,162,148 B2 | 10/2015 | Barney et al. |
| 9,162,149 B2 | 10/2015 | Wetson et al. |
| 9,186,585 B2 | 11/2015 | Wetson et al. |
| 9,272,206 B2 | 3/2016 | Wetson et al. |
| 9,320,976 B2 | 4/2016 | Wetson et al. |
| 9,387,408 B2 | 7/2016 | Wetson et al. |
| 9,393,491 B2 | 7/2016 | Wetson et al. |
| 9,393,500 B2 | 7/2016 | Wetson et al. |
| 9,463,380 B2 | 10/2016 | Wetson et al. |
| 9,468,854 B2 | 10/2016 | Wetson et al. |
| 9,474,962 B2 | 10/2016 | Wetson et al. |
| 9,480,929 B2 | 11/2016 | Wetson et al. |
| 9,579,568 B2 | 2/2017 | Wetson et al. |
| 9,592,454 B2 | 3/2017 | Wetson et al. |
| 9,616,334 B2 | 4/2017 | Wetson et al. |
| 9,675,878 B2 | 6/2017 | Wetson et al. |
| 9,707,478 B2 | 7/2017 | Wetson et al. |
| 9,713,766 B2 | 7/2017 | Wetson et al. |
| 9,731,194 B2 | 8/2017 | Wetson et al. |
| 9,737,797 B2 | 8/2017 | Wetson et al. |
| 9,764,245 B2 | 9/2017 | Wetson et al. |
| 9,770,652 B2 | 9/2017 | Wetson et al. |
| 9,814,973 B2 | 11/2017 | Wetson et al. |
| 9,861,887 B1 | 1/2018 | Wetson et al. |
| 9,888,090 B2 | 2/2018 | Poisner et al. |
| 9,931,578 B2 | 4/2018 | Wetson et al. |
| 10,010,790 B2 | 7/2018 | Wetson et al. |
| 10,022,624 B2 | 7/2018 | Wetson et al. |
| 10,134,267 B2 | 11/2018 | Kwash et al. |
| 10,179,283 B2 | 1/2019 | Wetson et al. |
| 10,188,953 B2 | 1/2019 | Wetson et al. |
| 2001/0034257 A1 | 10/2001 | Wetson et al. |
| 2002/0008622 A1 | 1/2002 | Wetson et al. |
| 2002/0193047 A1 | 12/2002 | Weston et al. |
| 2003/0106455 A1 | 6/2003 | Wetson et al. |
| 2003/0107178 A1 | 6/2003 | Wetson et al. |
| 2004/0033833 A1 | 2/2004 | Wetson et al. |
| 2004/0077423 A1 | 4/2004 | Wetson et al. |
| 2004/0092311 A1 | 5/2004 | Wetson et al. |
| 2007/0066396 A1 | 3/2007 | Wetson et al. |
| 2008/0183678 A1 | 7/2008 | Wetson et al. |
| 2009/0051653 A1 | 2/2009 | Wetson et al. |
| 2009/0124165 A1 | 5/2009 | Wetson et al. |
| 2009/0156309 A1 | 6/2009 | Wetson et al. |
| 2010/0056285 A1 | 3/2010 | Wetson et al. |
| 2010/0203932 A1 | 8/2010 | Wetson et al. |
| 2011/0081970 A1 | 4/2011 | Wetson et al. |
| 2011/0263330 A1 | 10/2011 | Wetson et al. |
| 2011/0300941 A1 | 12/2011 | Wetson et al. |
| 2012/0004031 A1 | 1/2012 | Wetson et al. |
| 2012/0034980 A1 | 2/2012 | Wetson et al. |
| 2012/0094759 A1 | 4/2012 | Wetson et al. |
| 2012/0122575 A1 | 5/2012 | Wetson et al. |
| 2012/0190452 A1 | 7/2012 | Wetson et al. |
| 2012/0208638 A1 | 8/2012 | Wetson et al. |
| 2012/0258802 A1 | 10/2012 | Wetson et al. |
| 2012/0270657 A1 | 10/2012 | Wetson et al. |
| 2012/0295710 A1 | 11/2012 | Wetson et al. |
| 2012/0309528 A1 | 12/2012 | Wetson et al. |
| 2013/0303276 A1 | 11/2013 | Wetson et al. |
| 2014/0194206 A1 | 7/2014 | Wetson et al. |
| 2014/0235341 A1 | 8/2014 | Wetson et al. |
| 2014/0295731 A1 | 10/2014 | Wetson et al. |
| 2014/0302933 A1 | 10/2014 | Wetson et al. |
| 2014/0329601 A1 | 11/2014 | Wetson et al. |
| 2014/0342831 A1 | 11/2014 | Wetson et al. |
| 2014/0357373 A1 | 12/2014 | Wetson et al. |
| 2014/0378233 A1 | 12/2014 | Wetson et al. |
| 2015/0050971 A1 | 2/2015 | Wetson et al. |
| 2015/0094140 A1 | 4/2015 | Wetson et al. |
| 2015/0099585 A1 | 4/2015 | Wetson et al. |
| 2015/0133229 A1 | 5/2015 | Wetson et al. |
| 2015/0141163 A1 | 5/2015 | Wetson et al. |
| 2015/0165316 A1 | 6/2015 | Wetson et al. |
| 2015/0251100 A1 | 9/2015 | Wetson et al. |
| 2015/0328556 A1 | 11/2015 | Wetson et al. |
| 2015/0360125 A1 | 12/2015 | Wetson et al. |
| 2016/0030836 A1 | 2/2016 | Wetson et al. |
| 2016/0136529 A1 | 5/2016 | Wetson et al. |
| 2016/0144273 A1 | 5/2016 | Wetson et al. |
| 2016/0158654 A1 | 6/2016 | Wetson et al. |
| 2016/0184701 A1 | 6/2016 | Wetson et al. |
| 2016/0199747 A1 | 7/2016 | Wetson et al. |
| 2017/0014714 A1 | 1/2017 | Wetson et al. |
| 2017/0036105 A1 | 2/2017 | Wetson et al. |
| 2017/0113128 A1 | 4/2017 | Wetson et al. |
| 2017/0113133 A1 | 4/2017 | Wetson et al. |
| 2017/0113134 A1 | 4/2017 | Wetson et al. |

(56) References Cited

U.S. PATENT DOCUMENTS

| | | | |
|---|---|---|---|
| 2017/0113152 | A1 | 4/2017 | Wetson et al. |
| 2017/0169449 | A1 | 6/2017 | Wetson et al. |
| 2017/0182408 | A1 | 6/2017 | Wetson et al. |
| 2017/0340961 | A1 | 11/2017 | Wetson et al. |
| 2017/0348593 | A1 | 12/2017 | Wetson et al. |
| 2017/0361218 | A1 | 12/2017 | Wetson et al. |
| 2017/0361236 | A1 | 12/2017 | Wetson et al. |
| 2018/0015364 | A1 | 1/2018 | Wetson et al. |
| 2018/0078853 | A1 | 3/2018 | Wetson et al. |
| 2018/0214769 | A1 | 8/2018 | Wetson et al. |
| 2018/0318723 | A1 | 11/2018 | Wetson et al. |
| 2018/0339226 | A1 | 11/2018 | Wetson et al. |
| 2018/0348862 | A1 | 12/2018 | Wetson et al. |

* cited by examiner

Fig. 2 (RELATED CO-PENDING APPLICATIONS)

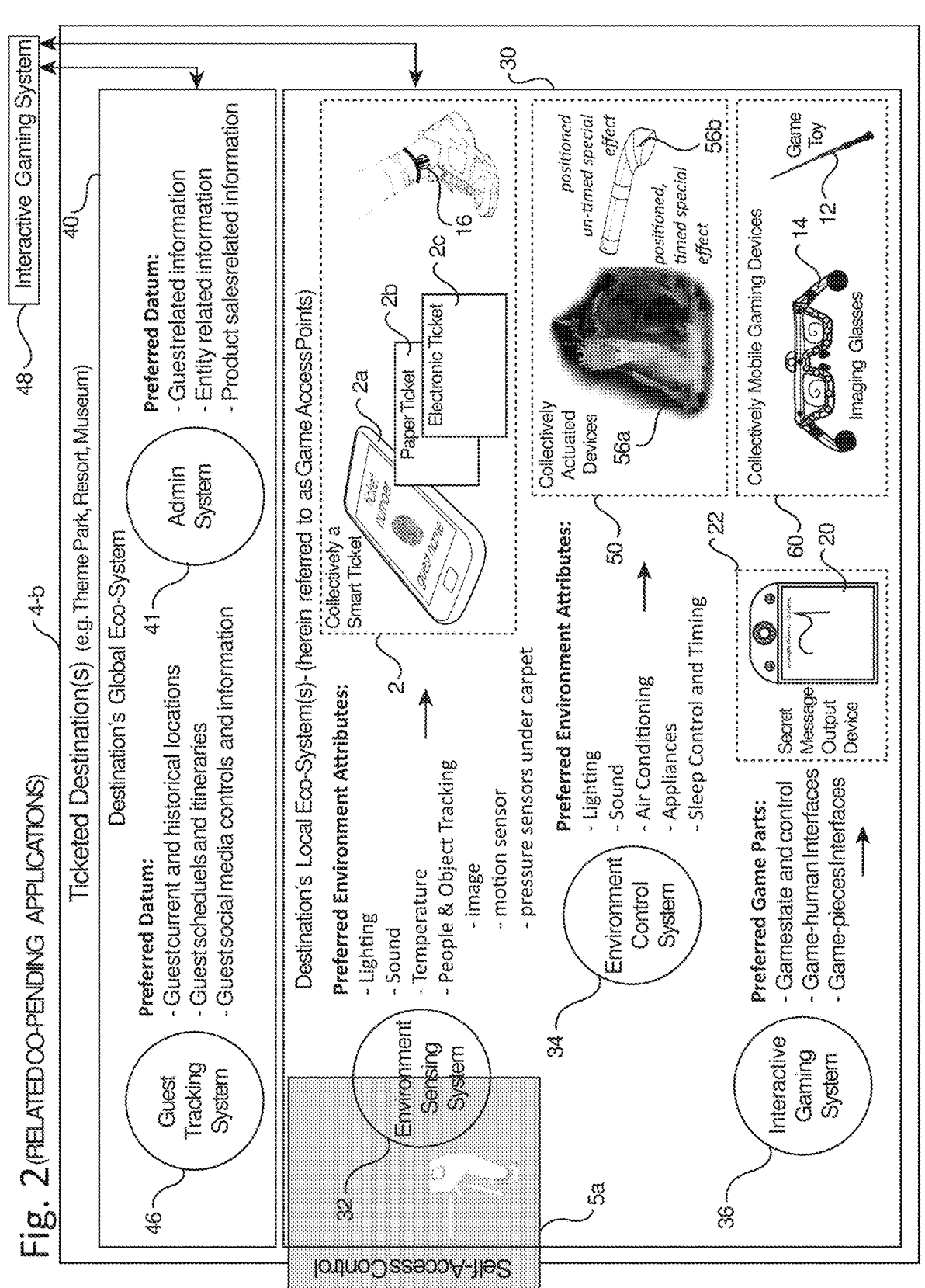

Ticketed Destination(s) (e.g. Theme Park, Resort, Museum)

Interactive Gaming System — 48

Destination's Global Eco-System — 4-b

40

Preferred Datum:
- Guest current and historical locations
- Guest schedules and itineraries
- Guest social media controls and information Guest Tracking System — 46

Preferred Datum:
- Guest related information
- Entity related information
- Product sales related information Admin System — 41

Destination's Local Eco-System(s) - (herein referred to as Game Access Points) — 30

Preferred Environment Attributes:
- Lighting
- Sound
- Temperature
- People & Object Tracking
  - image
  - motion sensor
  - pressure sensors under carpet Environment Sensing System — 32

Self-Access Control — 5a

Collectively a Smart Ticket — 2

2a
Paper Ticket — 2b
Electronic Ticket — 2c
16 positioned un-timed special effect — 56b
positioned, timed special effect
Collectively Actuated Devices — 56a Collectively Mobile Gaming Devices
Imaging Glasses — 14
Game Toy — 12

Preferred Environment Attributes:
- Lighting
- Sound
- Air Conditioning
- Appliances
- Sleep Control and Timing Environment Control System — 34

50
22

Secret Message Output Device — 60
20

Preferred Game Parts:
- Game state and control
- Game-human Interfaces
- Game-pieces Interfaces Interactive Gaming System — 36

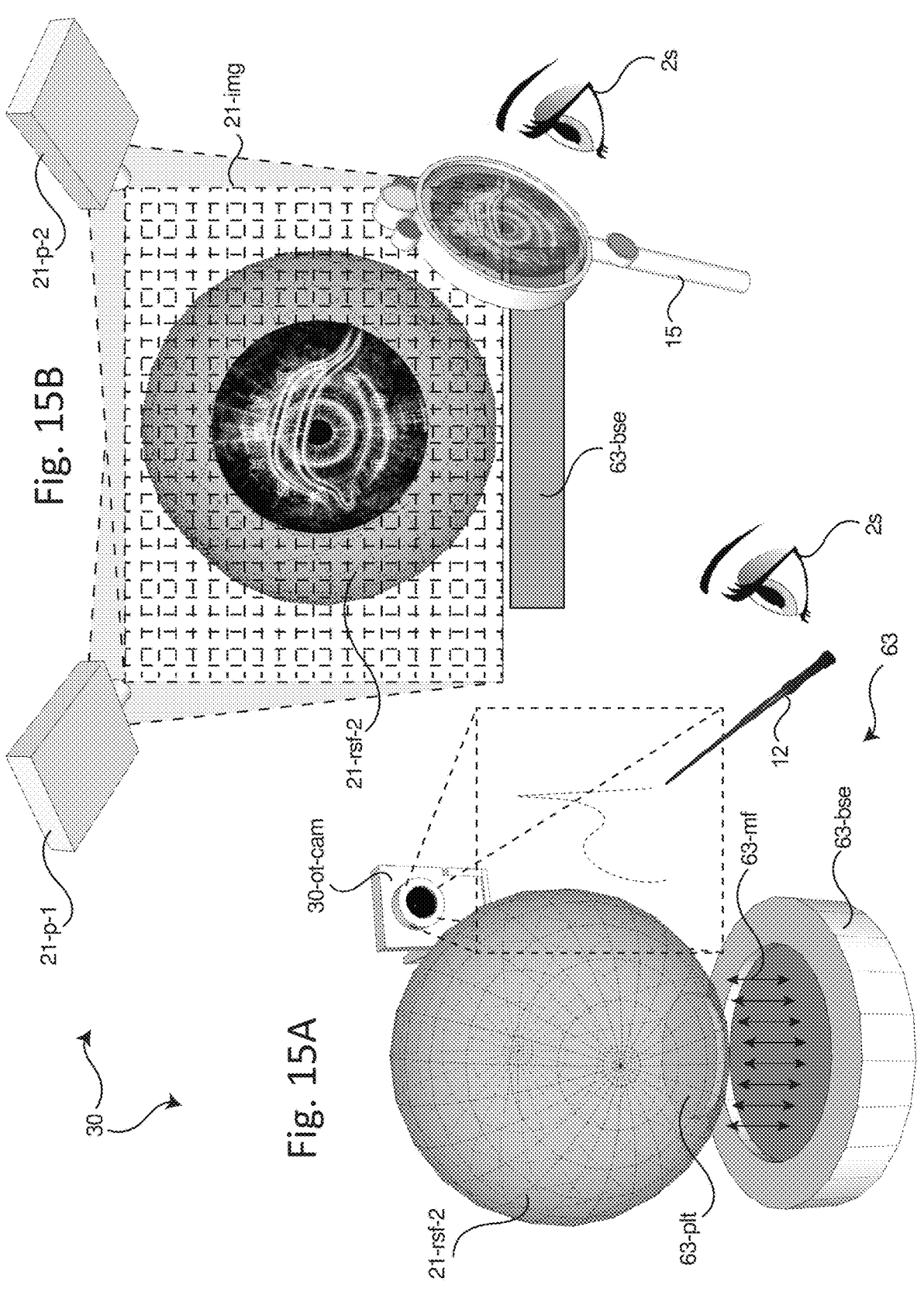

1

DESTINATION INTERACTIVE GAMING SYSTEM FOR DIRECTING GUESTS TO GAME ACCESS POINTS

CROSS-REFERENCE TO RELATED APPLICATIONS

This application is a divisional of U.S. Non-Provisional application Ser. No. 16/144,161 entitled INTERACTIVE GAME THEATER WITH SECRET MESSAGE IMAGING SYSTEM filed on Sep. 27, 2018 and claims the benefit of U.S. Provisional Application No. 62/564,306 filed on Sep. 28, 2017. The present application is a continuation-in-part of the U.S. Non-Provisional application Ser. No. 15/975,236 entitled INTERACTIVE OBJECT TRACKING MIRROR-DISPLAY AND ENTERTAINMENT SYSTEM filed on May 9, 2018. The present application is a continuation-in-part of the U.S. Non-Provisional application Ser. No. 16/027,301 entitled PHYSICAL-VIRTUAL GAME BOARD AND CONTENT DELIVERY SYSTEM filed on Jul. 4, 2018. The present application is a continuation-in-part of the U.S. Non-Provisional application Ser. No. 16/055,078 entitled THEME PARK GAMIFICATION, GUEST TRACKING AND ACCESS CONTROL SYSTEM filed on Aug. 4, 2018.

FIELD OF INVENTION

The present invention relates to a physical-virtual gaming system that includes a multiplicity of game access points where a gamer interacts with the gaming system including both receiving secret messages output by a secret message output device and providing responses including captured images, where the secret messages are only viewable using a secret imaging glass and where responses including captured images of the secret messages are used as answers and responses in the gaming system.

BACKGROUND OF THE INVENTION

Prior to the advent of computing systems, games included physical props and activities and ranged from outdoor sports to indoor card games. Board games have also existed for thousands of years and typically include a portable surface with markings, pieces to move across the board in accordance with the markings and possibly additional cards with questions or directions. Beginning in the early 1970's new types of games based upon computers were introduced including both video games produced by companies such as Atari and early virtual reality games developed first in laboratories. In today's environment, physical games are still prevalent along with a significant number of video games and a growing number of virtual reality (VR) and augmented reality (AR) games. Video games are appealing for many reasons, some of which include their "never-ending" nature where gamers move throughout multiple instances to achieve missions on levels of varying difficulty. In a physical board game with only a single layout and set of rules, there is no reasonable equivalent to instances and levels, offering a distinct advantage to video games. However, while video games often connect a single gamer with many other gamers in the virtual world, they are played in physical isolation, for example sitting at a computer or in front of a tv with gaming console. In contrast, physical board games are typically played at a table where the gamers sit in proximity and can enjoy each other's presence, thus giving board games a distinct social advantage. In the prior related patent entitled PHYSICAL-VIRTUAL GAME BOARD AND CONTENT DELIVERY SYSTEM, the present inventor taught a new type of physical board game with a replaceable surface overlay to provide a physical equivalent to the virtual instance where a single game board can then be continuously extended with new surfaces. The board game also automatically tracks individual game pieces and sends digital information regarding the movements of the pieces to an attached computer, where the computer then displays virtual content at least in part based upon the piece movement, thus adding a strong virtual component that is easily updated by the game manufacturers. The specified system has many advantages over traditional physical board games and virtual video games.

There is currently a significant effort in the marketplace to perfect VR gaming systems such as the HTC Vive, Samsung Gear VR, Sony PlayStation VR bundle and Oculus Rift. What all these systems have in common is a headset worn by the gamer completely enclosing their eyesight and immersing them into a virtual 3D world. These VR systems can be used with the gamer either sitting or standing, but even standing the gamer is typically limited to a smaller region defined by a tracking system that follows at least the current location and orientation of the headset for automatically adjusting the view of the 3D world as seen by the gamer. Some companies such as The Void are building what they refer to as a hyper-reality system that "is a whole-body, fully immersive VR experience" in which one or more gamers interact with a combination physical and virtual world. Each gamer wears a headset driven by a portable computer carried by the gamer in a backpack and to this extent the game is a typical VR experience. Rather than being confined to a small space that is typically free of physical props, in the hyper-reality experience a gamer is walking around in a much larger albeit still enclosed space, typically comprising many rooms and physical props and to this extent the game is a typical physical experience.

AR games are also on the rise. A recent popular example is Pokémon GO where gamers walk around in any enclosed or open physical environment, and rather than wearing headsets like VR systems, the gamers are holding their smart phone which is running the AR game that streams images to the gamer of the actual view in front of their smart phones augmented with Pokémon characters as if these characters were actually moving around in front of them. Like physical games, AR games have an advantage over VR games in that the gamer moves about freely with their eyes uncovered and having the ability to interreact normally with one or more other gamers. Un-like VR systems, the AR smart phone screen is very small and the gamer is not immersed in the virtual content. Un-like physical games, the gamer must own a smart phone (which typically starts after 13 years of age,) must walk around holding this smart phone up, and then must deal with the distraction of being unable to concentrate and enjoy the natural physical environment.

In the prior related patent entitled INTERACTIVE OBJECT TRACKING MIRROR-DISPLAY AND ENTERTAINMENT SYSTEM, the present inventor specified an interactive mirror/display that can be placed in any physical setting and implemented both an object tracking system and a specially adapted mirror/display. The object tracking system allowed the gamer to provide input, for example by making gestures using a wizard's wand, while the display allowed the gamer to receive virtual images, where these virtual images could be secret messages only visible to the gamer wearing special glasses. The glasses where implemented using either or both of a polarizer and active shutter.

It was also taught that the display portion of the mirror/ display had many variations and uses without the mirror portion and with or without the object tracking and its many variations. The mirror/display combination, or display alone, as taught in the related co-pending application is herein generally referred to as a secret messaging output device, for which an additional variation based upon projectors rather than a display is taught in detail within the present application.

The special glasses as taught in the related co-pending application is herein generally referred to as a secret message imaging device, for which an additional variation in the shape of a magnifying glass along with several alternatives is taught in detail. The article for use by a gamer for inputting gestures to the mirror/display was shown as a wizard's wand and is herein generally referred to as a game toy, for which two additional game toys are taught as examples, including an interactive sword that vibrates and glows under the control and timing of the system as well as a light gun that includes a variation of the imaging glass as a scope for viewing secret images.

In the related co-pending patent entitled THEME PARK GAMIFICATION, GUEST TRACKING AND ACCESS CONTROL SYSTEM, the present inventor specified a platform for: 1) controlling guest self-access into physically bounded locations such as a theme park, where control of self-access was implemented using a smart ticket with electronics and a guest's smart phone running a special app, 2) tracking guests based in part upon the electronics in the smart ticket as they visited specific locations within the physically bounded location, including identifying individual guests located in individual ride car seats such as found at a theme park, and 3) a gaming system that at least in part used any of the tracking information as well as guest information provided through the special app to cause physical devices to uniquely actuate, thereby providing some customized experience for one or more guests based upon the combination of tracking information, guest information and game state.

In addition to the progression of gaming systems and technology, movies and virtual content generation have continued to advance. With traditional movies, studios invest significant money to create roughly 90-120 minutes of video, where the video is then released across a network of movie theaters. In the theater, a movie viewer occupies a seat in a room and remains substantially stationary throughout the time duration of the movie. Viewers identify with movie characters and vicariously enter into the situations and challenges faced by the characters.

BRIEF SUMMARY OF THE INVENTION

The present invention anticipates the gamification of physical destinations to become gaming theaters for playing physical-virtual games, where the physical destinations include theme and amusement parks, museums, resorts, casinos, airports, universities, etc. Currently, these physical destinations draw a significant number of visitors annually by offering a unique environment typically including some special attraction(s) targeted to a sub-culture of individuals. Access to these destinations is typically restricted by a purchasable ticket and limited by physical boundaries and times of day. The special attraction(s) are typically designed for large-group consumption with minimal individuation per guest. Especially for theme and amusement parks, the cost of building the destination and attractions easily ranges from $100 M to $1 B dollars. While these destinations have beautiful settings and attractions, they can quickly become boring as they lack many of the now better understood principals of what is referred to as "deep engagement."

In "The Gameful World: Approaches, Issues, Applications" (MIT Press), gamification expert Scott Rigby states: "Specifically, we have outlined three basic psychological needs—competence/mastery, autonomy, and relatedness—and the critical role that these needs play in sustaining engagement, achieving wellness, maximizing value, and motivating lasting behavior change among other positive outcomes both in games (Rigby and Ryan 2011) and elsewhere (Deci and Ryan 2000). The motivational literature has repeatedly shown that experiences in life that facilitate the satisfaction of these needs—whether those experiences be analog or digital—are associated with the positive outcomes that concern much of the gamification movement."

Regarding the need for competence/mastery, the present invention anticipates the use of both physical and mental challenges and puzzles that combine the best-of physical experiences and the best-of virtual experiences. Unlike a typical destination such as a theme park, the physical experiences are not simply designed for increased sensations, e.g. a roller coaster or walking about in a beautiful immersive environment such as Diagon Alley at Universal's "The Wizarding World of Harry Potter," but rather they include the interaction with physical devices that require dexterity and familiarity to master. One example is a game access point designed around a challenge to disarm a mock bomb before it explodes, where the bomb game preferably is related to a storyline or theme associated with other content, for example a movie such as Die Hard 3 that included a bomb associated with what is referred to as "the water jug riddle."

Furthermore, the present invention creates multiple physical/mental challenges that are strategically spread through one or more game theater destinations, thus providing the business goals of moving traffic past and through strategic destination locations. The present invention anticipates the use of leader boards that are available for viewing by gamers, showing their mastery levels via a secret message, where for example the gamer verbally commands the mirror/ display as prior taught in the INTERACTIVE OBJECT TRACKING MIRROR-DISPLAY AND ENTERTAINMENT SYSTEM to provide them with their status, and where the mirror outputs a secret message showing any combination of the gamer's personal achievement or master level.

Regarding the need for autonomy, the present invention calls for multiple game access points spread throughout any one or more destinations, where the gamer chooses which game access points to visit as they attempt to achieve their game missions. Game access points are electronically connected in a collective network, where a gamer's proximity to any given access point is first detected by the given access point and then communicated to the interactive gaming system managing the entire game being played across the collective network. Especially in the prior related patent entitled THEME PARK GAMIFICATION, GUEST TRACKING AND ACCESS CONTROL SYSTEM, the present inventor teaches multiple means for determining the proximity and location of a gamer, for example as the gamer passes by access chokepoints leading into or out of select destination locations, where the chokepoints are equipped to detect a passive RFID embedded in the gamer's smart ticket. The prior application further taught multiple apparatus and methods for determining the specific seat in a theme park ride car being occupied by a gamer, thus making a particular seat on a ride car a game access point. In the prior related INTERACTIVE OBJECT TRACKING MIRROR-DIS-PLAY AND ENTERTAINMENT SYSTEM, the present inventor taught that an individual secret message output device, such as a display/mirror, included communications means such as Wi-Fi or Bluetooth for determining when a personal gaming device such as prior taught eye glasses or the presently taught magnifying glass came within a given distance of the secret message output device, thus allowing the output device connected to the collective network to transmit detected gamer ID's to the controlling interactive gaming system, where the interactive gaming system at least in part uses the gamer's detected ID for summoning the gamer to a particular game access point.

The preferred gaming system as herein described decides which gamers to summon at which times to any of various system "destination game parts," where game parts can include virtually any destination location, destination events held at a destination location at certain times or tracked moving game parts such as a service personal, security personal or a themed character. The preferable gaming system includes or receives from other external systems destination game part information usable for managing visitor flow to a game part, for example helping to avoid excessive wait times, where the external systems can be any of those already in place at a destination, such as a theme park, for monitoring visitor/guest flow. Preferable game part information includes the number of visitors/guests sched-uled to be present, or known or estimated to be currently present, at a game part. The preferable gaming system also includes game part related information for helping a guest find the game part or to match potential guest interests with game parts, where for example game part related informa-tion includes a location of the game part, access times of the game part, the environment type of the game part including indoors or outdoors, the guest profile of the game part such as suggested age ranges, languages spoken or available, or interest types.

The present invention anticipates that for at least some destinations such as a theme park, existing (and potentially external) destination systems already track the number of guests present or estimated present at a destination location, for example including the theme park destination locations of a ride, restaurant, sales point, show, viewpoint, etc., where preferably the herein taught system receives any existing external destination location information regarding the num-ber of guests present as well as other location related information such as the operating times of the destination location, the type of the destination location including indoors or outdoors, the guest profile of the destination location such as suggested age ranges or interest types, etc., where then the system is further adapted to at least in part use any of the received destination location information or destination location related information to determine which of any gamers to summon to the destination location and when to summon the any gamers.

Example game parts include a specific game access point, a sales point, a destination object, a destination symbol, a moving target such as service personnel or a themed char-acter, a themed party, a concert, a fireworks display, a ride or amusement, or any other destination sub-location pre-known to the interactive gaming system, where the deter-mination to summon a gamer to a destination game part is based at least in part on any one of, or any combination of the gamer ID, a currently known or last known location of the gamer within the destination, the current game state related to the gamer and any zero or more other gamers, or a known number of other gamers already present or sum-moned to the specific destination game part, thus as men-tioned providing means for controlling or influencing line queues at the destination game part. In the preferred inven-tion as herein taught, a specific game access point can also be a moving target whose current location (and queue lengths) are tracked by the system. For example, the game access point could be a movable cart with sufficient battery and Wi-Fi access so as to be moved about within the destination while also remaining in communications with the gaming system. In another preferred case, the game access point is a mobile gaming device being carried by a moving target that is a themed character, where the gamer is challenged to first find the moving target/themed character and then to interact with the character or perform some gesture or action that is detectable by the mobile gaming device, where upon successful completion the gamer accu-mulates points, increases strength, enters a new gaming level, etc., thus immersing the gamer more deeply into both the game and the destination.

Gamers are summoned by sending signals to any of the gamer's communication capable mobile gaming devices, including the herein taught secret message magnifying glass or prior taught secret message eye glasses or game app running on the gamer's mobile device such as a smart phone. The present invention also anticipates that the smart phone and game app present a destination map that helps direct the gamer to a specific game access point, where the gamer's current location is tracked using any of available technolo-gies including GPS or wi-fi LPS. The present invention anticipates other interfaces for directing a gamer to a game access point, such as: a) presenting a digital compass dis-played on the herein taught secret message magnifying glass, where the compass includes a flashing beacon repre-senting the direction to proceed, or a written instruction such as "proceed north-by-northwest . . . ", or b) changing the color of a gaming device such as the herein taught magni-fying glass, where the color is representative of the chil-dren's game of "getting warmer" (e.g. red in color) or "getting cooler" (e.g. blue in color) as the gamer wanders around the destination looking for the game access point.

Gamer's may also approach a game access point and request to interact, where use of the game access point optionally requires any one of, or any combination of: 1) the allocation of accumulated game points or credits, where the accumulated game points is any combination of credits for achievements related to the interactive game or credits for visiting, doing, or performing at any locations, tasks or challenges related to the host destination, for example where the destination is a theme park where the present gaming system is tracking which rides and even ride seats a gamer has been on and when, thus allowing the game to motivate gamer's to interact with the destination achieving the busi-ness goals of the destination, and where for example a gamer is given access to a particular game access point based at least in part upon the seat they occupied on a specific ride, 2) answering an immediate challenge, e.g. by solving a problem as presented on any of the gaming devices with UI's for accepting input, including the herein taught secret message magnifying glass or prior taught display/mirror with object tracking for detecting the gestures made by an article such as a wizard's wand, or a smart phone with game app, or 3) entering a lottery by either: a) purchasing some destination product, where proof of purchase includes scan-ning a game-lottery bar code output by for example by a destination store or restaurant, where the bar code is for example printed on the purchase receipt, or b) providing some personal information for example using a smart phone and game app in order to receive a lottery ticket number, where preferably the personal information provided is useful to the destination especially in combination with the other system data including guest/gamer tracking for the destination to use in performing analytics, guest services, flow management or other business related objectives, where examples of personal information might include favorite sports teams or movie characters, home state locations, age, sex, etc., where this personal information is also useable at least in part by the interactive gaming system for altering the game as perceived by the gamer.

Regarding the need for relatedness, the present invention addresses three forms of relatedness, including: 1) the game is relevant to the destination hosting the game theater, 2) the game is relevant to a theme such as a movie or a book, and 3) the game is relevant to the chosen persona of the gamer. For example, the present inventor notes that a destination such as Universal Studios has implemented the storyline and theme of Harry Potter, and that a Harry Potter game is therefore relevant to both the gamer's personal location (i.e. being at Universal Studios) and to a theme of personal interest to the gamer (i.e. Harry Potter.) Currently, Universal Studio's sells theme related products, such as costumes including scarfs and capes and toys including wands, representing Harry Potter characters.

The present inventor anticipates that the object tracking systems described both herein and in the prior related applications are capable of detecting these theme related products such as clothing and toys using well-known imaging analysis including now popular machine learning algorithms implementing for example deep-neural nets, where the detected type of clothing or toy is used at least in part to determine how the interactive gaming system responds to an individual gamer. The present invention additionally provides for the use of passive micro RFID devices embedded within destination products, where at the point-of-purchase the gamer ID information maintained within the gamer tracking system is either written to the embedded micro RFID and/or associated with the unique RFID code, such that destination products useable as game props are also identifiable by detecting the embedded RFID at a game access point. The system's ability to automatically interface with destination shops for associating themed products for use with the destinations games provides significant advantages to the destinations and significant role-playing relatedness for the gamers. Gamers are encouraged through self-motivation to purchase themed clothing such as scarfs, t-shirts, hats, etc. that are then detectable by either or both the gamer/device detection apparatus (via RFID) or object tracking apparatus (via image analysis) and methods of the system that are included in a given game access point. Once detected, classified and possibly uniquely identified, the class or identification of the purchased merchandise are used at least in part along with other known gamer information by the gaming system to better establish the gamer's persona.

The present invention further anticipates that some destination themed clothing or toys will only be sold to a gamer that has achieved a certain level of mastery with respect to the game, where the present system provides electronic information proving this mastery to the destination shop keepers thus controlling gamer access to the select merchandise, increasing its perceived value. After sufficient game achievement, the gamer must then purchase and wear or use this select merchandise in order to open up new levels of the game at select game access points. As mentioned, select game access points detect the select merchandise, for example using image analysis or RFID detection, where the detected merchandise is then automatically associated with the gamer's information in the game system, thus adding to the gamer's persona, in the virtual world often referred to as "gear." The present and prior inventions also anticipate that the gamer enters profile and persona information using their smart phone and game app or any of the gaming system's input devices.

As those familiar with the business goals of destinations such as theme and amusement parks, museums, resorts, casinos, etc. will well understand, there is a great need to maximize guest engagement, drawing them more deeply into the destinations existing themes, building, assets, shops, restaurants, products, etc., all of which is addressed by the present and co-pending applications from the present inventor. There is also a need for a gaming system that fits into the existing themes of the destination without creating distractions from that destination's existing look and presentation. The present invention addresses this need using the secret message output devices that present one image to the public that fits into the destination's look and feel, while then also providing any number of other images to gamers, where these other images are not disruptive to the visual experience of destination guests that are not playing in a game.

In the prior related INTERACTIVE OBJECT TRACKING MIRROR-DISPLAY AND ENTERTAINMENT SYSTEM, the present inventor described several variations of secret message glasses including polarizers and or active shutters for viewing and receiving secret messages from any of several variations of a display/mirror, where the display was for example a modified LCD monitor. The present invention describes several variations of a secret message magnifying glass that also employs combinations of polarizers, active shutters, modulators and transflective displays for allowing a gamer to view secret messages as presented by either the prior taught display/mirror or the herein taught projection systems, where the projection systems output a spatially aligned combination of a secret message images and a complimentary images, each at different polarization orientations, and where to the naked eye the secret messages and complimentary images are visually additive combining to be perceived as a public image.

Given the state-of-the-art in projection systems, reflective surfaces that maintain the polarization of the incident beam, LCD electronics, non-visible lighting for causing invisible inks to fluoresce in the visible spectrum, image analysis for object identification and classification, micro RFIDs, as well as other technologies specified herein, it is now possible to achieve the many benefits described by the present application in which guests participate in any number of games designed to engage them more deeply with the destination and with the content of the game.

The present invention is anticipated to offer significant benefits beyond destinations such as theme and amusement parks, museums, resorts, and casinos including gaming restaurants (such as the popular Dave & Busters,) sporting and music venues, air ports and permanent and semi-permanent living communities such as retirement villas and college campuses.

BRIEF DESCRIPTION OF THE SEVERAL VIEWS OF THE DRAWING

FIG. 2 is a variation of the teachings portrayed in prior FIGS. 3 and 4 of the related co-pending application entitled INTERACTIVE OBJECT TRACKING MIRROR-DISPLAY AND ENTERTAINMENT SYSTEM, where prior FIG. 3 taught a destination's local environment eco-system 30 as comprising environment sensing system 32, environment control system 34 and interactive gaming system 36 and where prior FIG. 4 taught a destination's global environment eco-system 40 as theme park (i.e. destination) admin system 42, hotel (if existing) admin system 44, guest tracking system 46 and interactive gaming system 48. The prior local eco system 30 is herein referred to as a game access point 30 and several of the taught apparatus and methods from the prior co-pending applications including a smart ticket 2, actuated devices 50 and mobile gaming devices 60 are shown to be implementations of the originally taught features of system 30. Global eco-system 40 including a guest tracking system 46 and admin system 41 is herein redefined to no longer include interactive gaming system 48, where the interactive gaming system 48 is moved outside of the destination's system 40 and onto gaming platform 10.

Figures 10A, 10B, 10C:
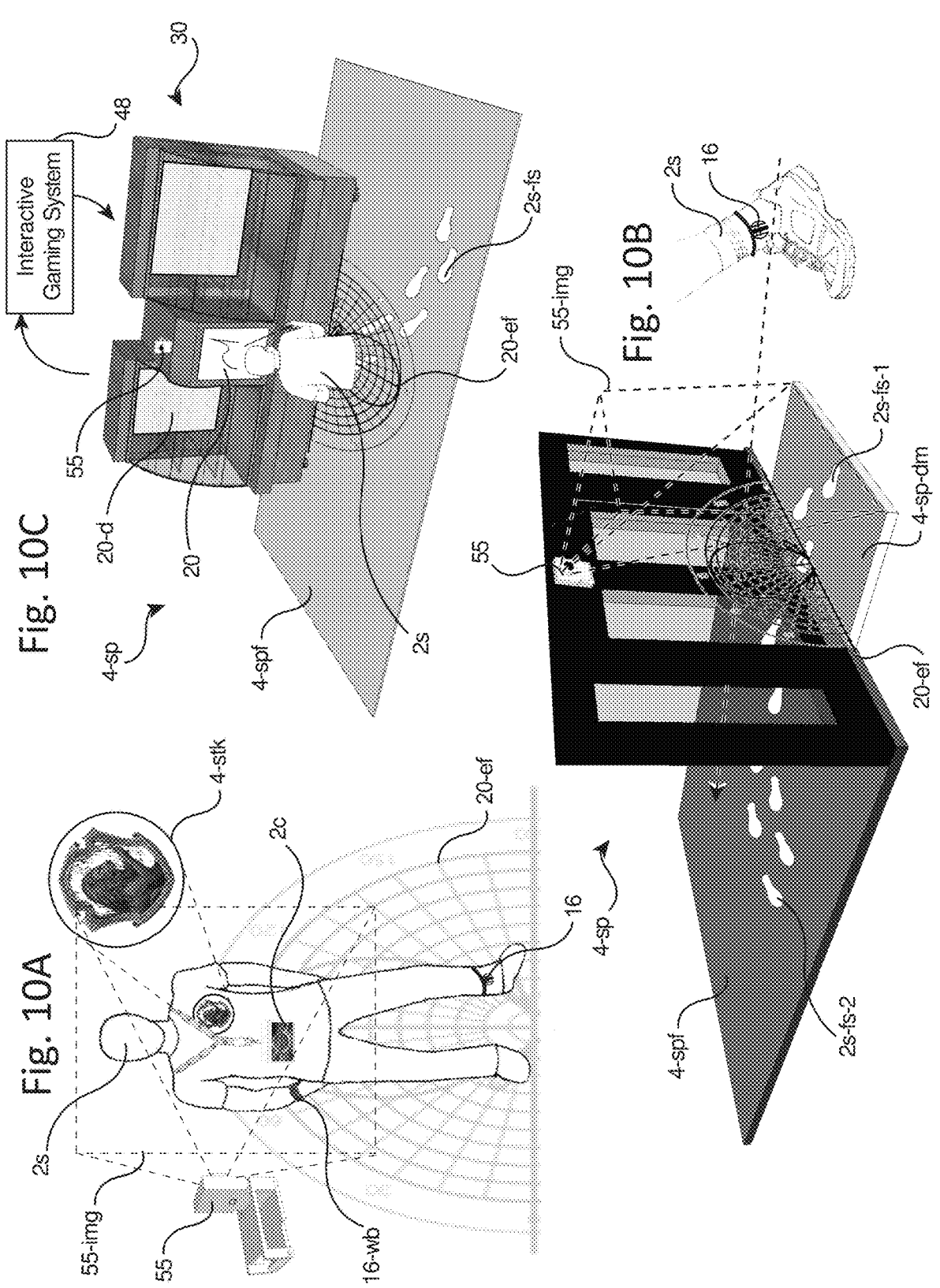
FIG. 10A is a front view of a gamer 2s wearing any of a multiplicity of electronic devices such as electronic ticket 2c, RFID wristband 15-*wb* or RFID anklet 16, where the presence of electronic devices 2c, 15-*wb* and 16 are detectable by a reader outputting, receiving and analyzing exciter field 20-*ef*. Also depicted is camera 55 for capturing images 55-*img* of gamer 2s wearing sticker 4-*stk*, where captured images 55-*img* are analyzed to determine the presence of sticker 4-*stk*, and where the presence of sticker 4-*stk* on a gamer 2s is interpreted as an indication of the gaming persona chosen by gamer 2s.
FIG. 10B is a perspective view of a sales point 4-*sp* of a destination 4-*a*, 4-*b*, where the sales point 4-*sp* comprises multiple sensors for detecting at least the entrance into the sales point 4-*sp* of individual gamers 2s, where the multiple sensors include pressure sensing doormat 4-*sp-dm*, camera (s) 55 and exciter field 20-*ef*. The interior of sales point 4-*sp* additionally includes any of the multiple sensors including pressure sensing floor 4-*spf*.
FIG. 10C is a perspective view of a game access point 30 located within a sales point 4-*sp* and in communication with gaming system 48, where game access point 30 comprises secret message output display 20-*d* and secret message output mirror/display 20 as well a pressure sensing floor 4-*spf* and readers for outputting exciter fields 20-*ef*, and where mirror/display 20 includes camera 55 for providing object tracking to detect the movements of an article 12 by a gamer 2s.
Figure 10D:
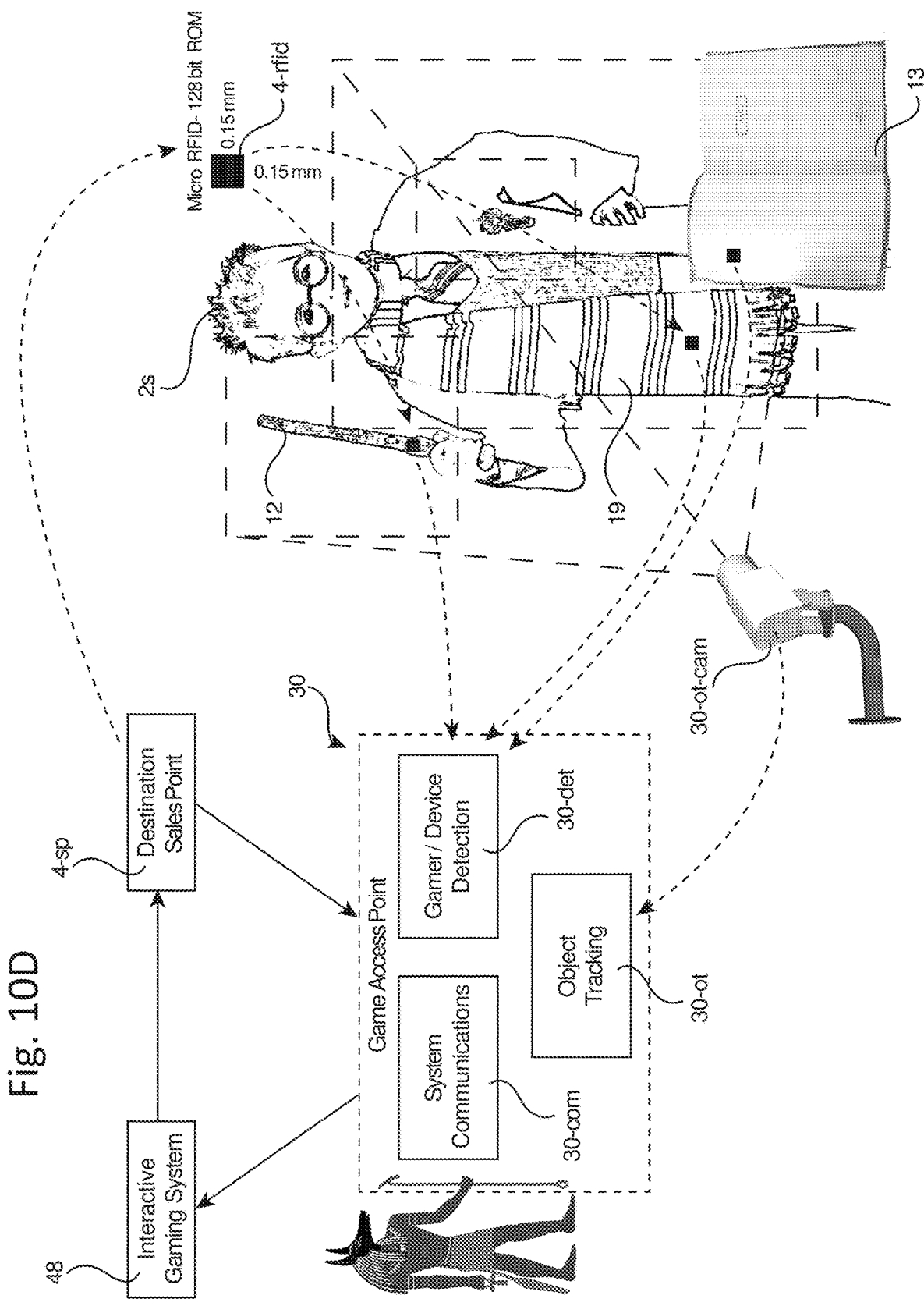
FIG. 10D is a front view and block diagram of a gamer 2s holding an article 12, wearing clothing 19 and having a secret message book 13, where each of article 12, clothing 19 and book 13 are mobile game devices 60 and comprise an electronic device such as micro-RFID 4-*rfid*, and where destination sales point receives game information from interactive gaming system 48 regarding gamer 2s and uses this game information at least in part to cause electronic device 4-*rfid* to be updated with encoded information associated with gamer 2s. Also depicted is any game access point 30 block diagram including a gamer/device detection 30-*det* sub-component capable of detecting the encoded information imparted to the electronic device 4-*rfid*, where the detected encoded information is usable at least in part by the any game access point 30 for providing to gaming system 48 to uniquely identify gamer 2s, and where any access point 30 additionally uses object tracking 30-*det* sub-component to capture images of gamer 2s and gamer gear such as 12, 19 and 13, where using object classification and identification gaming system 48 determines additional gaming information regarding gamer 2s.
Figure 10E:
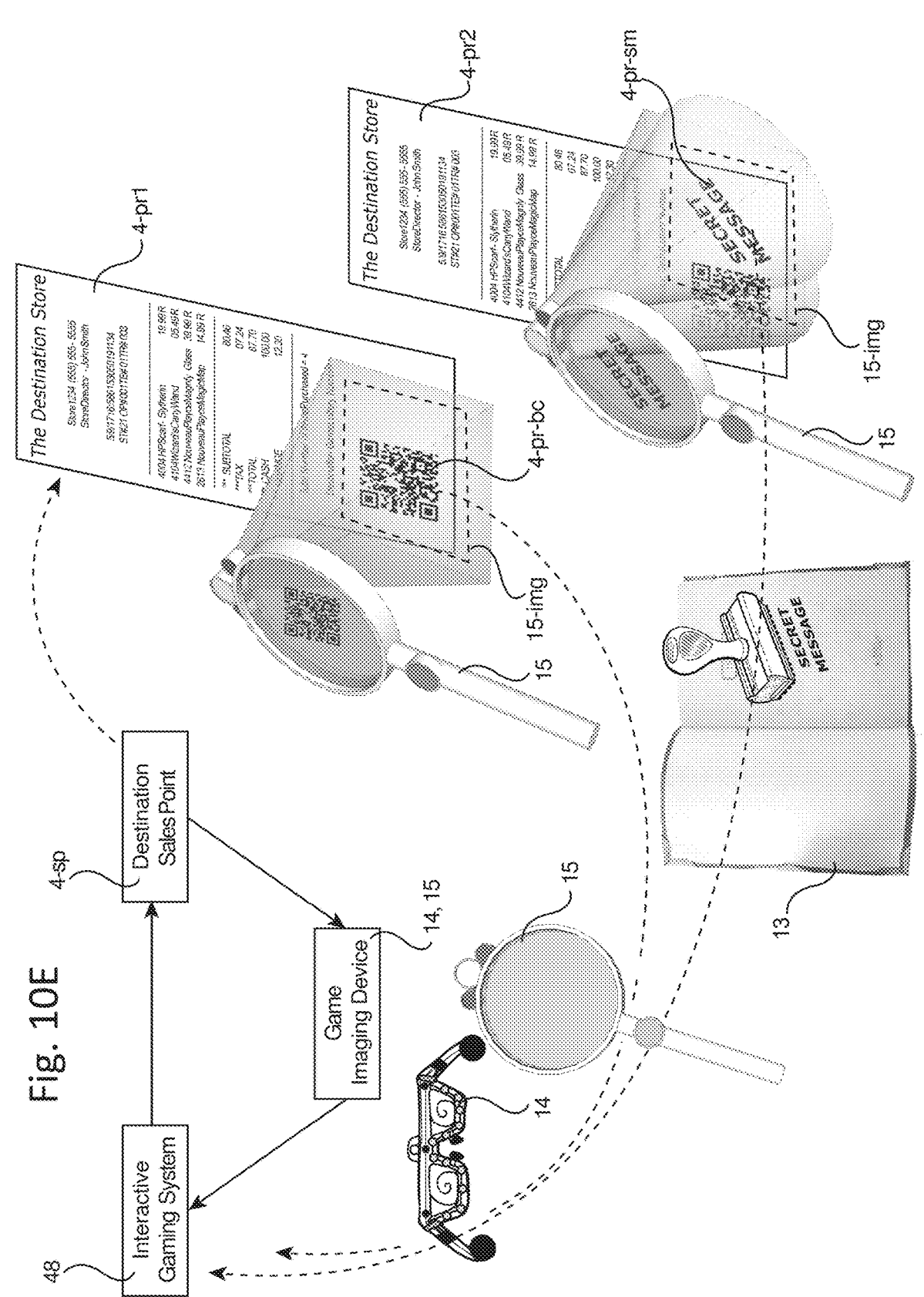

FIG. 10E is a perspective view and block diagram of magnifying glass 15 capturing images 15-*img* of sales receipts 4-*pr1* and 4-*pr2* as caused to be printed by sales point 4-*sp*, where sales point 4-*sp* receives game information from interactive gaming system 48 regarding gamer 2s and uses this game information at least in part to cause the printing of additional visible or non-visible information onto receipts 4-*pr1* and 4-*pr2*, where the additional printed information is then captured in an image 15-*img* for transmission to gaming system 48, and where gaming system 48 analyzes images 15-*img* to determine additional information for use in the on-going game. Sales point 4-*sp* is also shown to provide invisible ink messages for application to secret message book 13, where the invisible ink message is then viewable by gamer 2s using eye glasses 14 or magnifying glass 15.

Figure 11:
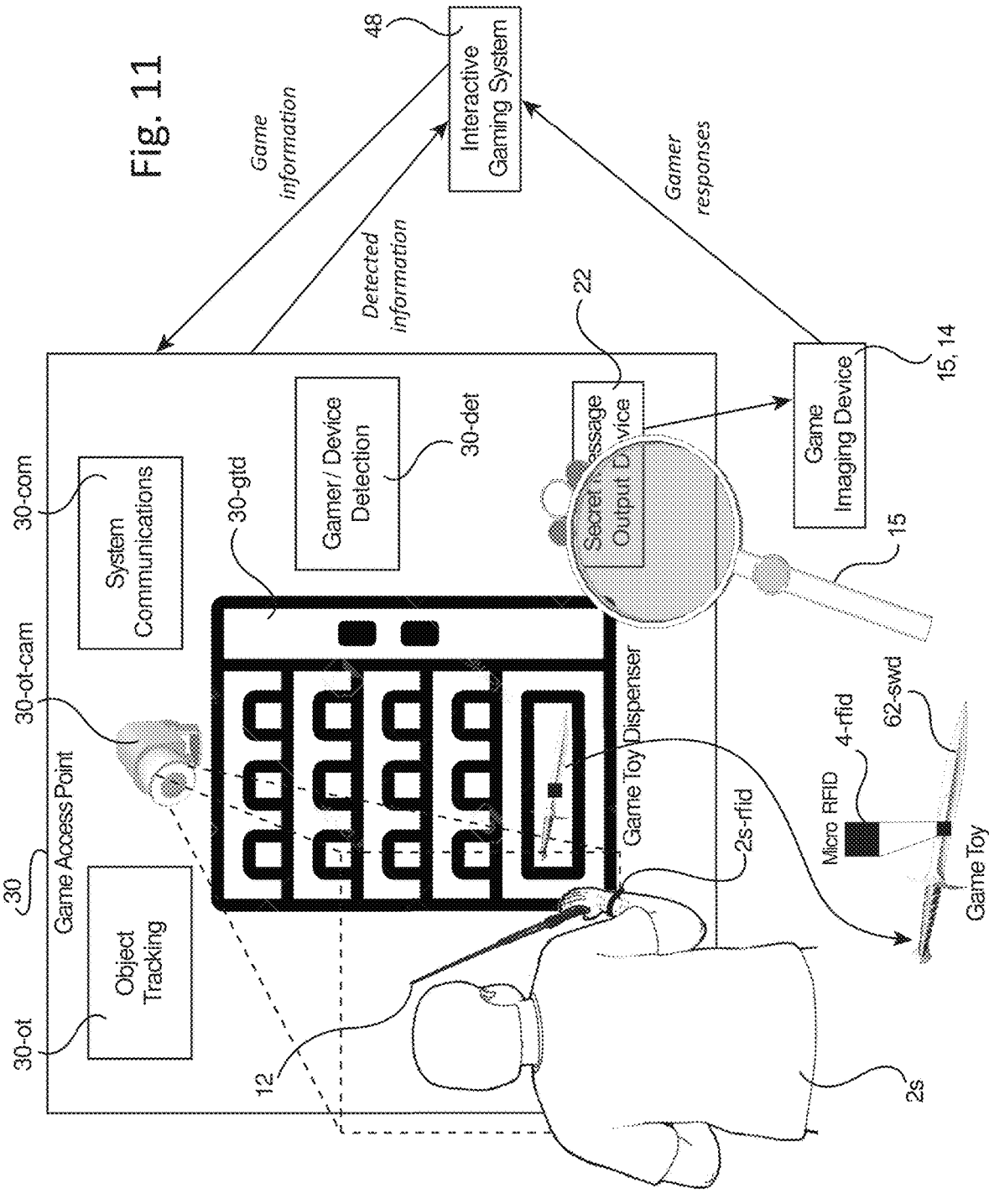

FIG. 11 is a block diagram of a game access point 30 that has been further adapted to include an actuated device 50 that is a game toy dispenser 30-*gtd*, where the dispenser 30-*gtd* controllably dispenses a mobile gaming device 60 such as sword 62-*swd* while also updating an electronic device 4-*rfid* with encoded information associated with gamer 2s as received from gaming system 48, and where game access point 30 includes an object tracking 30-*ot* sub-component for determining the movements of an article 12 being used by a the gamer 2s, where the determined movements are at least in part used to by dispenser 30-*gtd* to further determine what game toy is dispensed.

Figure 12:
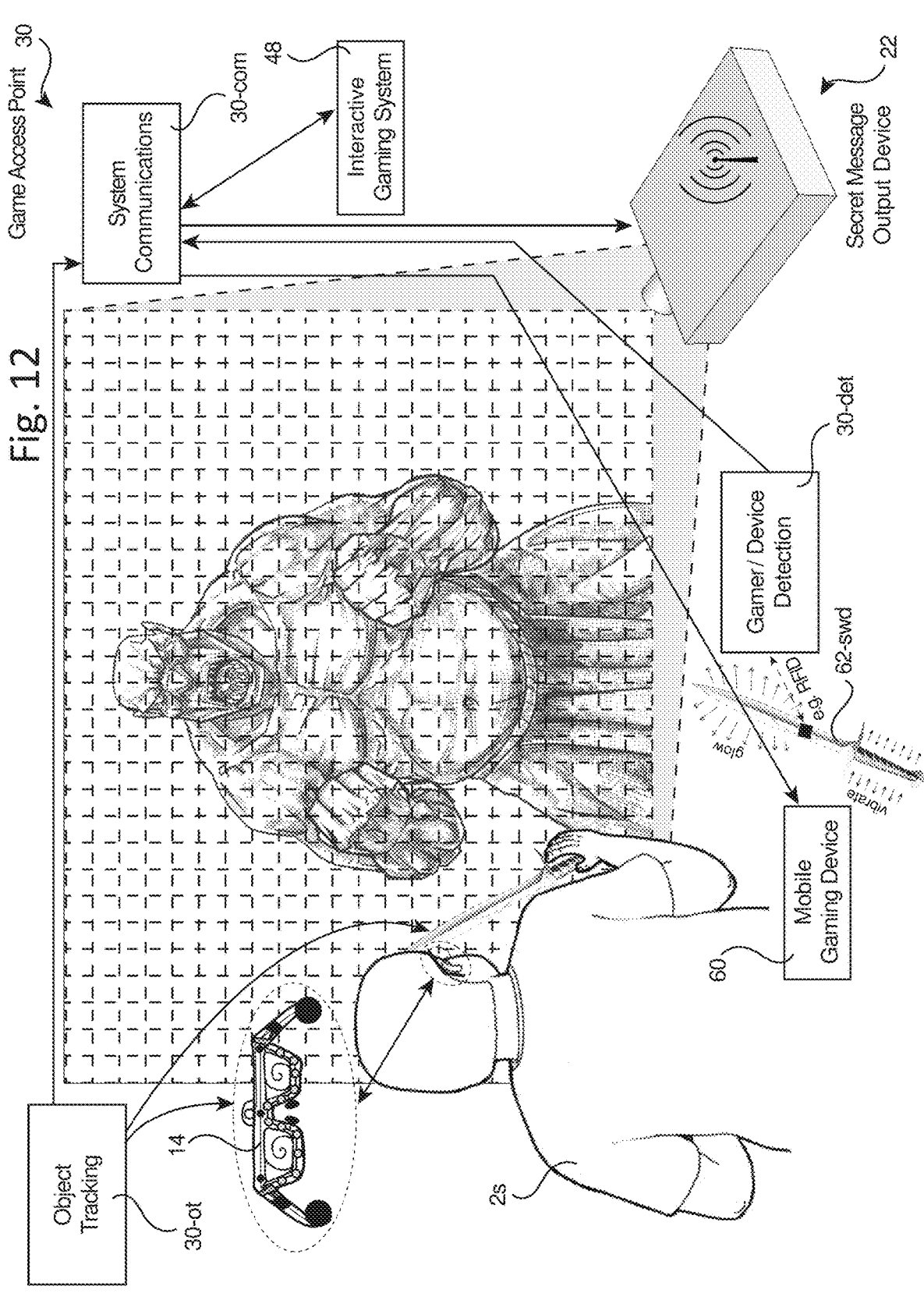

FIG. 12 is a depiction of a gamer 2s standing in front of a secret message output device 22 at a game access point 30, where game access point 30 includes and object tracking 30-*ot* sub-component for determining the movements of an article 12 such as sword 62-*swd* being used by a the gamer 2s, where the determined movements are at least in part used to alter the output of secret message images A via device 22, where gamer 2s views the changing secret messages A through eye glasses 14, and where game access point 30 sends signals to article 12 such as sword 62-*swd* controlling effects such as vibration and the emission of light.

Figure 13:
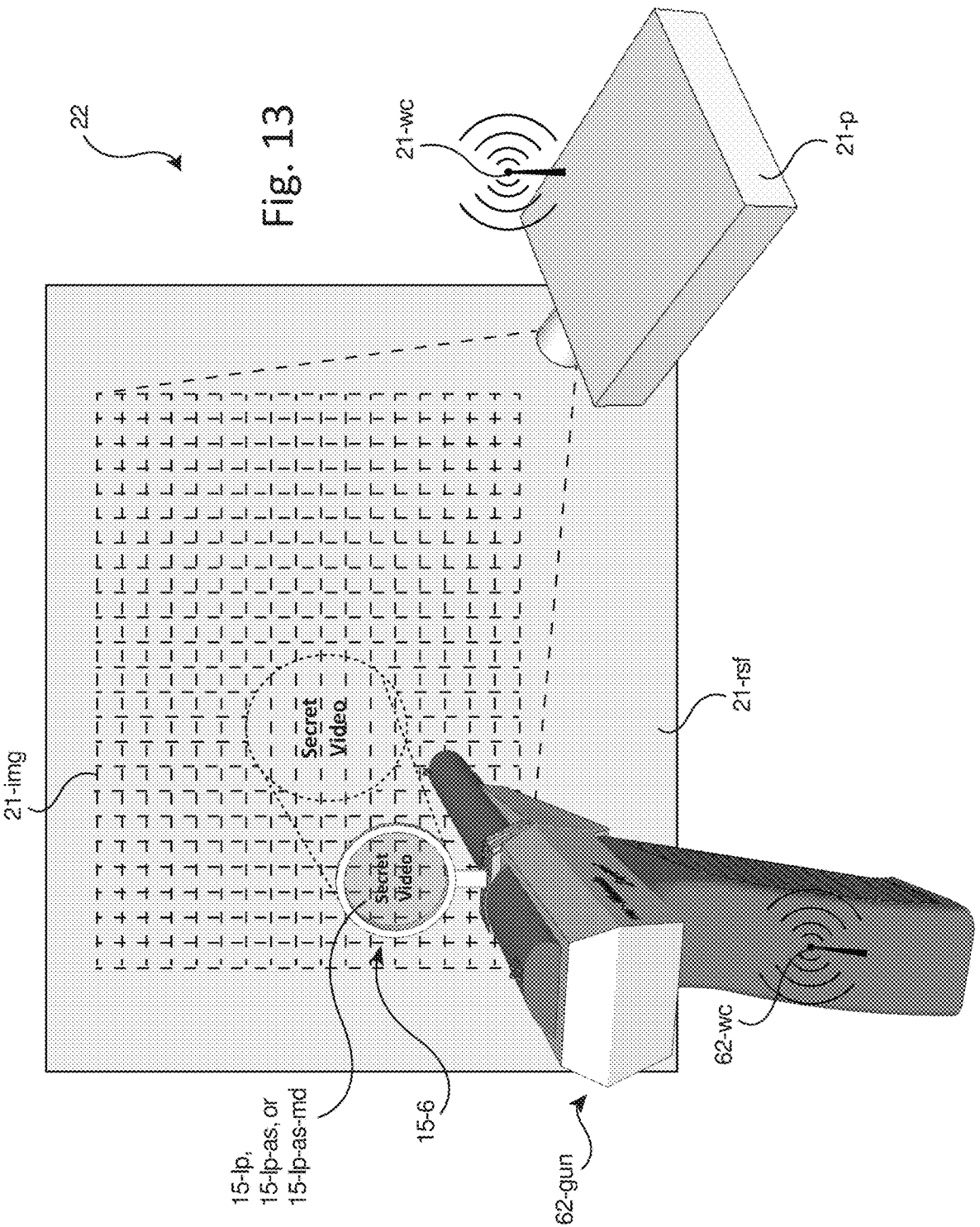

FIG. 13 is a depiction of a traditional light gun 62-*gun* that has been further adapted to include a scope glass 15-6 including lens 15-*lp-as-md* for controllably transmitting secret message images A as projected by projector 21-*p* and reflected off screen 21-*rsf*.

Figure 14:
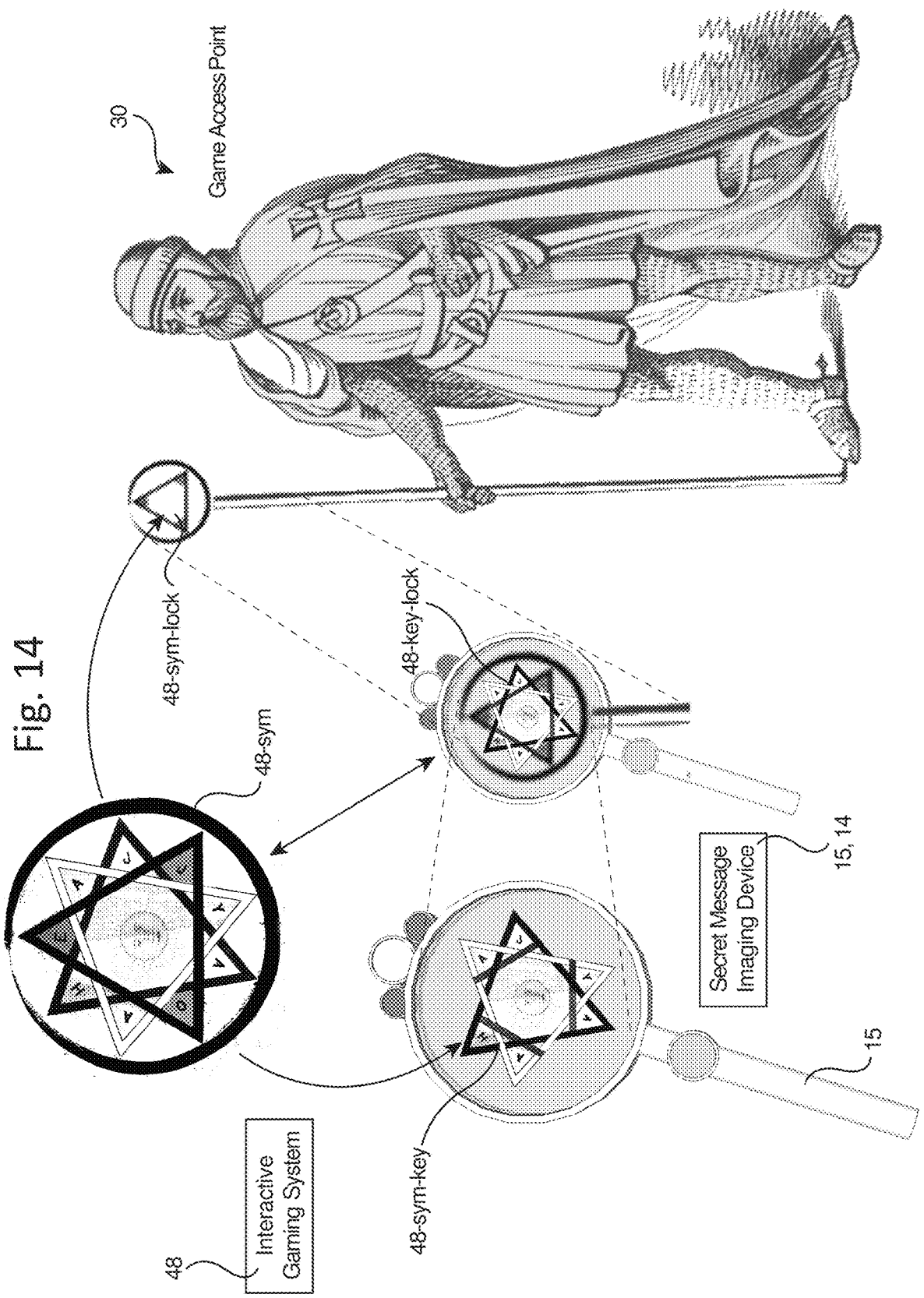

FIG. 14 is a depiction of a gaming symbol 48-*sym* that is divided into a key symbol 48-*sym-key* for display by magnifying glass 15 and a lock symbol 48-*sym-lock* that is situated somewhere in a destination 4-*a*, 4-*b*, where gamer 2s using glass 15 works to locate the appropriate lock symbol 48-*sym-lock* for alignment with the key symbol 48-*sym-key* as viewed through the glass 15, and where an image of the found lock symbol 48-*sym-lock* is captured by the gamer 2s using glass 15 and provided to gaming system 48 for verification.

FIG. 15A is a depiction of a traditional magnetic levitation device 63 that has been further adapted to be an actuated device 50 for use by a game access point 30, where access point 30 includes an object tracking 30-*ot* sub-component for determining the movements of an article 12 being used by a gamer 2s, where the determined movements are used at least in part along with game information provided by gaming system 48 to cause levitation device 63 to emit a magnetic field causing spherical reflective screen 21-*rsf-2* to move up, down or spin.

FIG. 15B is a depiction of a spherical reflective screen 21-*rsf*-2 onto which one or more projectors 21-*p*-1 and 21-*p*-2 project mapped public images 21-*img* conforming to the spherical surface, where a gamer 2s using a secret message viewing device such as magnifying glass 15 perceives only secret messages A comprised within public images 21-*img*, and where secret messages A are perceived as either 2D if projected from a single projector, or optionally 3D if projected from two projectors.

In the following description, numerous specific details are set forth, such as examples of specific components, types of usage scenarios, etc. in order to provide a thorough understanding of the present disclosure. It will be apparent, however, to one skilled in the art that the present disclosure may be practiced without these specific details and with alternative implementations, some of which are also described herein. In other instances, well known components or methods have not been described in detail in order to avoid unnecessarily obscuring the present disclosure. Thus, the specific details set forth are merely exemplary. The specific details may be varied from and still be contemplated to be within the spirit and scope of the present disclosure.

DETAILED DESCRIPTION OF THE INVENTION

Figure 1:
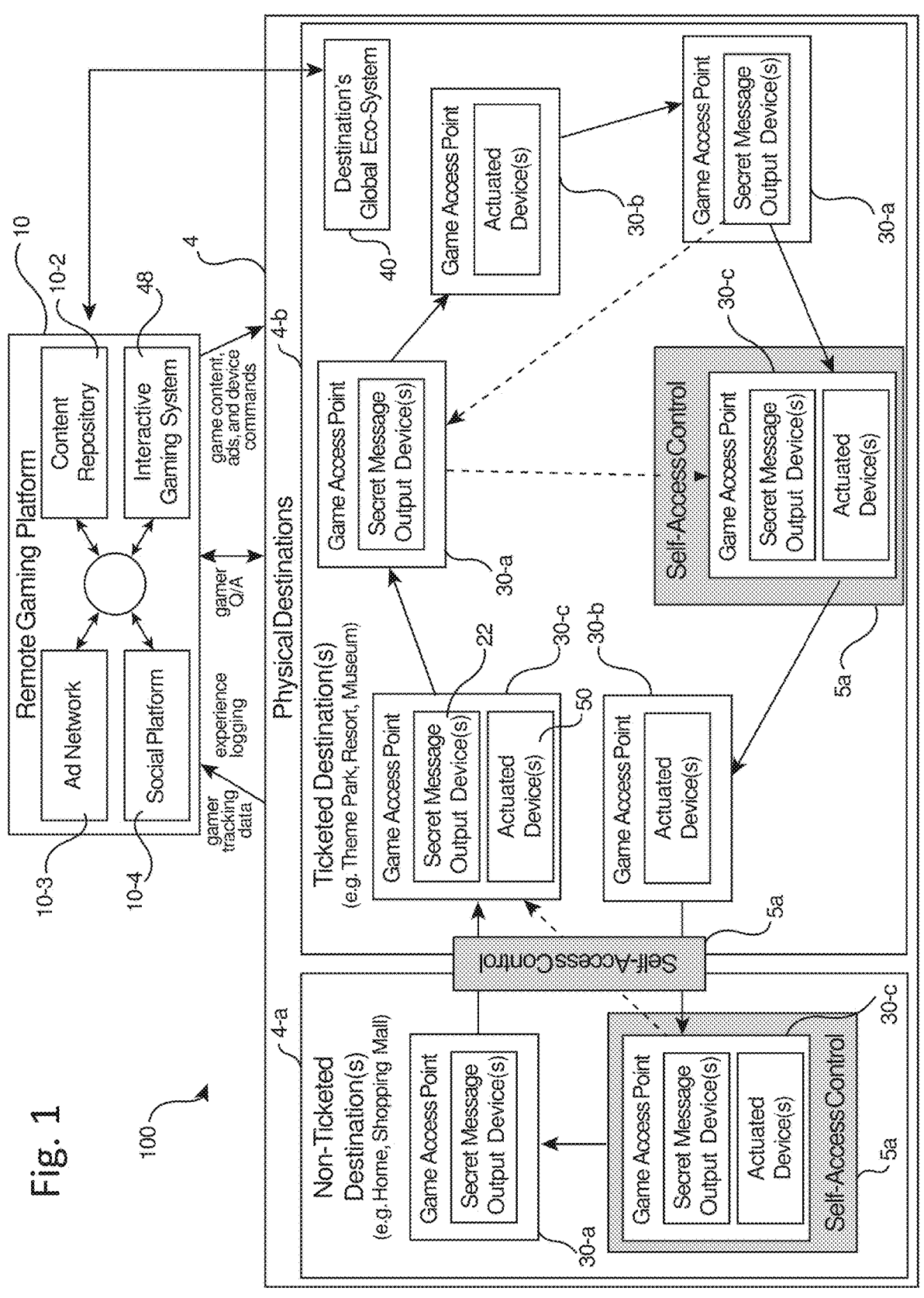
FIG. 1 is a block diagram of the overall structure of system 100, comprising a remote gaming platform 10 that services a multiplicity of physical destinations 4, where each destination comprises one or more game access points 30, and where each game access point 30 comprises gamer input and output devices including a secret message output device 30 or actuated device 50. Gaming platform 10 further comprises interactive gaming system 48 that exchanges information with content repository 10-2, ad network 10-3 and social platform 10-4. Physical destinations 4 are either ticketed destinations 4-*b* with optional self-access control 5*a*, or non-ticketed destinations 4-*a*. Ticketed destinations 4-*b* include the destination's global eco-system 40, that comprises information known and tracked regarding the destination's guests as well as information related to the destinations attractions, products, services, etc.

Referring FIG. 1, there is shown a block diagram depicting the overall structure of game theater system 100, where remote gaming platform 10 services a multiplicity of physical destinations 4-*a* and 4-*b*, where non-ticketed destinations 4-*a* include homes, shopping malls, resorts, casinos, gaming restaurants, and ticketed destinations 4-*b* include theme and amusement parts, museums, sporting and music venues and air-ports. Other anticipated physical destinations for use with the present and related co-pending applications that may or may not comprise restricted access (such as a ticketing or badge system) include colleges, universities and retirement communities. Regardless of the type of physical destination, 4-*a* or 4-*b*, each physical destination comprises one or more fixed or movable game access points such as 30-*a*, 30-*b* and 30-*c*, where all access points share common features especially including: 1) the ability to detect the proximity of one or more gamers 2s (not depicted in FIG. 1) or one or more mobile gaming devices 60 (also not depicted in FIG. 1), and 2) the ability to exchange information with a gamer 2s using input/output means such as herein described for receiving gamer 2s game actionable responses or providing to the gamer 2s game challenges, tasks, questions, clues, etc. or otherwise game content, 3) the ability to exchange information such as gamer 2s input/output with the remote gaming platform 10 over any available communications network including the internet, and where access points 30-*a* further comprise a secret message output device 22, access points 30-*b* further comprise an actuated device 50, and access points 30-*c* further comprise both a secret message output device 22 and an actuated device 50.

Access to ticketed physical destinations 4-*b* such as theme parks is controllable using a self-access control 5a apparatus and methods as taught in the related co-pending U.S. Non-Provisional application Ser. No. 16/055,078 entitled THEME PARK GAMIFICATION, GUEST TRACKING AND ACCESS CONTROL SYSTEM. To be further reviewed in upcoming FIG. 2, self-access control 5a includes the use of a smart ticket 2, where the ticket 2 includes a remotely detectable ID for use in automatically tracking a guest of the destination as they move about within and throughout the destination 4-*b*.

As taught in the co-pending application Ser. No. 16/055, 078, self-access control 5a can be used to control access to the entire physical destination 4-*b* (referred to as a "venue" in the co-pending application,) or what was referred to as a "sub-venue" that is any area within the venue including for example a fast lane for a theme park ride. The present application further teaches that this same self-access control 5a is preferably used in any of its prior taught variations to also control access to any of the multiplicity of individual game access points such as 30-*a*, 30-*b* or 30-*c*, in either a ticket destination 4-*b* or a non-ticketed destination 4-*a*.

As will be appreciated by those skilled in the art of destination management, the ability to limit access provides the option of charging for access, but then typically also requires the verification of proof-of-ticket and valid ticket ownership. For theme parks and museums, this verification typically requires staffing and/or sophisticated technology including a commonly shared fingerprint reader that requires guests to provide sensitive personal information and exposes them to public germs. The prior co-pending application in combination with the present invention teaches an important feature of a gaming theater, where the addition of the gaming theater to a physical destination continues to provide for ticketed/paid access while also not requiring additional staffing by the physical destination and not requiring the destinations guests to share personal information such as their fingerprint or facial image or to be exposed to public germs. Another advantage of these teachings is that individual game access points 30 can be further restricted even within a single physical destination 4-*a* or 4-*b*, thus providing for multiple paid levels of gaming activities.

Still referring to FIG. 1 and as prior stated, another advantage of the self-access control 5a apparatus and methods as prior taught in the co-pending application Ser. No. 16/055,078, is that destination guests can be tracked to specific locations, e.g. in a theme park a building, a public area, a ride and even a ride seat using any of a combination of technologies prior taught. This same prior taught smart ticket 2 (see FIG. 2 herein) apparatus and methods are useable for determining the proximity of a destination visitor such as a gamer 2s (not depicted in FIG. 1,) or a mobile gaming device 60 (see FIG. 2 herein) carried by the gamer 2s with respect to a specific game access point such as 30-*a*, 30-*b* or 30-*c*. As access points such as 30-*a*, 30-*b* or 30-*c* detect the incoming and outgoing presence of a particular gamer 2s and/or any of their mobile devices 60, this information is then automatically aggregated and transmitted from the destination 4-*a* or 4-*b* to the remote gaming platform 10, where it is received and processed by at least the interactive gaming system 48. The present application and prior co-pending applications anticipate that this detected gamer 2s presence at a specific physical destination location including a game access point 30, is also usable to automatically trigger the capturing of photos and other related information such as the time and location of the captured photo for either automatic or controlled distribution via the social platform 10-4, where social platforms include for example Facebook, Twitter, Instagram, Snapchat, What's App, emails, texts and any other commonly shared social network. This feature is herein generally referred to as experience logging.

The present application further anticipates that upon detecting a gamer 2s's presence at a game access point 30, ad network 10-3 will process algorithms considering for example the gamer 2s's persona, game state as well as the particular destination and game access point 30 identities to select and provide an advertisement to the gamer 2s, using for example an available secret message output device 22, an actuated device 50 (e.g. by outputting an audible message,) or the herein taught magnifying glass 15 (see FIG. 3) form of a secret message imaging glass that will be herein shown to include multiple user interface means for displaying information. Network 10-3 either provides an advertisement directly to a gamer 2s through any of the available communication paths, and/or provides the advertisement to interactive gaming system 48 for incorporation with the game being played and presented to the gamer 2s. Similar to network 10-3, content repository 10-2 provides any of available multi-media content either directly to the gamer 2s triggered by a detection of the gamer 2s at a game access point 30, or to interactive gaming system 48 for incorporation with the game being played and presented with the gamer 2s, where the multi-media content includes video, secret video and audio. The content repository 10-2 is also anticipated to receive images and video of gamers 2s captured by system cameras (not depicted) as the gamers 2s interact with a particular game access point 30, where the received experience logging images and video is optionally provided to either the interactive gaming system 48 for incorporation as game content, the social platform 10-3 for distribution as social content, or the ad network 10-3 for combination and use with other ad content.

In the related co-pending U.S. Non-Provisional application Ser. No. 15/975,236 for an INTERACTIVE OBJECT TRACKING MIRROR-DISPLAY AND ENTERTAIN-MENT SYSTEM the present inventor anticipated that at least each of the ticketed physical destination 4-b included a global eco-system 40 that further comprised a guest tracking system 46 as well as administration systems 41 (see FIG. 2) including both a theme park administration system 42 and a hotel administration system 44 (see co-pending application FIG. 4.) The co-pending application also anticipated that the global eco-system 40 included the interactive gaming system 48, which is herein shown to be alternatively included within remote gaming platform 10 as a preferred means for a single gaming platform 10 to service multiple physical destinations 4-a and 4-b with possibly unrelated ownership as a cloud services, as will be well understood by those familiar with software architecture including software as-a service (SAAS) models. As will be well understood by those familiar with ticketed destinations, it may be desirable to maintain some or all of interactive gaming system 48, content repository 10-2, ad network 10-3, or social platform 10-4 within the exclusive control of the physical destination global eco-system 48, as opposed to sharing the information on the remote gaming platform 10. As such, the configuration presented in FIG. 1 should be considered exemplary, as many variations are possible without departing from the scope of the present invention.

Still with respect to FIG. 1, gaming platform 10 provides game challenges, tasks, questions, clues, etc. or otherwise game content to a gamer 2s and receives gamer 2s's "actionable responses" that are for example answers or information interpretable as answers, or otherwise proof of the completion of a challenge, task or mission, etc. Several apparatus and methods are herein described and have been prior described in the related applications for exchanging game input/output between the gaming platform 10 and a gamer 2s, where a special focus has been and is herein continued with respect to the output of secret message that are substantially only received by one or more controllably selected gamers 2s and otherwise not perceivable to any other not selected gamers 2s or on-lookers. While the present invention places a significant focus on only certain types of gamer input/output apparatus and methods, this should not be considered as a limitation of the present invention, as other apparatus and methods will be understood as useful for accepting input or providing output to a gamer 2s through any of the fixed or movable game access points 30. However, there is herein a general focus on either secret message output devices 22, actuated devices 50 or mobile gaming devices 60 (see FIG. 2.)

Gaming platform 10 also provides any of game content, ads and (actuated) device commands via its communications link with any of the game access points 30 within any of destinations 4-a or 4-b. As will be appreciated by those skilled in the arts of communication networks and local versus remote processing, it is possible that much of the higher bandwidth information such as game content from repository 10-2 be stored locally within a given game access point 30, and where gaming platform 10 sends commands to the given game access point 30 to output any of this locally stored content, i.e. as opposed to for example streaming this content from the cloud to the given game access point 30. As such, the configuration presented in FIG. 1 should be considered exemplary, as many variations are possible without departing from the scope of the present invention.

Referring next to FIG. 2, there is shown a variation of the teachings of the prior co-pending U.S. Non-Provisional application Ser. No. 15/975,236 entitled INTERACTIVE OBJECT TRACKING MIRROR-DISPLAY AND ENTER-TAINMENT SYSTEM, especially as these teachings relate to a global environment eco-system 40 and local environment eco-system 30. The prior co-pending application taught what is herein generally referred to as a secret message output device 22 and what was prior specifically referred to as a mirror/display 20 (see e.g. FIGS. 1 and 2A of the co-pending application.) This secret message output device 22 accepted input from, and provided output to a guest of a destination, where the examples of the co-pending application focused on a theme park. Anticipated physical locations for the device 22 included inside of the theme park or in a hotel room, either as a mirror/display or simply a display without a mirror apparatus. The device 22 optionally included means for detecting the presence and identity of a guest as well as tracking the gestures of an article 12 such as a wizard's wand being moved by the guest, where the gestures where interpretable as commands. The co-pending application further specified that the secret message output device 22 was capable of working with a local interactive gaming system 36, other local environment sensors 32 for sensing any of a number of conditions in the local environment as well as an environment control system 34 for actuating or controlling any number of devices for creating local environment effects. The co-pending solutions anticipated that the guest would be connecting with other guests in a destination (theme park) wide game, where also the guest's local environment would become responsive to the state and changes in the game, e.g. automatically making thunder sounds while flashing lights.

Still referring to FIG. 2 herein, the prior co-pending application roughly divided the information systems necessary for providing the prior taught functions into a local environment eco-system 30 and a global environment eco-system 40. The local system 30 is herein renamed to a game access point 30 and continues to include the apparatus and methods generally taught in the co-pending application as environment sensing system 32, environmental control system 34 and interactive gaming system 36. The global environment system 40 still preferably includes guest tracking system 46 and administration system 41, while the global interactive gaming system 48 is herein taught as separate from global eco-system 40, instead becoming a part of remote gaming platform 10. For destinations such as a theme park that includes multiple resorts, administration system 41 would preferably comprise a theme park admin- istration system 42 separate from any one or more hotel administration systems 44 (see prior application for depic- tion of 42 and 44.)

Still referring to FIG. 2 herein, and specifically to the functions of guest tracking, the present inventor is also co-pending for an U.S. Non-Provisional application Ser. No. 16/055,078 entitled THEME PARK GAMIFICATION, GUEST TRACKING AND ACCESS CONTROL SYS- TEM. In this co-pending application, guest tracking was shown to rely upon a smart ticket 2 that preferably included some form of an extended range readable ID, preferably in the form of a passive RFID. The prior application made note that such systems were well known in the art for tracking individuals, especially as they passed through physical "choke-points" leading into or out of a desired tracking location, for example a specific ride at a theme park. The prior application expanded upon the state-of-the-art to use additional technologies including pressure sensing plastics and fabrics, as well as cameras and image analysis, to combine with new methods for organizing and processing information in order to provide guest tracking down to the granularity of a single ride seat on a theme park ride. The smart ticket 2 was also taught to include a "venue app" (i.e. destination app) running on the guest's smart phone, where this app allowed the guest to provide sensitive personal information such as their fingerprint or image for proving their own identity without requiring touching a commonly shared fingerprint reader, ultimately allowing guests to self- control their own access to restricted areas without requiring the addition of destination staff.

The apparatus and methods for sensing the presence and proximity of a guest as they entered what is herein referred to as a game access point 30 (still including a ride at a theme park,) were shown to fit within the earlier generalized teachings within the co-pending U.S. Non-Provisional appli- cation Ser. No. 15/975,236 for an INTERACTIVE OBJECT TRACKING MIRROR-DISPLAY AND ENTERTAIN- MENT SYSTEM with respect to local eco-system 30's environment sensing system 32. As such, the guest tracking apparatus and methods for locally sensing the guest remain a part of sensing system 32 and are so depicted in the present FIG. 2, whereas guest tracking system 46 is representative of the global destination-wide software and database necessary for tracking the multiplicity of individual guest's move- ments across the multiplicity of game access points 30. Hence, local apparatus for detecting guest presence remain within game access points 30, whereas the resulting guest tracking information first determined by all access points 30 is then collectively associated and managed within guest tracking system 46, and it is preferably guest tracking system 46 as a part of global eco-system 40 that communi- cates gamer (guest) tracking data to remote gaming platform 10.

The present application continues to teach that the same apparatus for tracking the proximity of guests (and therefore the sub-set of guests who are also gamers) with respect to a game access point 30 are sufficient for detecting the presence of what is herein referred to as mobile gaming devices 60. In the prior co-pending U.S. Non-Provisional application Ser. No. 15/975,236 for and INTERACTIVE OBJECT TRACK- ING MIRROR-DISPLAY AND ENTERTAINMENT SYS- TEM, the present inventor taught apparatus and methods for tracking secret message eye glasses 14 used by a gamer (guest 2s in the co-pending application) to reveal secret messages, where the apparatus including Bluetooth, wi-fi local positioning systems as well as image processing of the emission of non-visible light by LEDs embedded within the glasses 14. The present application generally refers to secret message eye glasses 14 and prior taught article 12 (e.g. a wizard's wand) as mobile gaming devices 60, and will herein teach additional devices 60. As with the tracking information detected by the apparatus and methods of the game access point 30 with respect to guests and gamers, the tracking information detected with respect to all mobile gaming devices 60 is communicated to global guest tracking system 46 for additional communication to interactive gam- ing system 48. Especially when tracking game toys such as article 12, the tracking apparatus and methods were gener- ally taught as local interactive gaming system 36, where gaming system 36 generally also comprises the secret mes- sage output devices 22, as taught both prior and herein, all as depicted with respect to the present FIG. 2.

What is most important to understand about the relation- ship between the prior co-pending applications and the present invention is that the original teachings for a mirror/ display 20 in communications with a local environment eco-system 30 and global environment eco-system 40 where further detailed to specify a guest tracking and self-access 5a system using a smart ticket 2, where the guest tracking information is aggregated into the global guest tracking system 46 thus providing valuable information for destina- tion wide-gaming. Specific examples where also provided of actuated devices 50 including theme park ride examples of positioned, time special effects 56a and positioned un-timed special effects 56b, thus providing valuable physical means for effecting a gamer that worked in conjunction with the virtual means of outputting secret messages for viewing through prior taught eye glasses 14. The present application further delineates and expands upon these teachings by moving the global interactive gaming system 48 away from the exclusive domain of the destination (i.e. global eco- system 40) to a remote function capable of simultaneously serving multiple destinations providing a valuable extension to the gaming system. The present application also gener- alizes the mirror/display 20 into a secret message output device 22 and teaches a second projection-based apparatus and method for achieving a similar effect from the perspec- tive of both the gamer and non-gamer. The prior eye glasses 14 are generalized as secret messaging image devices within a broader category of mobile devices 60, a category that also includes game toys such as prior example wand 12. A new alternative imaging glass is herein taught in the form of a magnifying glass 15 and a new interactive game toy is taught in the form of a sword 62-*swd* (see FIGS. 11 and 12) and a gun 62-*gun* (see FIG. 13).

Referring now to FIG. 1 and FIG. 2, as will be well understood by those familiar with sophisticated hardware and software architectures such as described in the present and co-pending applications, many variations exist, and therefore the preferred and alternative apparatus and meth- ods as taught should be considered as exemplary, rather than as limitations of the present invention. The scope of the present system includes any gaming system that provides secret messages to gamers 2s while simultaneously provid- ing public images to non-gamers 20, a very important feature for converting a themed destination 4-*a*, 4-*b* into a gaming theater 100 without adversely affecting the experi- ences of the non-gamer 20. The scope also includes inde- pendent game access points 30, with or without separate gamer self-serve access 5a, where each access point is capable of minimally: 1) detecting and tracking the presence of the gamer 2s and any of the gamer's mobile gaming devices 60 including secret imaging devices, game clothing and game toys, 2) communicating with an interactive gaming 48 system capable of managing games limited to a single physical destination 4-a, 4-b or extending across multiple physical destinations 4-a, 4-b, especially where the destinations 4-a, 4-b have different ownership, themes, ticketing, control systems, etc., 3) controlling any combination of secret message output devices 22 and actuated devices 50 with respect to a gaming system that in part uses the detected and tracked gamer 2s and mobile gaming device 60 information to controllably alter the gaming experience of an individual gamer 2s, including the presentation of ads 10-3 and content 10-2 along with the exchange of game questions and answers, and 4) automatically capturing images and video of any of the multiplicity of gamers 2s for aggregation in a content repository 10-2 or distribution across any social media platform 10-4, where the images and video are associable based upon the tracking information associated with individual gamers 2s, and where the aggregated information further includes any of the other data representative of the gamer 2s's individual experiences such as questions and answers, achievement levels, persona, etc.

The present invention will expand upon this scope to further include amongst other important features any destination gaming system that: 5) provides gamer identification information for embedding within or associating with one or more products sold by destination shops, where the products are then used by the gamer 2s as mobile gaming devices 60 at one or more game access points 30, where the products as devices 60 are then automatically detected and tracked by the access points 30, and where the tracking information is used at least in part to effect the gaming experience of the gamer, 6) provides gamer information to a destination store, for example selling food or merchandize to the gamer 2s, where the gamer information is used at least in part to determine any of sales benefits that effect the gamer 2s's final sale, including products available to purchase, price or discounts, 7) provides gamer information to a destination store, for example selling food or merchandize to the gamer 2s, where the store at least in part uses this information in combination with store information regarding the purchased products or services to output game information on the gamer's sales receipt, where the game information includes visible markings such as text, pictures or bar codes or non-visible markings such as made using non-visible ink, and where the gamer 2s uses a mobile game device 60 to either enter the game information or capture an image of the game information, and where the entered or captured image of the game information are used at least in part as a gamer's actionable response for effecting the gaming experience of the gamer, 8) provides an automatic vending system comprising any form or structure, where the vending system that is connected to the gaming system preferably as an actuated device 50 in conjunction with a game access point 30, where the gamer 2s interacts with the vending system to cause a product to be dispensed to the gamer including a mobile gaming device 60, where the dispended products as devices 60 are then automatically detected and tracked by the access points 30, and where the tracking information is used at least in part to effect the gaming experience of the gamer, 9) provides a mobile gaming device 60 such as the herein taught magnifying glass 15 including apparatus and methods for directing a gamer on a search to find any one or more destination locations including a specific game access point

30 or any other pre-known destination location that is not a game access point 30, 10) provides a mobile gaming device 60 such as the herein taught magnifying glass 15 including apparatus and methods for providing a visible "key" output on the imaging device that can be visually aligned to a visible "lock" embedded or attached to the destination 4-a, 4-b, where the gamer 2s aligns the key with the lock and captures an image of the combined symbol, and where the image of the combined symbol is used at least in part to effect the gaming experience of the gamer, 11) where a gamer 2s interacts with a game toy that is tracked at a game access point 30, and where images are output at least in part in response to the detected presence or movements of the gamer or game toy, 12) where a gamer 2s interacts with a game toy that is detected at a game access point 30, and where the game access point sends signals to the game toy that cause physical changes to the toy including vibration and outputting light, 13) where a gamer 2s uses an secret message image device 22 such as prior taught eye glasses 14 or herein taught magnifying glass 15 to capture images that are transmitted to the gaming system for processing in order to classify and identify objects within the captured images, and where the resulting classification or identification information are used at least in part as a gamer's actionable response to effect the gaming experience of the gamer, 14) where a gamer uses an secret message imaging device such as prior taught eye glasses 14 or herein taught magnifying glass 15 to first emit non-visible energy such as ultraviolet light to expose a secret message formed using invisible ink, where the gamer 2s then uses the imaging device to capture an image of the secret message, and where the secret message is used at least in part as a gamer's actionable response to effect the gaming experience of the gamer, 15) where a gamer 2s uses a secret message imaging device such as prior taught eye glasses 14 or herein taught magnifying glass 15, or the gamer 2s uses their smart phone running a game app to capture images of either a themed character or another guest prior to that character or another guest first capturing their image, where the timing of the capturing of images by gamers 2s with respect to themed characters or other guests is then used at least in part as a gamer's actionable response to effect the gaming experience of the gamer 2s, or 16) where a gamer 2s uses a secret message imaging device such as prior taught eye glasses 14 or herein taught magnifying glass 15, or the gamer uses their smart phone running a game app to capture images of any destination location, object or symbol, or secret messages, where any of the images or the timing or the sequence of their capture is then used at least in part as a gamer's actionable response to effect the gaming experience of the gamer.

Figure 3:
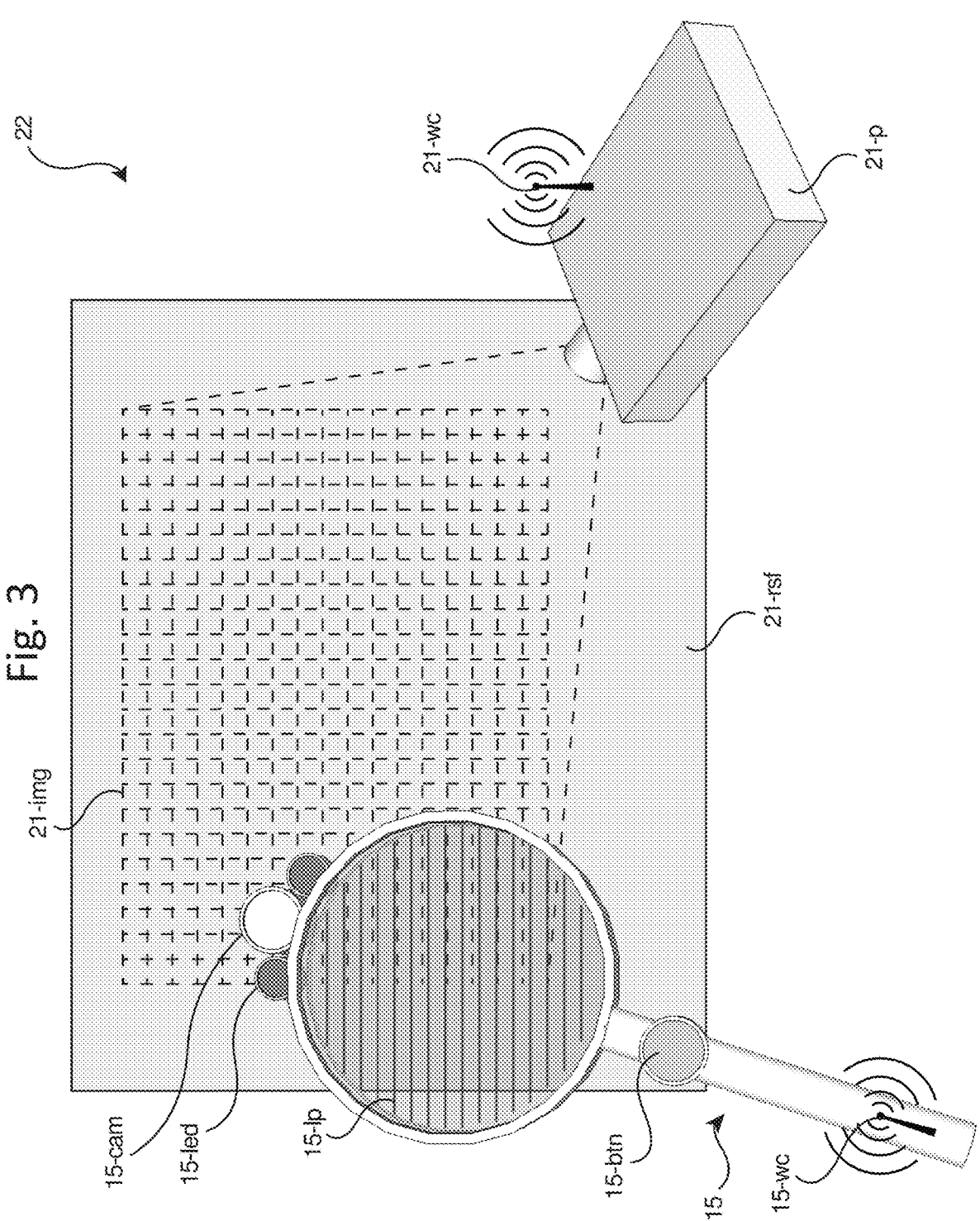
FIG. 3 is a perspective view of a secret message output device 22 comprising a projector 21-*p* for projecting a public image 21-*img* for reflecting off a reflective surface 21-*rsf* to be viewed through a magnifying glass 15. Magnifying glass 15 comprises a polarizing lens 15-*lp*, leds 15-*led*, camera 15-*cam*, wireless communication 15-*wc* and button(s) 15-*btn*. Wireless communication 15-*wc* is capable of communication with wireless communication 21-*wc* included with projector 21-*p*.
Figure 4:
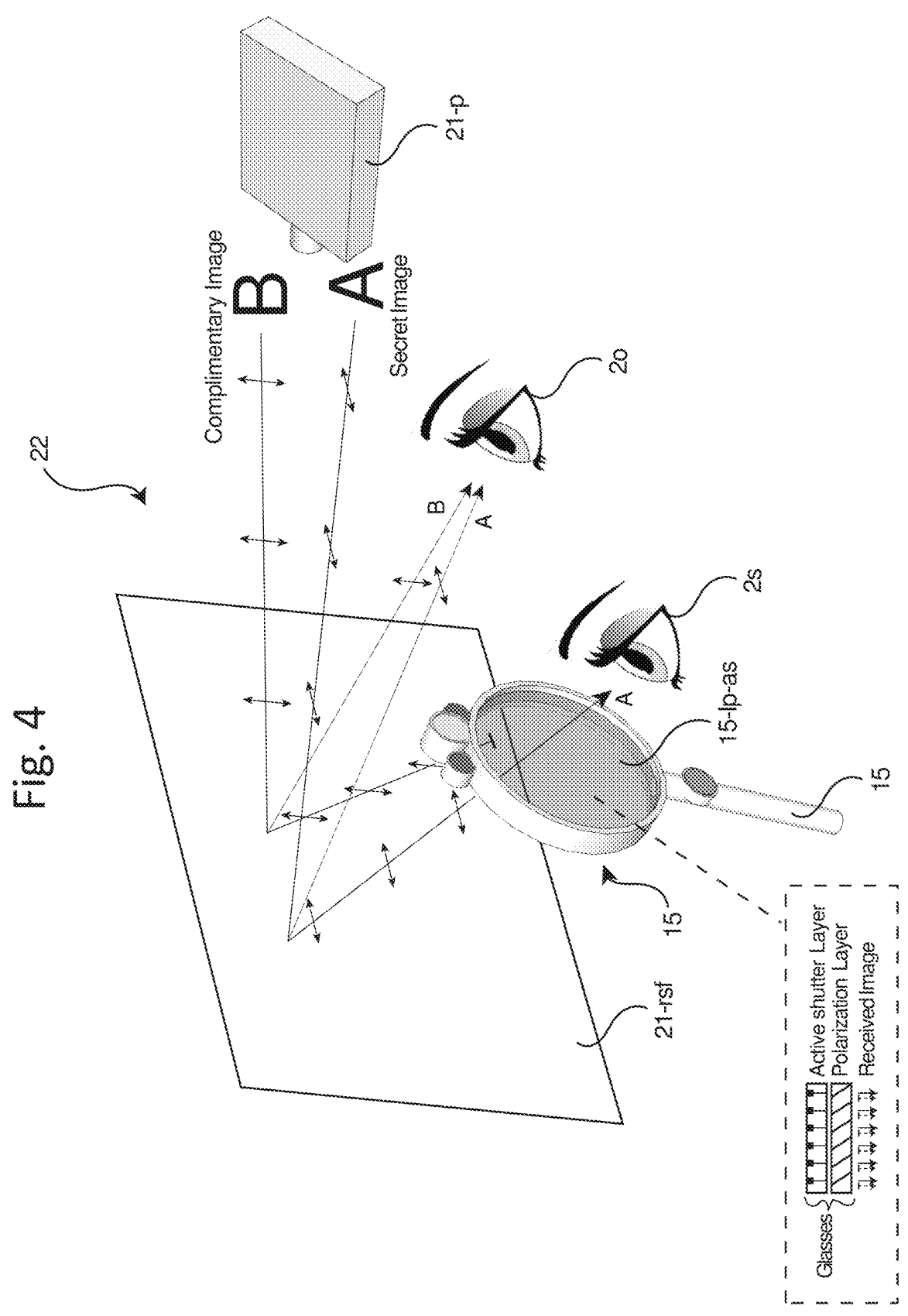
FIG. 4 is a perspective view of secret message output device 22 comprising a projector 21-*p*, where projector 21-*p* outputs both a secret message image A oriented at a first polarization and complimentary image B orientated at a second polarization that is orthogonal to the first polarization, where the combination of images A and B are perceived by a viewer 20 using the naked eye as a public image 21-*img* that is different from secret message image A, and where magnifying glass 15 uses lens 15-*lp-as* to selectively transmit only images A such that a gamer 2*s* using glass 15 perceives secret message images A and not the combined A and B public image.

Referring next to FIG. 3, there is shown a perspective view of a secret message output device 22 for providing a public image 21-img output by an image projection source 21-p for receiving through an secret message imaging device such as magnifying glass 15 or eye glasses 14, where the public image 21-img further comprises a secret image A polarized in a first orientation as well as an orthogonally polarized complimentary image B (as to be discussed in greater detail with respect to upcoming FIG. 4,) and where substantially only the secret image A is viewable through the magnifying glass 15 (or eye glasses 14) and only the public image is viewable with the naked eye. The present application is a continuation-in-part of U.S. Non-Provisional application Ser. No. 15/975,236 entitled INTERACTIVE OBJECT TRACKING MIRROR-DISPLAY AND ENTERTAINMENT SYSTEM. The base patent taught the output of public and secret images using various display technologies especially including an LCD display fitted with a second modulator, where the second modulator encoded the secret image within the output public image. The base patent also anticipated the use of projection systems for outputting a secret image within a public image 21-*img* as will be herein described in greater detail.

Referring now to both FIG. 3 and FIG. 4, image projection source 21-*p* may be a single projector 21-*p* capable of outputting the public image 21-*img* comprising the secret A and complimentary B images, where the secret and complementary images have orthogonal polarizations, such as left/right circular or vertical/horizontal linear. The secret message imaging device such as magnifying glass 15 includes an appropriately selected polarizer for substantially blocking the complimentary image B while also transmitting the secret image A (as shown in detail in FIG. 4.) As will be well understood by those familiar with polarization systems, if the complimentary image B portion of public image 21-*img* is output by projector 21-*p* with a vertical polarization, and then is reflected off a reflective surface 21-*rsf* comprising a metallic versus non-metallic paint, the complimentary image B portion will substantially retain its vertical polarization. Likewise, if the secret image A portion of the public image 21-*img* is output by projector 21-*p* with a horizontal polarization, and then is reflected off a reflective surface 21-*rsf* comprising a metallic versus non-metallic paint, the secret image A portion will substantially retain its horizontal polarization. As will also be well understood by those familiar with polarization systems, if the magnifying glass 15 includes a polarization film placed such that its direction of polarization is essentially horizontal to the vertical axis of the magnifying glass 15, then if the magnifying glass 15 is held in a substantially vertical/upright position with respect to the reflective surface 21-*rsf*, the orientation of the polarizing film 15-*lp* will be parallel with the horizontally polarized reflection of the secret image A, such that the secret image A will be viewable through the magnifying glass 15. As will be further understood, in this orientation between the magnifying glass 15, reflective surface 21-*rsf* and projector 21-*p*, the complimentary image B portion of public image 21-*img* will be substantially blocked.

Still referring to FIG. 3 and FIG. 4, as the same magnifying glass 15 is rotated by 90 degrees, e.g. such that the magnifying glass 15 handle is held in a substantially horizontal/sideways position with respect to the reflective surface 21-*rsf*, the orientation of the polarizing film 15-*lp* will become vertically aligned and therefore now perpendicular with the horizontally polarized reflection of the secret image A, such that the secret image A will be substantially blocked by the linear polarizer 15-*lp* of the magnifying glass 15, while the complimentary image B will be transmitted. The present inventor anticipates that this variability will be an attractive feature for the user of the magnifying glass 15, as it adds to the suspense of the secret message. However, as will be discussed later in the present application with respect to upcoming FIGS. 5A, 5*b* and 5*c*, at least three means are provided for automatically adjusting magnifying glass 15 apparatus such that the secret images A contained within the public images 21-*img* are always substantially viewable through magnifying glasses 15 (or eye glasses 14) while the complimentary images B are always substantially blocked.

Referring now to FIG. 3, also depicted are wireless communication means 21-*wc* within projector 21-*p* and wireless communication means 15-*wc* within magnifying glasses 15. As will be well understood by those familiar with 3D imaging systems and from a careful reading of the present invention's parent application U.S. Non-Provisional application Ser. No. 15/975,236 entitled INTERACTIVE OBJECT TRACKING MIRROR-DISPLAY AND ENTERTAINMENT SYSTEM, it is possible to emit secret images A within public images 22 that are timed through communication between means 21-*wc* and 15-*wc* with the opening and closing of an LCD active shutter placed over linear polarizer 15-*lp* on magnifying glass 15. As described in detail in the base co-pending application, if several users of a secret message imaging device, such as eye glasses 14 (shown in FIG. 5 of the parent application,) or magnifying glass 15 shown in the present figure, are standing in front of a reflective surface 21-*rsf* at the same time, then each use will see the same secret message A assuming that their secret message imaging device such as magnifying glass 15 is properly oriented to the polarization angle of the secret images A, all as will be well understood by those familiar with polarization systems and from a careful reading of the base and present applications. What is preferable, and as taught in the base co-pending application, by combining an active shutter with the linear polarizer 15-*lp*, it is possible to send control signals to all imaging devices (e.g. magnifying glass 15 or eye glasses 14) that are in view of the reflective surface 21-*rsf*, such that the active shutter layer on all imaging devices that are not intended to see the secret image A is caused to be opaque at the same time that a secret image A is output by projector 21-*p*, whereas the active shutter layer on all imaging glasses that are meant to see the secret image A is caused to be transparent at the same time that a secret image A is output by projector 21-*p*. Hence, the ability of an secret message imaging device such as magnifying glass 15 taught in the present invention or eye glasses 14 taught in the base application to transmit a secret image A for viewing by a viewer/gamer 2*s* is dependent upon the type (e.g. circular versus linear) and orientation (e.g. left/right or vertical/horizontal respectively) of the polarization layer of the imaging glass, and can be made further dependent upon the opacity of an active shutter layered onto the polarization layer, where without an active shutter layer all users of appropriate imaging devices will see the same secret image A and with an active shutter layer it is possible to restrict the secret images A to a select one or more imaging devices.

Still referring to FIG. 3, as will be understood by those familiar with 3D projection systems, LCD technology and from a reading of the parent application U.S. Non-Provisional application Ser. No. 15/975,236, there are several well-known apparatuses for implementing projector 21-*p*. For example, one approach is to use two projectors 21-*p*, where a first projector 21-*p* outputs the secret image A while the second projector outputs the complimentary image B, spatially aligned on surface 21-*rsf* so as to create public-secret image 22. This technique is well understood for projecting left-eye/right-eye spatially aligned images in a 3D movie theater projection system. As will be well understood by those familiar with human vision, the naked eye viewing the reflective surface 21-*rsf* will combine the secret A and complimentary B images into what the viewer will perceive to be a single public image 21-*img*. As will also be understood, if the secret image A is output simultaneously or near simultaneously with the complimentary image B, then light from the two images is perceived as additive, as such the intensity values of red, green and blue in the secret image A will add to the intensity values of red, green and blue in the complimentary image B. Using this understanding, it is possible to create a secret image A that for example contains some text, e.g. using pixels set to a red intensity of 128, a blue intensity of 128, and a green intensity of 0. The remaining non-text pixels in the secret image A are then displayed for example with a red intensity of 0, a blue intensity of 0, and a green intensity of 0. As seen through the magnifying glass 15 held at the proper orientation so as to only transmit the secret image A, the user 2s (see FIG. 4) of the magnifying glass 15 will see magenta (red-blue) text with a background color matching the ambient lighting colors reflected off of reflective surface 21-rsf (since the light comprising complimentary image B is blocked by magnifying glass 15.)

If simultaneously, or near-simultaneously a complimentary image B is then also output that for example contains pixels that are spatially aligned at the reflective surface 21-rsf with the text of secret image A, and these complimentary B text pixels are set to a red intensity of 128, a blue intensity of 128, and a green intensity of 256, then these complimentary B text pixels will cause the naked eye to see the secret image A text as being white (rather than magenta.) In this example, the RGB values of the secret message A text and complimentary image B text add up to be red=256, blue=256 and green=256, which is then perceived by the naked eye as white of intensity 256. The careful reader will note that in the present example, all non-text pixels in both the secret image A and complimentary image B are set to RGB values of 0, thus providing no additional light to the naked eye beyond the reflection of the ambient lighting off reflective surface 21-rsf. Under circumstances of a well-lit room such as in a museum, this is expected to be ideal as this minimizes the overall output of light. However, the following possibilities are illustrative of the range of uses of the present invention. First, all of the non-text pixels in the complimentary image B could be set to RGB values of 256, and thus all pixels in the public image 21-img would have RGB values of 256 yielding an even intensity of white 256 across the entire surface 21-rsf. Second, all of the non-text pixels in the secret image A could be set to some RGB values giving the non-text portion of secret image A some particular color (ideally not magenta,) including for example white at a lower intensity of 50, where then the non-text pixels of complimentary image B are appropriately set such that the addition of the individual R, B and G intensity values for each non-text A and B pixel arrives at some common value, again for example 50. With all non-text pixels set to a combined red=50, blue=50 and green=50, then the non-text portion of the public image 21-img will be perceived as a white light of intensity 50, whereas the text portion of the public image 21-img will be perceived as white light of intensity 256. Again, the careful reader will see that many variations are possible for accomplishing different goals for public image 21-img while still outputting the same secret message A.

This same principal of additive light and human perception applies to both temporal as well as spatial perception. In other words, rather than using two projectors 21-p to simultaneously output the secret A and complimentary B images, thus spatially combining the images on reflective surface 21-rsf at the same moment in time, it is possible to use a single projector that temporally alternates between the output of a secret image A and the complimentary image B, at a frame rate fast enough so that the naked eye combines any two subsequent images, all as will be well understood by those familiar with human perception and movie display systems. Manufacturers such as RealD sell a push-pull electro-optical liquid crystal modulator that is placed immediately in front of a single projector 21-p (or computer screen) for alternately polarizing the light from each subsequent video frame. Known as the "ZScreen," the alternating images are left-circularly polarized and then right-circularly polarized. As will also be well understood by those familiar with 3D projection systems, it is possible to use a similar approach but to alternate between vertical-linear polarization and horizontal-linear polarization. Either method is considered sufficient for the workings of the present invention, although the circular polarization approach offers the advantage that as the magnifying glass 15 is rotated, the secret image A will still be transmitted, and the complimentary image B will still be blocked, all as is well known in the art.

As the careful reader of the parent U.S. Non-Provisional application Ser. No. 15/975,236 will see, it is also possible to build an LCD display for outputting a public image in its final red, blue and green intensity values, and then to adapt this LCD display with an overlaid second modulator which then further encodes this public image with a secret image A. Since the LCD display outputs the public image in a specific linear polarization orientation, the second modulator will twist this light up to 90 degrees on a pixel-by-pixel basis, encoding it such that the linear polarizer 15-lp in the magnifying glass 15 will act as an analyzer revealing the secret image A by essentially cutting off various amounts of the red, blue or green light in the public image. This can be thought of as a subtractive, rather than additive technique. By using projectors that work with linear polarization rather than circular polarization, the magnifying glass 15 of the present invention, as well as the eye glasses 14 taught in the base application, will work with both the secret image A output by a first projector 21-p adding to the complimentary image B subsequently output by the first projector 21-p (or simultaneously output by a second projector 20-p,) as well as the encoded secret image A being subtracted from the public image output by an LCD display that has been further adapted to include a second modulator as taught in the parent patent. However, using linear polarizers for 15-lp within magnifying glass 15 brings up the issue where a user must then properly align the magnifying glass 15 to the reflective surface 21-rsf and projector 21-p, all as prior discussed. Also, as prior discussed, this is anticipated to be an acceptable effect contributing to the mystery of the secret message. It is also noted that the preferred addition of an active shutter overlaid onto linear polarizer 15-lp in magnifying glass 15 works to perform the prior stated goals (and as taught in the base application,) regardless of the orientation of the magnifying glass 15 with respect to the reflective surface 21-rsf and projector 21-p.

Still referring to FIG. 3, it is also possible to use an LCD projector that has been further adapted to include a second modulator, following the same teachings as described in the parent U.S. Non-Provisional application Ser. No. 15/975, 236. Using this approach, the projector 21-p will output a single public image 21-img that includes additional encoding representing the secret image A, where the secret image A is then revealed as the linear polarizer 15-lp of the magnifying glass 15 subtracts red, blue or green intensity from the public image 21-img. As will be understood by those familiar with polarization, imaging systems, human perception, projectors and displays, as well as from a careful reading of the base and present applications, the various apparatus described herein as well as in the parent application should be considered as exemplifications for encoding secret messages rather than limitations, as other apparatus are possible for achieving the same or similar additive or subtractive public images without departing from the scope of the present invention.

Figures 5A, 5B, 5C:
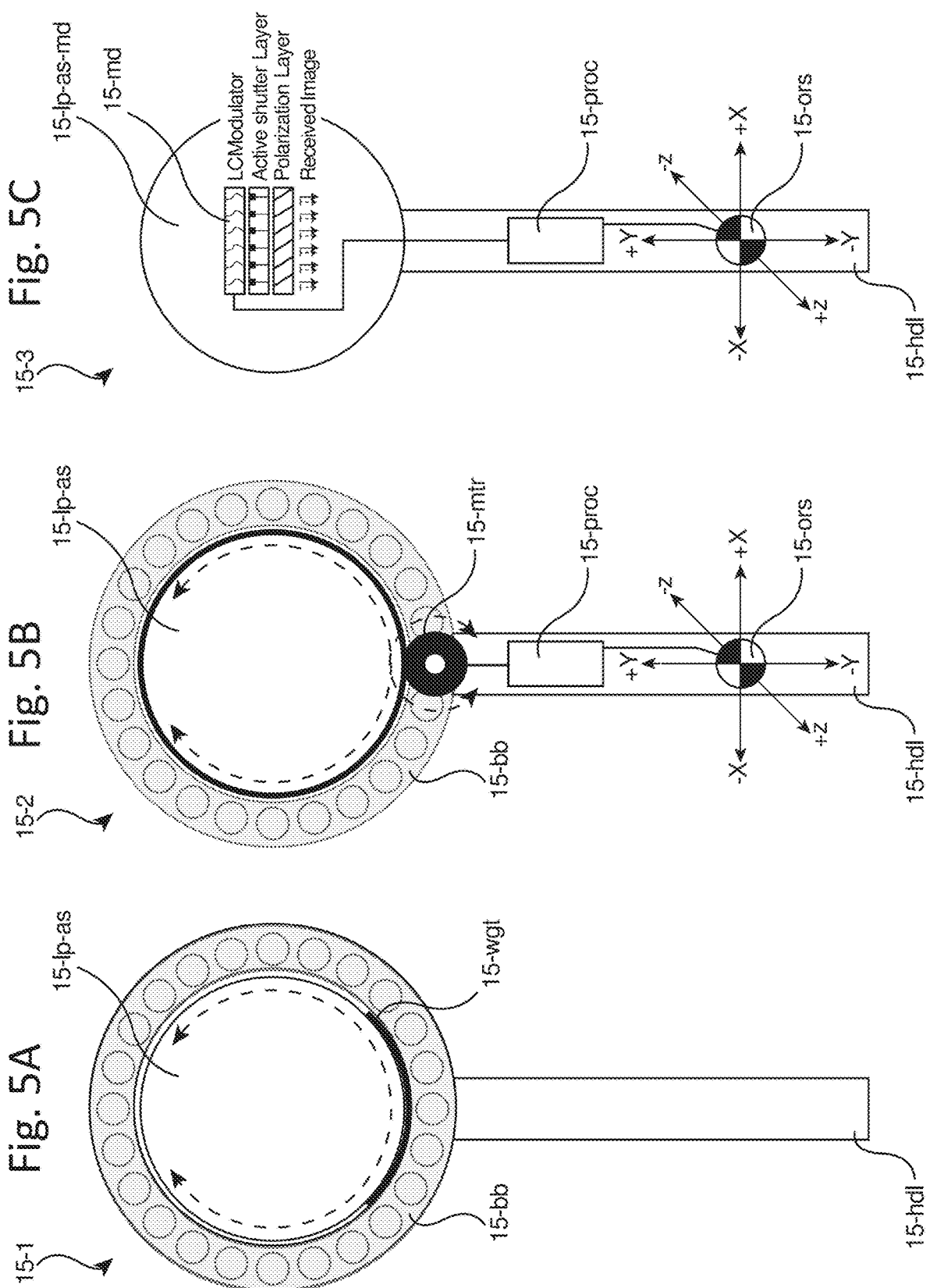
FIG. 5A is a front view diagram of magnifying glass 15-1 further adapted from glass 15 to hold lens 15-*lp-as* in a ball bearing 15-*bb* that is attached to handle 15-*hdl*, thereby allowing lens 15-*lp-as* to be continually realigned by the force of gravity acting upon weight 15-*wgt* that is attached to lens 15-*lp-as*.
FIG. 5B is a front view diagram of magnifying glass 15-2 further adapted from glass 15-1 to omit weight 15-*wgt* and include orientation sensing apparatus 15-*ors* that provides orientation information to processor 15-*proc*, where processor 15-*proc* sends signals to motor 15-*mtr* for adjustably rotating lens 15-*lp-as*.
FIG. 5C is a front view diagram of magnifying glass 15-3 further adapted from glass 15-2 to omit motor 15-*mtr* and include additional second modulator layer 15-*md* for forming adapted lens 15-*lp-as-md*, where processor 15-*proc* sends signals to modulator 15-*md* to activate the rotation of modulator pixels thus causing the rotation of light rays incoming into lens 15-*lp-as-md*.

Still referring to FIG. 3, magnifying glass 15 preferably comprises: a) camera 15-*cam* for taking pictures representative of the same visual images a user would see as they looked through the lens 15-*lp*, where camera 15-*cam* is a adapted to detect the secret messages similar to the adaptations described herein for lens 15-*lp* and all of its variants (such as 15-*lp-as* and 15-*lp-as-md* as to be described in upcoming FIG. 5*c*,) b) button(s) 15-*btn* for accepting user input, for example indicating that a picture should be captured using camera 15-*cam*, where button(s) 15-*btn* is alternatively adapted to include a finger print detector exactly similar to technology used on smart phone's such as the IPhone, such that an individual user of the magnifying glass 15 is identifiable by a finger print and this identity information is usable at least in part as information for the gaming system 48 of the present invention 100, and c) lighting 15-*led*, where visible light LED's project light towards the user 2*s* (see FIG. 4) indicative of the state of the magnifying glass 15 or game situation for which the magnifying glass 15 is being uses as a mobile gaming device 60, and where non-visible light such as ultra-violet light is projected away from the user 2*s* towards an object being viewed through the lens 15-*lp*, such that if the object includes an invisible ink responsive to the non-visible light for then fluorescing visible light then the user 2*s* will be enabled to see the otherwise invisible ink while looking through the magnifying glass 15.

Referring next to FIG. 4, there are shown secret message output device 22 with exemplary rays A and B being projected onto reflective surface 21-*rsf* where after rays A and B are then reflected off surface 21-*rsf* towards both the naked eye of a viewer 20 and the magnifying glass 15, through which a viewer 2*s* is looking at the surface 21-*rsf*. The lens 15-*lp-as* of glass 15 preferably also includes an active shutter for timing with at least the projector 21-*p* that outputs the rays of secret image A, all as prior discussed in relation to FIG. 3 and as will be further understood by a careful reading of the base co-pending application. Also, as discussed in relation to FIG. 3, the properly oriented linear polarizer 15-*lp* blocks complimentary image rays B while transmitting secret image rays A. It is well known in the art of 3D projection systems that light reflected from a non-metallic (dielectric) surface varies strongly with the direction of polarization and the angle of incidence and that this is not the case for an electric conductor such as a metal and therefore the present inventor prefers that reflective surface 21-*rsf* comprises a metallic paint or similar so as to reflect rays A and B with minimal polarization attenuation. There are many well-known paints in the marketplace that are sufficient for the purposes of the present invention. The present inventor also notes that the screens used in movie theaters for watching 3D movies projected from dual projectors such as Runco's d-73D are also ideal for use as reflective surface 21-*rsf*. There are many well-known manufactures of these 3D movie screens such as Mocomtech, Stewart Silver and Elite Screens.

Referring next to FIG. 5A, there is shown variation magnifying glass 15-1, comprising magnifying glass 15 that is further adapted to include frictionless ball bearing 15-*bb* for containing linear polarizer and active shutter lens 15-*lp-as*. What is most important to see is that lens 15-*lp-as* is now free to rotate inside of the ball bearing 15-*bb*, where the bearing 15-*bb* is then attached to the magnifying glass handle 15-*hdl*. Affixed to freely rotating lens 15-*lp-as* is sufficient weight 15-*wgt* for causing lens 15-*lp-as* to continuously self-align due to the force of gravity pulling on the weight 15-*wgt*, where the goal of the self-alignment is to maintain the proper orientation of the linear polarizer within the lens 15-*lp-as* with respect to the anticipated angle of polarization of the reflected rays comprising secret message A off surface 21-*rsf* (see especially FIG. 4.) Ball bearings are well-known in the art and many options are available with varying price and coefficients of friction. The technique of weighting the interior object, in this case the lens 15-*lp-as*, is also well-known in the art. Again, what is most important is that as the magnifying lens 15 is held upright, for example so that a viewer 2*s* may look through towards a surface 21-*rsf* as shown in FIG. 4 such that secret message A is revealed, and then as the lens 15-1 is rotated in the X-Y vertical plane (see FIGS. 5B and 5*c*) the lens 15-*lp-as* is continuously adjusted by the force of gravity to maintain its "upright" linear alignment, e.g. horizontal, that corresponds to the linear polarization angle of the incoming secret message rays A. The sensitivity of the continuous alignment will at least depend upon the amount of weight 15-*wgt*, the coefficient of friction in the ball bearing 15-*bb*, as well as the speed and angle of rotation caused by the viewer 2*s*, all as will be well understood by those skilled in the art of mechanical engineering. The sensitivity of adjustment is anticipated to degrade as the magnifying glass 15-1 is rotated about the Y-Z plane, specifically, as the glass 15-1 is for example tilted forward from an ideal vertical alignment to lean towards the surface 21-*rsf* being viewed.

Referring next to FIG. 5B, there is shown variation magnifying glass 15-2, comprising magnifying glass 15-1 that has been further adapted to omit weight 15-*wgt* and include orientation sensors 15-*ors*, processor 15-*proc* and motor 15-*mtr*. Orientation sensors 15-*ors* are well known in the art with a common use within today's smart phones. Typical sensors include accelerometers (one for every axis X, Y and Z) a gyro and magnetometer, where the combined data set increases accuracy, the processing of which is sometimes referred to as "sensor fusion." What is most important is the regardless of the specific sensor(s) chosen, processor 15-*proc* receives sufficient information for determining in real-time at least the approximate rotation in the X-Y plane and ideally also the rotation in the Y-Z and X-Z planes. Using this real-time information, processor 15-*proc* is able to controllable adjust the rotation of lens 15-*lp-as* by electronically communicating signals to motor 15-*mtr*, where motor 15-*mtr* can be any of a number of possible motors available in the market and preferably includes an interface for accepting digital commands from processor 15-*proc* and converting these into motor movement signals, all as is well known in the art of motor control systems. What is most important to see is that lens 15-2 relies upon sensing the orientation of lens 15-2 and then calculating appropriate adjustments to the rotation of lens 15-*lp-as* in order to maintain proper alignment between the liner polarization within lens 15-*lp-as* and the linear polarization angle of the incoming secret message rays A such that the rays A are substantially transmitted through the lens 15-2 for receiving by a viewer 2*s*.

Referring next to FIG. 5C, there is shown variation magnifying glass 15-3, comprising magnifying glass 15-2 that has been further adapted to omit motor 15-*mtr* and include additional LC Modulator layer 15-*md*. With respect to the linear polarizer within lens 15-*lp-as-md*, modulator 15-*md* is placed in between the surface 21-*rsf* being viewed and the linear polarizer layer, and with respect to the viewer 2*s*, the linear polarizer is in between the viewer 2*s* and the modulator 15-*md*. As is well-known in the art of LCD displays, the purpose of the modulator is to twist the rays of incoming light, effectively rotating the linear angle of polarization of the incoming rays by up to 90 degrees. This is often referred to as a light valve, where if incoming rays, for example vertically polarized, are left un-rotated (i.e. value shut off) prior to entering a second horizontal polarizer, they will be substantially blocked. If these same incoming vertically polarized rays are rotated by 90 degrees (i.e. value fully open,) therefore becoming horizontally polarized, they will be substantially transmitted. As is well known, varying degrees of transmission are possible based upon the amount of rotating by the light value/modulator, such as modulator 15-*md*. In the alternate embodiment of magnifying glass 15-3, the modulator 15-*md* receives electronic signals from processor 15-*proc* that uniformly direct the modulator 15-*md* to twist all rays (A or B) being reflected by surface 21-*rsf* and entering lens 15-*lp-as-md* according to an amount sufficient to offset the determined amount of X-Y plane rotation of the magnifying glass 15-3. Hence, rather than mechanically rotating the entire lens 15-*lp-as* as shown in FIG. 5B using a motor, the lens 15-*lp-as-md* is allowed to rotate while the modulator 15-*md* instead rotates the incoming light rays, thereby achieving the same goal which is to allow incoming secret message rays A to be analyzed as intended by the linear polarizer in lens 15-*lp-as-md*, such that the secret message image A is substantially viewable by gamer 2*s* looking through glass 15-3 while the complimentary image B is substantially not viewable, regardless of the orientation of magnifying glass 15-3 with respect to the secret message A angle of polarization.

Figure 6:
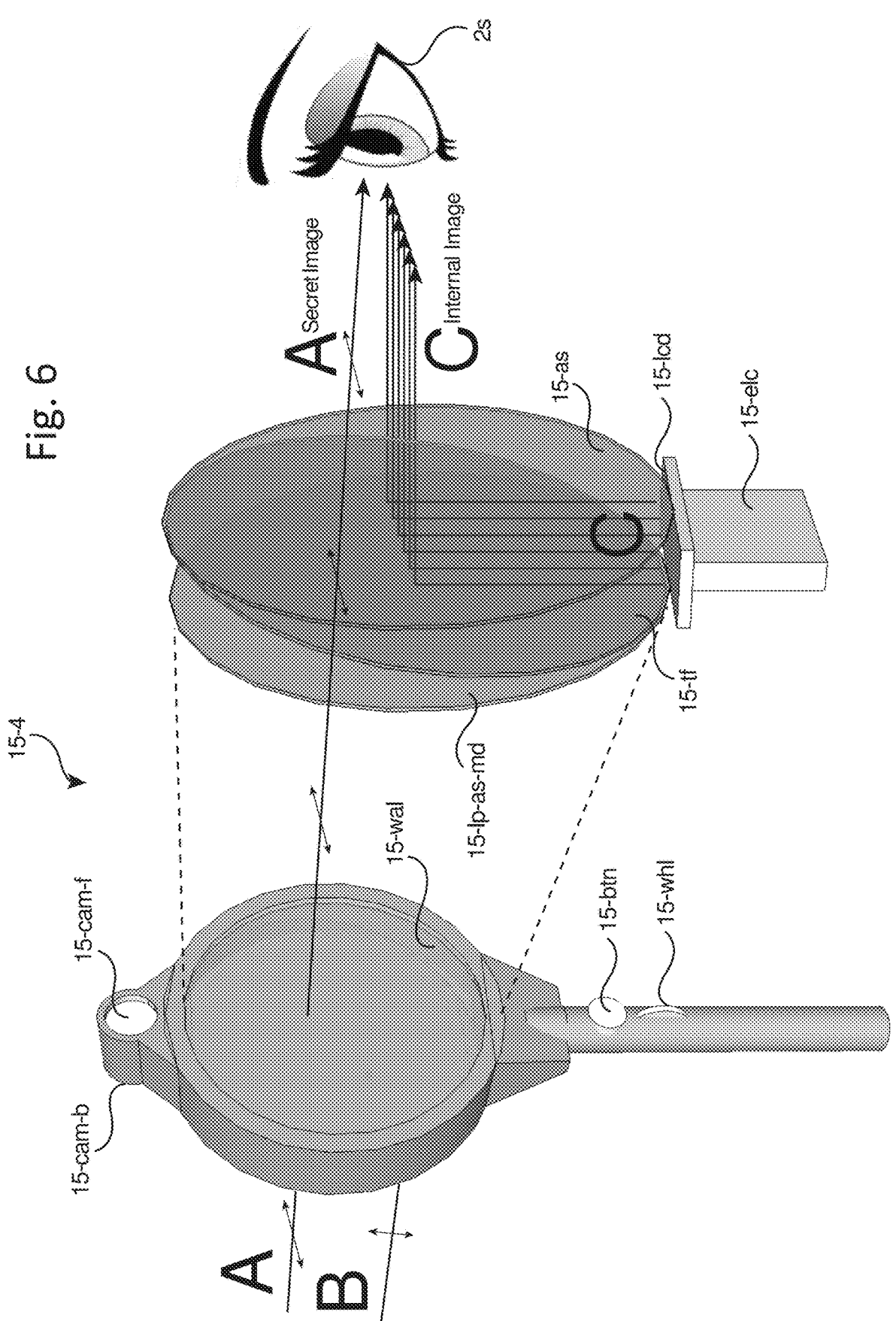
FIG. 6 is a perspective diagram of magnifying glass 15-4 further adapted from glass 15-3 to include an electronic device 15-*elc* for controlling an LCD projector 15-*lcd* to controllably emit an image C for reflection off internal transflector 15-*tf* and transmission through lens 15-*as* such that image C is viewable by gamer 2*s* augmenting secret message image A.

Referring next to FIG. 6, there is shown variation magnifying glass 15-4, comprising magnifying glass 15-3 that has been further adapted to include electronics 15-*elc* for controlling projector 15-*lcd* such as an LCD that emits augmenting image C towards angled transflective surface 15-*tf*, where image C is then partially or substantially fully reflected towards viewer 2*s* as it transmits through second lens 15-*as*. Those familiar with technology generally referred to as a handheld or "pocket" TV will understand the purposes, functions and arrangements of projector 15-*lcd* with respect to transflective surface 15-*tf* and viewer 2*s*, as this arrangement provides a means for allowing projector 15-*lcd* to emit an image C for viewing by gamer 2*s* as if the image C was coming through lens 15-*lp-as-md*, while also minimizing the impact on the shape and size of the magnifying glass. As will be well understood by those familiar with this technology as well as augmented reality glasses and heads-up displays, many variations are possible without departing from the scope of the present invention, where any projection method including active matrix LCD is sufficient for the purposes of the present invention. What is most important to see is that an additional image C is provided for use in magnifying glass 15-3, where the image C is generated by digital information either stored within magnifying glass 15-3, or streamed to glass 15-3 over its internal wireless communications link 15-*com* (see upcoming FIG. 7.)

Still referring to FIG. 6, transflective surface 15-*tf* can be a range of materials including at least: 1) plastic, 2) glass, or 3) transflective LCD. As those familiar with Snell's law and the principals of the refraction and reflection of light will understand, there is a critical angle of incidence, typically around 45°, at which the projected image C will be fully reflected off for example glass surface 15-*tf* towards gamer 2*s*. As is also well known, this angle can be altered to fit the form and structure of the magnifying glass 15-4 with the effect of reducing from full to partial reflection. In the case of partial reflection, it is further desirable that interior was 15-*wal* surrounding surface 15-*tf* be coated or painted for increased light absorption (e.g. using a black color,) thus reducing the unwanted effects of reflections within the interior cavity of magnifying glass 15-4. Alternatively, surface 15-*tf* can be constructed using a transflective LCD, in which case electronics 15-*elc* can emit control signals that cause transflective LCD surface 15-*tf* to reflect substantially all of the image C acting similar to a mirrored surface. Using a glass surface 15-*tf* further allows for the simultaneous transmission of secret image A through surface 15-*tf* directly into the view of gamer 2*s*, thus allowing images A and C to simultaneously received by gamer 2*s*, and towards this end image C can be considered as augmenting the secret message A. Using transflective LCD surface 15-*tf*, electronics 15-*elc* can alternate the transflective LCD between a reflective vs. transmissive at a high frame rate, e.g. 30 to 60 fps, coordinated with the output of image C using projector 15-*lcd*. As will be well understood by those familiar with human visual perception, at a sufficient frame rate, gamer 2*s* will perceive image C as being mixed with image A and indistinguishable from the approach of using a glass surface 15-*tf* rather than a transflective surface 15-*tf*.

Still referring to FIG. 6, rather than having projected image C augment secret image A, it is further anticipated that electronics 15-*elc* or similar (see the teachings for 15-*ui* in upcoming FIG. 7) will controllably set the active shutter in lens 15-*lp-as-md* to opaque while simultaneously emitting image(s) C through projector 15-*lcd*. In this example use, gamer 2*s* is automatically switched from viewing either only secret image A, or combined image A and C, to viewing only image C. As the careful reader will see, using the disclosed arrangement of parts or their equivalents, many interesting effects are possible, some of which have been described, others of which will be obvious to those skilled in the necessary arts, and therefore these teachings related to the projection of image C for augmenting secret image A should be considered as exemplary, rather than limitations of the present invention. And finally, the present invention anticipates that images captured by back facing camera 15-*cam-b* that are meant to capture the secret image A as currently being viewed by gamer 2*s* are then also transmitted via magnifying glass 15 wireless communications (see 15-*com* in upcoming FIG. 7) to be received by the interactive gaming system 48.

As will be well understood from a careful reading of the present invention, game access point 30 alone or in combination with gaming system 48 is responsible for determining and transmitting control signals to magnifying glass 15 for causing electronics 15-*elc* to direct projector 15-*lcd* to emit image C for visually combining with image A, where the timing of the emission of image C is coordinated to augment the view of gamer 2*s* through magnifying glass 15-4, and where images captured from back facing camera 15-*cam-b* are analyzed by any one of, or any combination of electronics 15-*elc* contained with magnifying glass 15-4, access point 30 or gaming system 48, in order to determine the current view of gamer 2*s*. Access point 30 and or gaming system 48 is further capable of receiving images captured by back facing camera 15-*cam-b* and then applying a digital image C to the captured image representative of the gamer 2's view, thus forming an augmented captured image substantially similar to what gamer 2*s* would have viewed at the time the image was captured by camera 15-*cam-b*.

Figure 7:
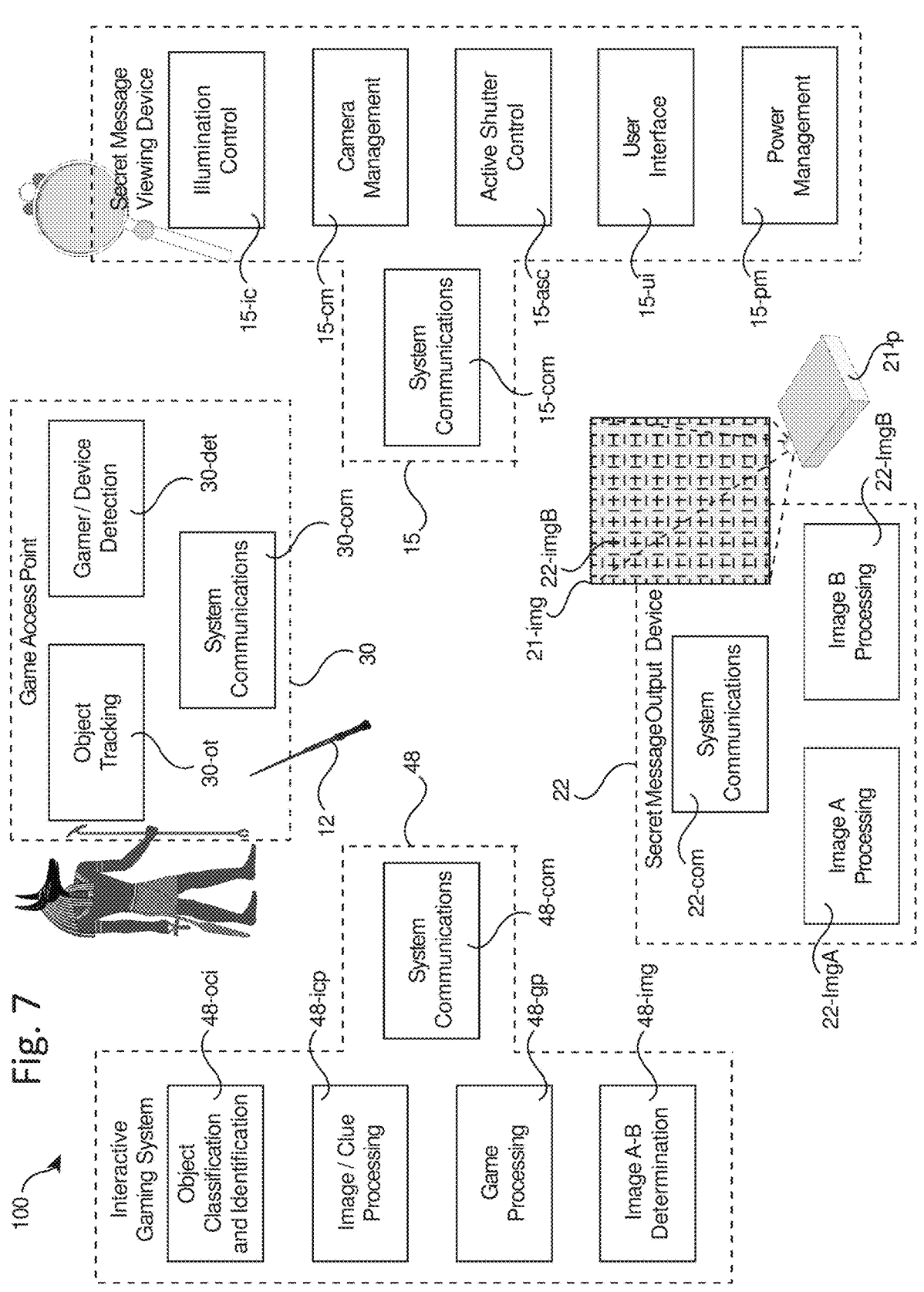
FIG. 7 is a functional block diagram of four of the major components of the presently taught game theater 100 including: 1) game access point 30, 2) secret message output device 22, 3) secret message magnifying glass 15, and 4) interactive gaming system 48. Each of four major components includes a set of key sub-components.

Referring next to FIG. 7, there is shown a functional block diagram of four of the major components of the presently taught game theater 100 including: 1) game access point 30, 2) secret message output device 22, 3) secret message magnifying glass 15, and 4) interactive gaming system 48.

Each of four major components includes a set of key sub-components to be described forthwith. It is important to understand that the present figure describes overall behavior and functionality that is preferably encapsulated in software/hardware sub-components roughly equivalent to those herein taught. However, as those familiar with software and hardware system architectures will understand, multiple alternative configurations are possible where the actual internal sub-components of each of the for major components 30, 22, 15 and 48 are implemented differently than herein shown while substantially providing the same functional behaviors for the interaction between the major components. As will also be understood, all the components generally require computing and communication apparatus. Unless specifically mentioned, additional necessary hardware apparatus is well-known and understood in the marketplace, for which multiple options are available, and therefor for clarity are not further taught herein.

In general, a game access point 30 using gamer/device detection 30-det is capable of at least detecting the presence or one or more gamers 2s along with zero or more mobile gaming devices 60 being carried by the gamer 2s, where the gamer 2s's detected presence includes some unique identifier (i.e. gamer ID) that may or may not be related to that gamer 2s's personal identity (for example the ID could be registered to a fictitious gamer avatar, rather than the actual gamer 2s's real name.) A game access point 30 also is in communications via 30-com with the interactive gaming system 48, either directly or working through the guest tracking system 46 (see FIG. 2) under the supervision of the destination 4-a or 4-b, such as included in the destination's global eco-system 40. Therefore, the main responsibility of the game access points 30 is to detect gamers 2s and their associated devices 60 for continuous updating of the gaming system 48, where the game algorithms being implemented on the gaming system 48 alter the game activities based at least in part upon the detected gamer 2s and device 60 information with respect to an access point 30. It is further preferred that at least some of the game access points 30 include means for very accurately tracking the movements and gestures of either the gamer 2s or a mobile device 60 being used by a gamer 2s. In the prior co-pending application, the present inventor provided significant specification related to the camera-based object tracking system embedded within mirror/display 20 (see especially FIG. 2A of co-pending U.S. Non-Provisional application Ser. No. 15/975,236 INTERACTIVE OBJECT TRACKING MIRROR-DISPLAY AND ENTERTAINMENT SYSTEM,) where this mirror/display 20 was functioning as a game access point 30 as it detected the presence of the gamer 2s, tracked the movements of the gamer's 2s game toy, i.e. the wizard's wand shown as article 12, and then communicated this information to both a local interactive gaming system 36 and the global interactive gaming system 48. The tracked movements of article 12 where considered to be interpretable as commands being issued by gamer 2s. As will be well understood by a careful reading of the present and co-pending applications, while a game access point 30 might comprise additional sub-components, including a secret message output device 22 or an actuated device 50, it minimally comprises gamer/device detection 30-det and system communications 30-com, and alternately also comprises object tracking 30-ot.

Still referring to FIG. 7, in general secret message output device 22 comprises a sub-component for outputting a public image viewable to the naked eye, wherein a secret message A is hidden and can only be perceived by a gamer 2s using a secret message imaging device such as eye glasses 14 or magnifying glass 15. The co-pending application for an INTERACTIVE OBJECT TRACKING MIRROR-DISPLAY AND ENTERTAINMENT SYSTEM taught mirror/display 20 with several alternatives for outputting such public images with secret messages A. The present invention further teaches projection system 22 comprising projector(s) 21-p for projecting secret message image A and complimentary image B off of a reflective surface 21-rsf, where a gamer 2s using the same eye glasses 14 or magnifying glass 15 as used to see secret messages A output by mirror/display 20 would then also perceive secret messages A being output by projection system 21-p. Regardless of the underlying image output technology, e.g. display 20 or projector 21-p, secret message output device 22 preferably includes sufficient computing system for implementing both image A processing 22-imgA and image B processing 22-imgB. What is important to understand is that preferably a secret message output device 22 is in communications with the interactive gaming system 48 via a game access point 30, such that the game access point 30 first detects the gamer 2s in the proximity of the output device 22, and then communicates with gaming system 48 in order to receive secret message instructions or content.

As will be well understood by those familiar with data transfer over communications systems, especially remote systems such as gaming platform 10 when communicating to physical destinations 4-a and 4-b, there are issues related to data latency that can be noticeable for example to the gamer 2s when viewing the output secret message A. One way to minimize latency is to minimize data transfer, this includes either pre-storing secret messages A, complimentary images B, or desired final public images on the secret message output device 22. However, if the secret messages A are not pre-known and must be calculated, it is desirable that the gaming system 48 transfer a minimum of data to output device 22 for processing into a viewable secret message A by processing sub-component 22-imgA. Ultimately, after secret message A is determined, created or otherwise generated it is also necessary to generate either a complimentary image B (i.e. for projection device 21-p) or a public image that encodes the secret message (i.e. for mirror/display 20,) where this second generation is the responsibility of processing sub-component 22-imgB. Again, while it is possible to generate both images A, B and the public image on the interactive gaming system 48 for communicating through the game access point 30 to the output device 22, it is preferred that a majority if not all of this generation is done local to device 22, wherein it is further possible that sub-components 22-imgA and 22-imgB be a part of game access point 30 rather than device 22. While many configurations are possible, once images A, B and the public image are determined, created or otherwise generated, they are output by device 22 for viewing.

Still referring to FIG. 7, in general secret message viewing device 15 comprises a multiplicity of sub-components, most importantly including a lens for analyzing the public image to reveal the secret message A, all as prior taught herein as well as the co-pending U.S. Non-Provisional application Ser. No. 15/975,236 entitled INTERACTIVE OBJECT TRACKING MIRROR-DISPLAY AND ENTERTAINMENT SYSTEM. The analyzer is typically a polarizer film providing either linear or circular polarization, and a such is not an electronic device that needs controlling. All of the sub-components depicted in FIG. 7 for device 15 are related to functions that are electronically variable. Especially as taught in the co-pending application in relation to eye glasses 14, it is useful to at least include an LCD active shutter over the polarizer film for constructing magnifying glass 15. LCD active shutters are well known, and as directed by active shutter control 15-*asc* provide at least two beneficial functions: 1) to make the entire surface of lens 15-*lp-as* or 15-*lp-as-md* (see FIGS. 5A, 5B and 5C) either opaque or transmissive in synchronization with the output of secret messages A by output device 22, thus allowing some secret message A viewing devices 15 and 14 to transmit secret messages to gamer 2s, while other devices 15 and 14 simultaneously block these same messages A, and 2) to increase the opacity of some select portion (i.e. some pixels of the LCD active shutter) of the surface of lens 15-*lp-as* or 15-*lp-as-md*, thereby blocking the backlighting coming through the lens 15-*lp-as* or 15-*lp-as-md* to the gamer 2s resulting in for example an image or some text (see upcoming FIGS. 8C, 9A, 9C, 9E, 9E and 14) where this can be considered the output portion of a typical screen based user interface (UI.)

Still referring to FIG. 7, as will be well understood by those familiar with touch screen technology, it is possible to further adapt either lens system 15-*lp-as* or 15-*lp-as-md* to include a touch sensor, whereby the resulting lens not only provides UI output but also serves to receive input from the gamer 2s in the form of touch detection signals. As such, it is preferably that device 15 include user interface sub-component 15-*ui* that is dedicated to managing both the input and output of the UI as enabled by lens system 15-*lp-as* or 15-*lp-as-md* preferably further adapted to include touch sensing means. As depicted in FIG. 3, device 15 further includes additional mechanical based user input means such as button(s) 15-*btn*. As will be appreciated by those skilled in the art of toys and user input, many solutions are possible for accepting input from a gamer 2s other than a touch screen lens or a button, any of which are possible for use with device 15. As such, the UI elements depicted in the present invention related to magnifying glass 15 and in the co-pending invention related to eye glasses 14 should be considered as exemplary rather than as limitations. It is possible that some of the teachings as related to eye glasses 14, such as heptic feedback, also be incorporated into magnifying glass 15. Likewise, the buttons envisioned for device 15 could be adapted to device 14. What is most important is that the gamer 2s has ability to exchange information with the gaming system 48 using some UI elements on either device 14, 15 or any of their anticipated alternates.

The present invention additionally prefers that magnifying glass 15 include at least a back facing camera 15-*cam-b* (see FIG. 6) for capturing images of the view through glass 15 substantially as seen by gamer 2s. As will be well understood by those familiar with camera technology, it is possible to place the same lens materials as 15-*lp-as* or 15-*lp-as-md* over back facing camera 15, such that camera 15 capture images that include secret messages A. Several uses for the capturing of these images will be detailed in the remainder of the present application. It is also preferable that magnifying glass 15 include a front facing camera 15-*cam-f* for capturing images of the gamer 2s. When including back facing camera 15-*cam-b* or front facing camera 15-*cam-f*, magnifying glass 15 preferably also includes camera management sub-component 15-*cm* for which many options are well-known in the art and possible. What is minimally necessary is that some computing element is available for directing the image capture timing and data transfer of either of camera 15-*cam-b* and 15-*cam-f*. What is further desirable is that sub-component 15-*cm* include some memory and sufficient processing for preforming image processing, for example classifying or identifying objects within the images being captured by cameras 15-*cam-b* and 15-*cam-f*. As will be well-known in the art, local processing on the device 15 or 14 is advantageous but then also adds to the cost and power requirement of device 15 or 14, and as such either some or all of this desirable image analysis processing can be moved instead to either game access point 30 and/or interactive gaming system 48. What is most desirable is that secret message imaging devices 15 and 14 at least include camera sufficient for capturing images of what the gamer 2s is seeing with respect to both their natural ambient view as well as any secret messages A seen while viewing a secret message output device 22. What is further desirable and to be further discussed herein, is that these same images are then usable at least in part as information by gaming system 48 for altering the ongoing game as experienced by gamer 2s.

Still referring to FIG. 7, magnifying glass 15 is preferably further adapted to include led's 15-*led*. Similar to cameras 15-*cam-b* and 15-*cam-f*, these can be either front facing or back facing. When front facing, the LED's 15-*led* are meant primarily as indicators for the gamer 2s, and as such are considered to be a part of the user interface of magnifying glass 15, where a similar set of UI LEDs where taught in the co-pending application Ser. No. 15/975,236 in relation to eye glasses 14. For instance, these LEDs could be caused to blink or stay steady based upon electronic signals output by user interface 15-UI in response to instructions received by interactive gaming system 48 and/or game access point 30. However, within the present application the back facing LEDs 15-*led* are anticipated to output a non-visible light such as UV in order to cause invisible ink to fluoresce thus revealing an invisible message to the gamer 2s as they look through magnifying glass 15 (see especially upcoming FIGS. 8b and 10E.) These back facing led's preferably receive electronic signals from the illumination control 15-*ic* sub-component that works in coordination with camera management 15-*cm*. As will be well understood by those familiar with camera systems and electronics, camera management 15-*cm* could also be adapted to output electronic signals for causing the back facing LEDs 15-*led* to turn on and off. Regardless of the implementation, as these and other variations are well-known and possible, it is important to see that at times the back facing LEDs 15-*led* will illuminate invisible ink for the gamer 2s to view, even though images may or may not also be captured by back facing camera 15-*cam-b*.

Still referring to FIG. 7, magnifying glass 15 preferably includes any of available wireless technologies including Bluetooth or wi-fi, for example which the co-pending application specified regarding eye glasses 14. It is also important to note that the choice of wireless technology also effects at least game access points 30 which communicate with mobile gaming devices 60 such as magnifying glass 15 and eye glasses 14. As such, the choice for communications 15-*com* preferably supports detection of secret messaging devices 15 and 14 by gamer/device detection 30-*det* sub-component of access points 30, all as prior discussed. Also, as prior taught in the co-pending application Ser. No. 15/975,236 in relation to eye glasses 14, it is preferred that communications 15-*com* include some information during communication uniquely identifying the magnifying glass 15 from all other mobile gaming devices 60, where the many uses of such unique ID information are well known to those familiar with information systems and has been prior discussed in the co-pending application. And finally, to support the electronics, magnifying glass 15 is further adapted to include power management 15-*pm* for both providing power to all electronic elements within glass 15 and for preferably supporting recharging of power, for example using any of the wireless power transfer technologies now becoming available with portable devices such as smart phones. What is most important is the device 15 includes a power source, such as a battery that may be exchanged or recharged, and that this power is managed as it is supplied to all electronic components within device 15, all as will be well understood by those skilled in the art of electronics and especially portable electronics.

Still referring to FIG. 7, in general interactive gaming system 48 comprises a multiplicity of sub-components for receiving gamer 2s input, processing game rules at least in part using the gamer input, and providing output to gamers 2s at least using any of secret message output devices 22, actuated devices 50 or mobile gaming devices 60, and where preferably the gamer input and gaming system output are communicated from system 48 through communications sub-component 48-*com* to game access points 30 for further transmission to devices 22, 50 and 60. As will be well understood by those familiar with computer system communications, many options and technologies are available for use in communications sub-component 48-*com* and as such are not the focus of the present invention. What is most important to understand is that the communications architecture support data security over a wide area network that communicates between a local area network running at the destination for communications between the multiplicity of game access points 30 and the remote gaming platform 10 that is preferably implemented as a cloud-based system. It is also possible to implement an architecture where each game access point 30 is treated as an IoT (internet of things) networked device comprising sufficient embedded electronics, software and network connectivity to enable the access point 30 to exchange data with interactive gaming system 48 running either locally, e.g. within the physical destination's global eco-system 40, or remotely, e.g. on a cloud computing service within the gaming platform 10. What is most important is that gaming system 48 be able to electronically exchange information with game access points 30, secret message devices 22, actuated devices 50 and mobile gaming devices 60.

Still referring to FIG. 7, gaming system 48 preferably includes an image/clue processing 48-*icp* sub-component for initially processing inputs received from gamer 2s, where these inputs vary from selections made through some UI interface or images captured especially of the scene and/or secret message currently being viewed by the gamer 2s through magnifying glass 15 or eye glasses 14. Clue processing 48-*icp* is preferably capable of receiving and appropriately processing all inputs, thus being able to recognize identification information associated with the received input, where the identification information preferable includes unique ids for the gamer 2s, the game access point 30 as well as at least the mobile gaming device 60 the provided the input. Clue processing 48-*icp* preferably determines the type of input and when this input is an image provides this image to object classification and identification sub-component 48-*oci* for additional processing using any of well-known and emerging image processing techniques, especially including the use of deep neural nets that have proven to be significantly efficient and accurate for at least classifying objects found within an image. The present inventor notes that by identifying the ID of the game access point 30 through which the original input image was received, it is possible to reasonably limit the total number of potential objects of which the gamer 2s might have captured an image, where this information regarding the limited number of potential objects is then used at least in part by object classification and identification sub-component 48-*oci* when processing the image. What is most important is that gamer 2s is able to capture images with or without secret messages, where these images include one or more objects, and where the objects are generally classifiable (e.g. the object is a fish,) or they are uniquely identifiable (e.g. the object is a QR code on a printed receipt, or the face of another gamer 2s.) When capturing images that include secret messages, it is anticipated that the exact secret message is pre-known by the gaming system 48 since system 48 was ultimately responsible for directing the output of the secret message to the gamer 2s as prior discussed, and therefore object classification and identification 48-*oci* does not need to process the captured image in order that image/clue processing 48-*icp* be notified regarding what secret message is contained within a particular captured image. What is most important to understand is that the responsibility of object classification and identification 48-*oci* is to determine a sufficient amount of object related information from an image captured by a gamer 2s so as to provide this object related information back to the image/clue processing sub-component 48-*icp* for further processing.

Still referring to FIG. 7, image/clue processing 48-*icp* works with object classification and identification 48-*oci* to translate any input from a gamer 2s into an actionable response, where an actionable response is any digital information that is interpretable by game processing 48-*gp* as either: 1) a gamer 2s answer to a gaming system 48 posed question, 2) a gamer 2s question requesting a gaming system 48 answer, and 3) a gamer movement for which any of a secret message devices 22 or actuated device 50 is to have a responsive change or movement. The present application will teach specific examples of this Q&A exchange, where the examples include a gamer 2s responding to a gaming system 48 posed riddle, presented e.g. via the active shutter LCD on the magnifying glass 15, where the gamer 2's response includes taking a picture of fish, where the fish are classifiable by object classification and identification sub-component 48-*oci* as an answer to the gaming system 48 question (see FIG. 8C.) Another example taught herein is of a gamer 2s capturing an image at a specific game access point 30, or otherwise an image of an object with a location that is pre-known to the interactive gaming system 48 with respect to the locations of the game access point(s) 30, where the captured image is interpreted to be indicative of the gamer 2s's current location within a physical destination 4-*a* or 4-*b*, and that the implied gamer question is "how do I get from where I am now to my next game access point?" (See FIGS. 9A, 9B, 9C, 9D and 9E.)

As will be discussed, the processing of the image directly, and or the receiving of an ID and related information from the game access point 30 through which the captured image was transmitted, are potential information usable by game processing 48-*gp* to provide an answer to the gamer's location question. In still yet another example herein taught a gamer 2s moves their game toy sword 62-*swd* (see FIG. 12) as they view a secret message that is an animated video of an orc. These sword 62-*swd* movements are preferably captured by an object tracking system 30-*ot* included within the game access point 30 that is controlling the secret message output device 22 outputting the orc video to the gamer 2s. The captured movement are determined by object tracking 30-*ot* and output in any form of 2D or 3D coordinates such that they are usable at least in part for causing the images of the orc to move accordingly, where the determination of the changes to the output orc images is preferably made locally by image A 22-*img*A and image B 22-*img*B processing, but may also be made by a component such as image A-B determination operating on the associated access point 30 or the gaming system 48 (as depicted,) all as will be well understood by those familiar with software and hardware systems architecture.

Figures 8A, 8B, 8C:
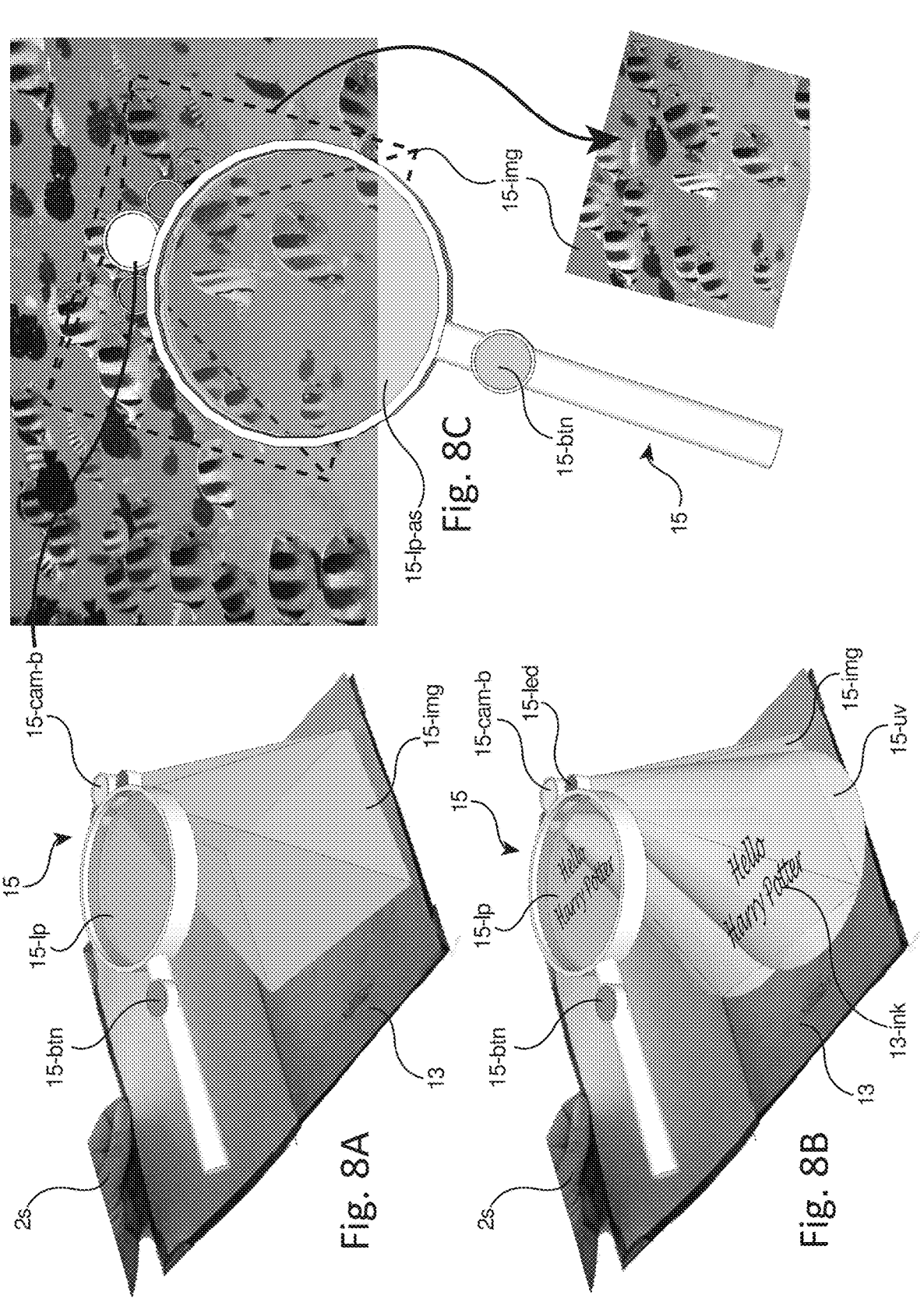
FIG. 8A is a perspective diagram showing a use of magnifying glass 15 to image a secret message book 13, especially where back facing camera 15-*cam-b* is shown to have a field-of-view 15-*img* that is similar to the view of a gamer 2*s* looking through glass 15.
FIG. 8B is a perspective diagram showing a use of magnifying glass 15 to further emit non-visible energy 15-*uv* such as ultra-violet using LEDs 15-*led*, where the non-visible energy 15-*uv* causes invisible ink 13-*ink* that is on the surface of secret message book 13 to fluoresce into the visible spectrum and to therefore become visible to the gamer 2*s*.
FIG. 8C is a perspective diagram showing a use of magnifying glass 15 to output information such as text using the active shutter in lens 15-*lp-as*, where the gamer 2*s* is looking through lens 15-*lp-as* at a scene, where the scene then acts as backlighting for lens 15-*lp-as*, where gamer 2*s* can cause an image to be captured of the scene by back facing camera 15-*cam-b*, and where the image 15-*img* is captured in response to an indication from gamer 2*s* using any of an user interface devices provided by glass 15 such as button 15-*btn*.

Referring next to FIGS. 8A and 8B, there is shown an anticipated use of the magnifying glass 15 as it is being held by a gamer 2*s* to look through at a secret message book 13. In FIG. 8A, gamer 2*s* holds the magnifying glass 15 within some distance of book 13 such that looking through lens 15-*lp* the gamer 2*s* can see a portion of book 13, whereupon no markings or writing is visually apparent. Also shown is the approximate field-of-view of back facing camera 15-*cam-b* that is directable to capture an image 15-*img* of what the gamer 2*s* is looking at though lens 15-*lp*. In FIG. 8B, using any of available UI input apparatus such as button(s) 15-*btn* the gamer 2*s* indicates that the leds 15-*led* should be turned on to emit a non-visible energy such as ultra-violet light, where the non-visible energy 15-*uv* then interacts with invisible ink already placed upon book 13 such that the gamer 2*s* now sees markings or writing 13-*ink* on book 13 where prior to the emission of the non-visible energy 15-*uv* the markings or writings 13-*ink* were substantially not visually apparent, and where the available UI input apparatus used by gamer 2*s* to indicate that such non-visible energy should be emitted is any of a multiplicity of possible means as prior described in relation to the user interface 15-*ui* of imaging glass 15, including a button(s) 15-*btn* depicted. Also as prior taught, the gamer 2*s* may use a UI input on magnifying glass 15 to indicate that an image 15-*img* should be captured by camera 15-*cam-b* of the view of the book 13 as currently being seen by gamer 2*s*, thus including the now visible markings or writing, where this image is then transmitted through communication means such as 15-*com* and 30-*com* to image/clue processing 48-*icp* to be analyzed by object classification and identification sub-component 48-*oci* for providing information to game processing 48-*gp* indicative of the gamer 2*s*'s actionable response.

Referring next to FIG. 8C, there is shown an anticipated use of the magnifying glass 15 as it is being held by a gamer 2*s* to look through at either a picture of fish or an actual fish tank. Also shown on lens 15-*lp-as* is game system 48 question, specifically the text: "Alive without breath, As cold as death, Never thirsty, ever drinking, All in mail, never clinking." that was communicated to glass 15 by game processing 48-*gp* through communications means 48-*com*, to game access point 30 communications means 30-*com*, and then to magnifying glass communication 15-*com* as a part of an on-going game. As those familiar with communication systems will understand, there are various alternative communication paths include directly from gaming system 48-*com* to magnifying glass 15-*com*, where all paths are considered as sufficient for the purposes of the present invention 100. In response to the received question, gamer 2*s* then uses magnifying glass 15 to view some portion of a scene that includes an object which the gamer 2*s* believes to be an answer to the question. In FIG. 8C, the gamer 2*s* is shown to be looking through lens 15-*lp-as* at either a picture of fish or an actual fish tank, where the gamer 2*s* then uses any of available UI input apparatus, such as button(s) 15-*btn*, to indicate that camera 15-*cam-b* should capture an image 15-*img* of what the gamer 2*s* is currently viewing as the gamer 2*s* looks through lens 15-*lp-as*. This image 15-*img* as depicted includes one or more fish and is transmitted through communication means such as 15-*com*, 30-*com* and 48-*com* to image/clue processing 48-*icp* to be analyzed by object classification and identification 48-*oci* providing information to game processing 48-*gp* indicative of the gamer 2*s*'s actionable response.

With respect to FIGS. 8A, 8B and 8C, the uses depicted include: 1) causing invisible ink to be made visible for viewing through magnifying glass 15, and 2) capturing images 15-*img* representative of the view through magnifying glass 15 for analysis and interpretation by the interactive gaming system 48 as a gamer 2*s* actionable response. As will be appreciated by those skilled in the art of gaming systems, these two features alone present significant possibilities and can be used in a virtually limitless number of variations including with different game access points 30, different clues, questions, challenges, riddles, assignments, tasks, missions, etc. and different presentations of secret messages A using any of the display 20 or projector 21 based apparatus and methods taught by the present inventor herein or in any of the prior base or related co-pending applications. As will also be well understood, invisible ink that is made visible by exposure to non-visible light is well known and there are many alternatives, all of which are acceptable and anticipated for the uses of the present magnifying glass 15 and interactive gaming system 48.

Figure 9A:
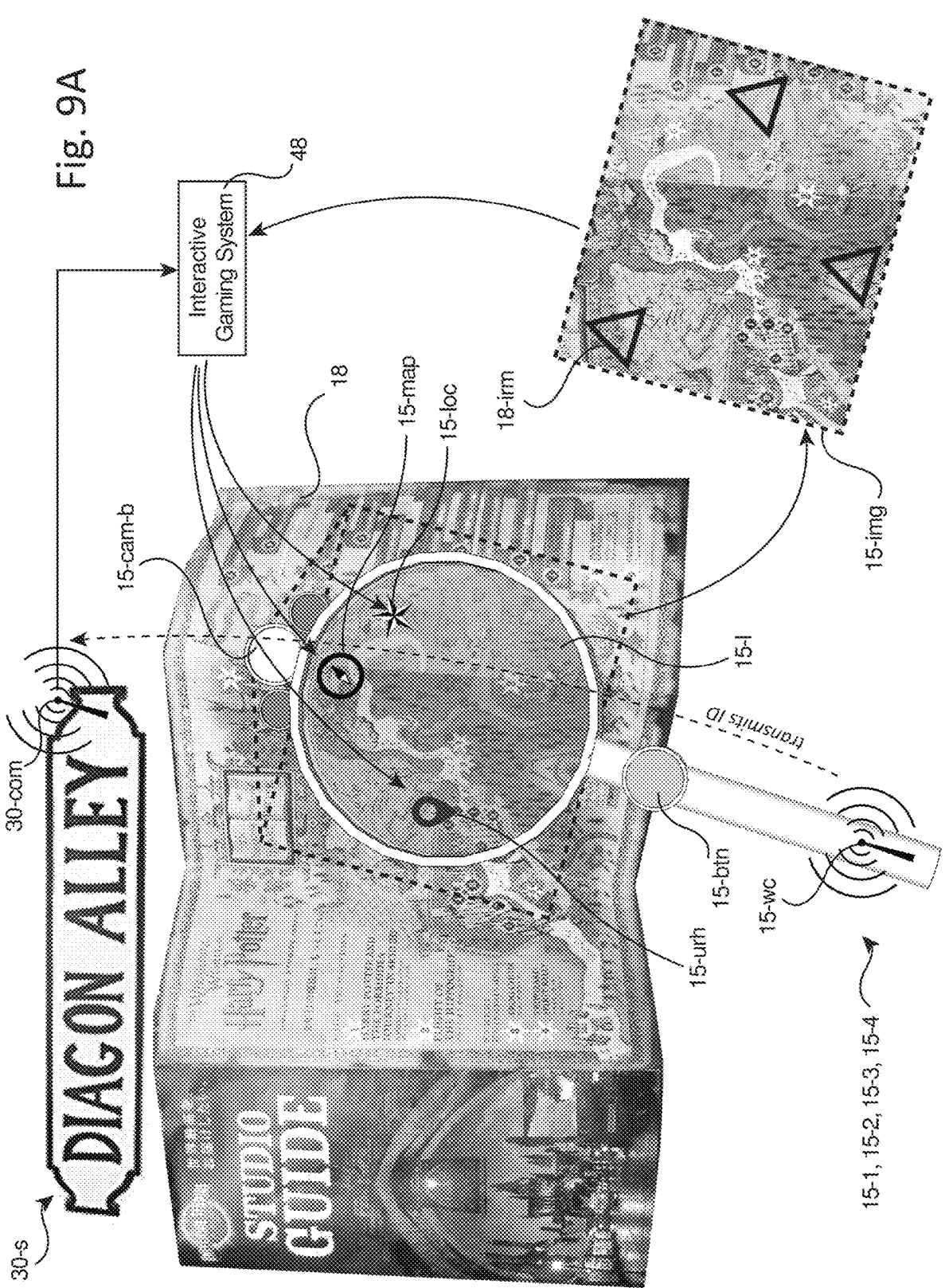
FIG. 9A is a front view depicting a game access point 30-*s* that has been adapted to provide directions to a gamer 2*s*, where the access point 30-*s* detects the gamer 2*s*'s proximity that is then communicated to gaming system 48, where gaming system 48 uses the pre-known location of access point 30-*s* to output a "you are hear symbol" augmenting the current view of gamer 2*s* looking through a magnifying glass 15-1, 15-2, 15-3 and 15-4, where images 15-*img* are automatically captured by back facing camera 15-*cam-b* for analysis and registration of the gamer 2*s*'s current view of map 18, and where gaming system 48 directs the output of augmenting symbols by lens 15-1, and where augmenting symbols include a next game access location 15-*loc* based at least in part upon the registration of the gamer 2*s*'s current view of map 18 and at least in part upon the unique identity of the access point 30-*s*. Map 18 is also depicted to include invisible ink registration marks 18-*irm* for use in registering captured images 15-*img* of map 18.

Referring next to FIG. 9A, as those familiar with especially large destinations 4-*a* or 4-*b* will understand, when game theater 100 comprising a large multiplicity of game access points 30 is added to a larger destination 4-*a* or 4-*b*, it is a very important function to help gamers 2*s* find either an access point 30 the interactive game system 48 is summoning the gamer 2*s* to, or to find an access point 30 the gamer 2*s* desires to interact with. The present figure shows the use of any one of magnifying glasses 15-1, 15-2, 15-3 or 15-4 as a means for directing a gamer to a next game access point 30 in conjunction with a portable map 18 that is typically found for example at a theme park. It is first noted that any of magnifying glasses 15-1, 15-2, 15-3 or 15-4 are capable of creating an augmented image on magnifying glass lens 15-*l*, for example using an active shutter to selectively turn some pixels on lens 15-*l* to be partially or substantially opaque, where the ambient light reflecting off map 18 and coming through lens 15-*l* is then blocked having the effect of creating monochromatic images on lens 15-*l* that augment map 18, all as will be well understood by those familiar with LCD displays. Magnifying glass 15-4 has the additional ability to project a color or monochromatic image C via projector 15-*lcd* (see FIG. 6) for augmenting the view of lens 15-*l*, where this view can be transparent to the background or opaque, depending then upon the controlled opaque vs. transparent setting of the active shutter in lens 15-*lp-as*. What is important to see is that magnifying glass 15-1, 15-2, 15-3 or 15-4 is capable of outputting augmenting graphics on lens 15-*l* for indicating a path of a gamer 2*s* in visual coordination with map 18.

Still referring to FIG. 9A, gamer 2*s* carrying magnifying glass 15-1, 15-2, 15-3 or 15-4 that includes communications 15-*com* comes into a near proximity of a game access point 30-*s* that for example is implemented as a street sign "Diagon Alley." As with all game access points 30, street sign access point 30-*s* preferably includes means for detecting the near proximity of any one or more gamers 2*s* by detecting any one or more of their associated mobile game devices 60, such as magnifying glass 15-1, 15-2, 15-3 or 15-4. As will be appreciated by those skilled in the arts of wi-fi local positioning systems, RFID local positioning systems, as well as global positioning systems, many technologies are available for embedding in both game access points 30 and mobile game devices 60, all as prior discussed. There is no requirement that all access points 30 and all mobile devices 60 implement the same technology. What is important, is that there is at least some way of determining that a particular gamer 2s has entered into or come within a certain proximity of a game access point 30, and in regards to the present figure game access point 30-s.

Prior co-pending U.S. Non-Provisional application Ser. No. 16/055,078 entitled THEME PARK GAMIFICATION, GUEST TRACKING AND ACCESS CONTROL SYSTEM taught a smart ticket 2 that preferably included extended range readable tracking number, for example implemented using passive UHF RFID that is detectable at ranges of 3 to over 45 feet based upon the exact technology chosen. Passive RFID is preferred as it supported smaller and less expensive tags that for example could even be implemented as printed RFID embedded within an electronic ticket 2c (see the prior co-pending application FIGS. 1 and 2.) The co-pending application taught embedding the passive RFID in several wearable configurations including: 1) an electronic ticket 2c e.g. held in a lanyard, 2) extendable range data passive RFID configured into a wristband (similar to the Disney Magic band that implements active RFID,) or 3) extendable range data passive RFID configured into an anklet 16 (similar to passive chips worn on sneakers during road races.) The co-pending patent also taught that this RFID included a unique ID for identifying at least a unique "avatar identity" that the gamer 2s associates with themselves (and therefore the game system 48 never receives or tracks personal identity information of the gamer 2s,) where the gamer 2s using their smart phone and a special game/ "venue app" could then choose to provide additional personal information. What is most important to understand is that regardless of the mobile gaming device 60 or the type of electronic ticket 2c implementation, the present and co-pending applications specify multiple apparatus and methods for at least identifying a unique avatar representing a unique gamer 2s as that gamer enters the proximity, remains within, or exits the proximity of a game access point 30 such as 30-s, where also using a combination of technologies it was taught that the avatar identity could be tracked down to an individual ride seat of a given theme park ride, thus making that individual ride seat the equivalent of a game access point 30.

Still referring to FIG. 9A, after street sign 30-s (and generally any game access point 30) detects the proximity of the gamer 2s using any means herein described or prior taught in any of the co-pending applications, or any other means available in the marketplace, sign 30-s preferably communicates the gamer 2s (or avatar) unique identity to gaming system 48 along with a unique ID representing the specific access point 30-s. System 48 then logs the identified gamer's 2s (or avatars) identification information in association with the identified game access point 30-s and determines the type of access point 30-s and in particular what game functions may or may not be initiated for the gamer 2s based upon a multiplicity of datum, for example including but not limited to: 1) the gamer's identity and current game state including any of level, points, gear, time remaining, achievements, number of visits to the particular access point, etc. information, 2) the gamer's general persona or type, e.g. they are a troll, wizard, detective, warden, etc., 3) any of the one or more mobile gaming devices 60 also detected as present at the same game access point 30 (such as 30-s) that was already determined as associated with the given detected gamer 2s (see especially upcoming FIGS. 10D and 11,) 4) the access point 30's unique ID or general type (for example street sign, game toy dispenser, virtual booth, physical challenge, etc.), 5) the overall state of the game including all gamer's 2s, 6) local environment sensor information as would be collected for example by local environment sensing system 32 (see FIG. 2 as well as the prior related co-pending application,) or 7) game viewer/ audience feedback datum.

Still referring to FIG. 9A, system 48 might determine that game access point 30 is a mapping game access point 30-s where any gamer 2s may stop to request directions to another game access point 30 that they have chosen or to which they are being summoned by system 48. In this map output game access point 30-s use case, system 48 preferably communicates with uniquely identified magnifying glass 15-1, 15-2, 15-3 or 15-4 either directly or through access point 30-s. Regardless, magnifying glass 15-1, 15-2, 15-3 or 15-4 preferably receives a signal ultimately from gaming system 48 to turn on its mapping graphic 15-map, for example displaying 15-map via any of the graphic output means prior described for lens 15-l including active shutter LCD overlaid onto lens 15-lp-as or projector 15-lcd. As will be clear from a full reading of the present invention as well as the prior co-pending application entitled INTERACTIVE OBJECT TRACKING MIRROR-DISPLAY AND ENTERTAINMENT SYSTEM as it relates to eye glasses 14, other means are possible for causing magnifying glass 15-1, 15-2, 15-3 or 15-4 to indicate to the gamer 2s that a specific function such as "mapping" is now initiated, such as vibration (heptic) feedback or the flashing of LED lights 15-led, where then it should be understood that eye glasses 14 are also useable by gamer 2s for the herein taught mapping functionality in place of magnifying glass 15. In the implementation taught in the present FIG. 9A, once notified, gamer 2s preferably provides some positive indication that they would like to use the mapping function, for example by pressing button(s) 15-btn, or by touching lens 15-l that is further adapted to include touch input sensors, for which many well-known solutions are available. Once gamer 2s has preferably confirmed that a mapping mode should be turned on, or alternatively immediately initiated each time a magnifying glass 15-1, 15-2, 15-3 or 15-4 is detected in the proximity of a mapping access point like street sign 30s, glass 15-1, 15-2, 15-3 or 15-4 begins to automatically capture images 15-img for example at some frame rate between 10 to 30 frames per second.

Still referring to FIG. 9A, gamer 2s then holds their magnifying glass 15-1, 15-2, 15-3 or 15-4 so as to view their portable destination map 18. As gamer 2s looks through glass 15-1, 15-2, 15-3 or 15-4, images 15-img are being captured of some portion of map 18 and transmitted to object classification and identification sub-component 48-oci, where sub-component 48-oci may be executing on any one of, or any combination of: magnifying glass 15 (or eye glasses 14,) game access point 30 or interactive gaming system 48. Regardless of where images 15-img are being processed, those familiar with image processing will understand that map 18 comprises pre-known information that may be associated with any of the captured images 15-img. Once associated, gaming system 48 using the known identity of street sign 30s preferably transmits information to magnifying glass 15-1, 15-2, 15-3 or 15-4 to cause a "you are here" symbol 15-urh to be displayed on lens 15-l, essentially augmenting the gamer 2s's view of map 18.

Based upon the orientation of the map with respect to magnifying glass 15-1, 15-2, 15-3 or 15-4, as will be well understood by those familiar with image processing, gaming system 48 then preferably transmits information to magnifying glass 15-1, 15-2, 15-3 or 15-4 to cause a "game location symbol" **15-*loc* to be displayed on lens 15-*l*, where the symbol 15-*loc* is an access point 30 prior indicated by the gamer 2*s* or an access point 30 selected by the gaming system 48**.

Still referring to FIG. 9A, the present invention anticipates that maps 18 are printed with invisible ink registration marks **18-*irm*, where magnifying glasses 15-1, 15-2, 15-3 or 15-4 emit non-visible energy for illuminating the registration marks 18-*irm* in synchronization with capturing images 15-*img*. As those familiar with human visual perception will understand, if the emission of non-visible energy occurs over a short duration, for example $\frac{1}{30}^{th}$ of a second while the image 15-*img* is being captured, the gamer 2*s* is unlikely to perceive the illuminated registration marks 18-*irm*. As will be understood by those familiar with image processing, including registration marks 18-*irm* is highly useful as datum for the image processing tasks of recognizing the portion of map 18 captured by image 15-*img* as well as determining where on lens 15-*l* to display the various augmenting graphics such as 15-*urh* and 15-*loc*. The present invention also anticipates that the captured image 15-*img* of the map remains stored within magnifying glass 15-1, 15-2, 15-3 or 15-4 for a certain amount of time, or at least stored within system 100, such that the image 15-*img* is available to the gamer 2*s* for future reference, where the stored image 15-*img* is digitally altered to include any of the augmenting map symbols such as 18-*urh* and 18-*loc*. And finally, with respect to FIG. 9A, the present invention also anticipates that the map 18 is not a portable map, but rather a fixed map 18 on display within the physical destination as is often found, where otherwise the teachings of FIG. 9A** remain substantially identical.

Figures 9B, 9C, 9D, 9E:
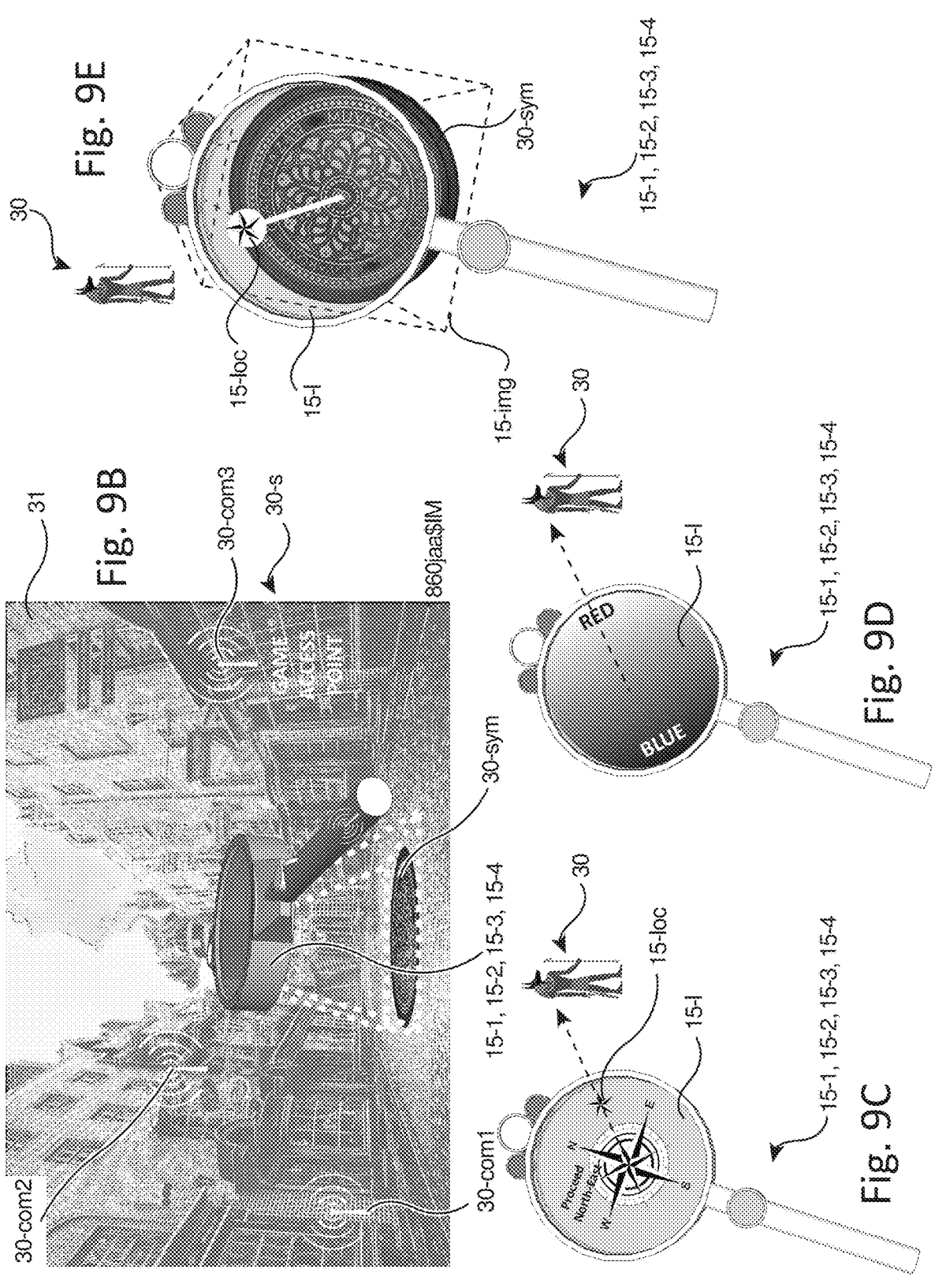
FIG. 9B is a perspective view depicting a scene 31 in a destination 4-*a*, 4-*b* where a gamer 2*s* holds magnifying glass 15-1, 15-2, 15-3 and 15-4 over some portion of the scene such as symbol 30-*sym* that is associated with a game access point 30-*s*, and where access point 30-*s* comprises a multiplicity of wireless communications devices 30-*com1*, 30-*com2* and 30-*com3*.
FIG. 9C is a perspective view of magnifying glass 15-1, 15-2, 15-3 and 15-4 that outputs a compass, text and next game access point location symbol 15-*loc* using lens 15-1, where the output is determined in part by the registration of the current view of magnifying glass 15-1, 15-2, 15-3 and 15-4 with respect to symbol 30-*sym*.
FIG. 9D is a perspective view of magnifying glass 15-1, 15-2, 15-3 and 15-4 that outputs gradient color image using lens 15-*l* to indicate the direction of a next game access point 20, where the output is determined in part by the registration of the current view of magnifying glass 15-1, 15-2, 15-3 and 15-4 with respect to symbol 30-*sym*.
FIG. 9E is a perspective view of magnifying glass 15-1, 15-2, 15-3 and 15-4 that outputs location symbol 15-*loc* augmenting the current view of destination game access point 30-*sym* as currently being viewed by gamer 2s, where the output is determined in part by the registration of the current view of magnifying glass 15-1, 15-2, 15-3 and 15-4 with respect to symbol 30-*sym*.

Referring next to FIG. 9B, there is shown a physical destination scene 31 wherein a gamer **2*s* (not shown) is standing and holding their magnifying glass 15-1, 15-2, 15-3 or 15-4 (depicted as larger than life-size) in order to view an access point symbol 30-*sym* for example a street sewer cap as depicted, or even the street sign such as 30-*s*. Unlike the anticipated fixed map 18, symbol 30-*sym* does not appear to be a map to the gamer 2*s* but rather appears decretive and coordinates with the destination's themes. Also shown are game access point communication devices 30-*com*1, 30-*com*2 and 30-*com*3. What is important to see is that an access point symbol 30-*sym* is a specific type of a destination object, where an image of the symbol 30-*sym* or object is pre-known to the system 100 and where at least in the case of destination objects used as access point symbols 30-*sym* the location of the symbol 30-*sym* is fixed and pre-known to the system 100 at least with respect to the pre-known locations of the game access points 30, such that by recognizing the object/symbol 30-*sym* the system 100 effectively knows the location of the gamer 2*s* and therefore, among other things, provide "mapping" directions to the gamer 2*s* or in some way engage the gamer 2*s***.

Referring next to both FIGS. 9B and 9C, lens **15-*l* of magnifying glass 15-1, 15-2, 15-3 or 15-4 is shown as depicting a compass through its UI elements including either an active shutter 15-*lp-as* or projector 15-*lcd*. Also depicted on lens 15-*l* for viewing by gamer 2*s* are example text directions ("proceed north-east") and game access point location symbol 15-*loc*. As will be well understood by those familiar with location based tracking systems and user interfaces, presenting the UI depicting in FIG. 9C to a gamer 2*s* requires information indicating: 1) at least a 2D description of the physical destination, 2) information indicating where the gamer 2*s* and their magnifying glass 15-1, 15-2, 15-3 or 15-4 are located within this 2D description, and 3) information related to the orientation of the magnifying glass 15-1, 15-2, 15-3 or 15-4 with respect to the 2D description. Based upon pre-knowledge of the 2D description, it is not necessary to have additional information on the bearings of north, south, east or west (for example from the earth's magnetic field) as this bearing information is inherent to the 2D description. As will be understood by those familiar smart phone technology, magnifying glasses 15-1, 15-2, 15-3 or 15-4 may be further adapted to include GPS technology as well as orientation sensors (see FIG. 5,) thus providing all of the necessary information for generating the depicted UI. However, GPS does not work as well indoors, where preferably the mapping functions presently described remain available. Furthermore, GPS technology increases the cost and complexity of the glasses 15-1, 15-2, 15-3 or 15-4**.

While this GPS and related technology is anticipated by the present invention and therefore remains within its scope, in terms of positioning systems, the present invention prefers using a wi-fi local positioning system (LPS) for example relying upon the multiplicity of game access point 30 communication devices **30-*com*, such as 30-*com*1, 30-*com*2 and 30-*com*3 depicted. Wi-fi local positioning systems are well known in the art, and for instance rely upon measuring the received signal strength of a transmitting devices such as glasses 15-1, 15-2, 15-3 or 15-4 in order to determine a distance between a given wi-fi access point such as 30-*com*1, 30-*com*2 and 30-*com*3 and the transmitting device. By using three or more access points, triangulation algorithms can be executed for locating at least the 2D coordinates of the transmitting device. Other methods are also well known including: fingerprinting, angle of arrival and time-of-flight. With respect to the depictions of FIG. 9C**, both GPS or a land based LPS system is acceptable for implementing the present invention.

Still referring to FIGS. 9B and 9C, rather than using either a GPS or LPS positioning system, the present inventor prefers using magnifying glasses 15-1, 15-2, 15-3 or 15-4 (or eye glasses 14,) to capture and analyze image **15-*img* of pre-known and fixed symbols such as 30-*sym*. As will be well understood by those familiar with destination design and layout, it is possible to create any number of unique symbols that can be placed throughout the destination 4-*a*, 4-*b* and calibrated to the known destination 2D description. These symbols can share a common look such that a gamer 2*s* learns quickly to recognize them as part of the gaming system for providing map information. Or, the symbols can be hidden and only revealed to the gamer as a part of the game. Regardless, once an image 15-*img* is captured of a symbol 30-*sym*, it is possible to match the symbol and its captured orientation to the set of all known symbols for the destination. Furthermore, if the symbol is pre-associated with a game access point 30, such as 30-*s*, then the ID of the access point 30-*s* is usable for automatically selecting the pre-known image of the symbol for comparison to the captured image 15-*img*. As will be well understood by those familiar with image processing systems, once the pre-known image is compared to the captured image 15-*img*, it is possible to both locate the gamer 2*s* and to determine the orientation of the magnifying glass 15-1, 15-2, 15-3 or 15-4 with respect to the symbol 30-*sym*** which itself is pre-related to the 2D destination description. Using this determined location and orientation, there is sufficient information for presenting the UI as shown in FIG. 9C on lens 15-1.

Referring next to FIGS. 9B and 9D, using the same determined location and orientation of magnifying glass 15-1, 15-2, 15-3 or 15-4 with respect the physical destination, regardless of the technique such as GPS, LPS or image processing, it is possible to present another user interface as depicted on lens 15-1 in FIG. 9D. In this alternative graphic display, some form of coloration is used to indicate to the gamer 2s that they are getting "closer" (e.g. using the color red to mean "warmer") or that they are getting "farther" (e.g. using the color blue to mean "cooler") with respect to the desired game access point 30 they are seeking or being directed to. (The present invention also anticipates that any of these mapping UIs such as depicted in FIG. 9D may be used to direct the gamer 2s to moving targets such as a destination personnel including a themed character associated with the destination 4-a, 4-b, or another gamer 2s, rather than just to fixed targets such as a game access point 30, where game access points 30 themselves could also be moving,) where for example at least the current location of a destination personnel can be tracked using either of GPS or LPS. The "warmer"/"cooler" interfaces matches the well-known children's game and is useful for increasing the difficulty of finding the moving target.

Referring next to 9e, another anticipated mapping UI is shown where the view of symbol 30-sym is registered and graphically augmented to indicate the location of a target such as game access point 30, where the registration of the image 15-img as well as subsequent placement of augmenting symbols such as 15-loc are exactly similar to the considerations with respect to a fixed or portable map 18 as discussed in relation to FIG. 9A.

Referring next to FIG. 10A, there is shown a gamer 2s with various wearables sufficient for identifying either the gamer 2s's persona type, avatar ID or even personal ID, were persona type represents a game character role as selected by gamer 2s such as a wizard, elf, spy, driver, etc., where the avatar ID is a unique identifier representative of the gamer's unique avatar such as wizard 945, or spy 1208, and where optionally associated with the avatar ID there is also associated personal identification information about gamer 2s such as their actual name, destination ticket number, age, sex, etc. As will be well understood by those familiar gaming systems, it is necessary that a gamer has a unique identity in order to accumulate game status such as points, gear, mastery levels, etc., such as an avatar ID, however it is also desirable that a gamer 2s be able to compete in a public gaming system without needing to provide personal information such as their actual name, destination ticket number, age, sex, etc. In the prior co-pending application, apparatus and methods were taught for allowing the purchaser of a destination access ticket to provide personal information as required for the purchase, but then to receive a unique tracking number from the destination 4-b for use within the destination 4-b that was not associated with their personal information, thus the tracking number that was electronically embedded into an RFID worn by the purchaser was trackable throughout the destination 4-b while it was not then also possible to know the actual identity of the purchaser by knowing the tracking number. Such an ID is herein referred to as an avatar ID. Various wearables were taught including RFID anklet 16, RFID wristband 16-wb, and electronic ticket 2c, where the RFID in each wearable was preferably passive and created from lower cost printed electronics, although existing apparatus and methods such as Disney World's Magic Band where also discussed, where the Magic Band uses active RFID and it is considered limited but suitable for the purposes of the present invention and therefore falls within the scope of the present teachings. Also shown is a destination sales point persona type sticker 4-stk that is made available to a gamer 2s or destination guest preferably as they enter a destination sales point 4-sp, where the persona type sticker 4-stk includes a unique symbol representative of any of the persona types associated with the gaming system 48, for example wizard, elf, spy, driver, etc.

Still referring to FIG. 10A, also depicted are two well-known detection data sets including exciter field 20-ef and camera image 55-img, where an exciter field 20-ef is emitted and processed by a wireless reader that is well-known in the art for remotely detecting the presence of a passive RFID, and where camera image 55-img is captured by camera 55 and then analyzed by any of a number of image processing apparatus and methods. What is most important to see is that the present invention supports identifying at least the avatar ID using any number of exciter fields 20-ef for example located at chokepoints where one or more gamer's 2s are expected to pass by, where the gamer 2s can wear the RFID in any number of forms at least including in an electronic ticket 2s, an anklet 16 or a wristband 16-wb, where the prior co-pending application showed the many benefits of using an anklet 16. It is further important to see that the present invention additionally supports using image processing including facial recognition of gamer 2s or facial-body recognition of gamer 2s, where in the prior co-pending application the combined use of RFID and image processing was specified, for example where the unique avatar ID of gamer 2s is first detected as the gamer 2s proceeds through an exciter field 20-ef that detects any of RFID wearables including 16, 15-wb or 2c after which the system recalls facial image or facial-body image data associated with the unique ID in order to confirm the gamer 2s (or their avatar,) all as prior taught. As prior taught in the co-pending application, the combination of RFID and camera detection offered some unique advantages for tracking the gamer 2s (or their avatar.)

Referring now to FIG. 10B, there is shown the foot of a gamer 2s wearing RFID anklet 16 (not to scale) as the gamer 2s proceeds into a destination sales point 4-sp. The first ideal chokepoint for detecting any of RFID wearables such as 16, 15-wb or 2c is the sales point 4-sp doorway as depicted that has been further adapted to include any of well-known RFID antenna and reader technologies for first emitting one or more exciter fields 20-ef and second receiving and processing the exciter field(s) 20-ef, all as will be well understood by those skilled in the art of RFID systems. As gamer 2s passes through an exciter field(s) 20-ef wearing some form of sufficient passive RFID such as in the form of anklet 16, wristband 15-wb or electronic ticket 2c, the well-known reader technology is sufficient for detecting the presence and unique signal of the RFID to a high degree of accuracy, where the unique signal is translatable into a digital identifier that has been prior related to the gamer 2s, or the gamer 2s's chosen avatar, all as prior taught in the co-pending application. Destination sales point 4-sp preferably further includes one or more cameras 55 for capturing images 55-img of unknown destination shoppers/gamers 2s as unknown shoppers/gamers 2s approach and then proceed through the RFID detecting chokepoint, such as store front door. As images 55-img are captured of one or more shopper/gamers 2s proceeding into a store chokepoint, as will be well understood by those familiar with image processing and especially identification of the human form, it is possible to isolate individuals even when there are multiple shopper/ gamers 2s that are essentially coming into and out of the storefront simultaneously and therefore also occluding each other. After isolating individuals, it is then also possible to associate with these yet unidentified isolated individual's various visual features including for example any of facial features or body features including clothing colors. What is important to understand by processing images 55-*img* it is possible to create a list of unknown shoppers/gamers 2s detected as proceeding into the sales point 4-*sp* through the front door, where each shopper/gamer 2s includes at least one detected visual feature, again for example clothing colors or facial details.

Still referring to FIG. 10B, also shown is sales point pressure sensing door mat 4-*sp-dm*, where pressure sensing materials including fabrics and plastics are a well-known and emerging technology that was discussed in the prior co-pending U.S. Non-Provisional application Ser. No. 16/055,078 for THEME PARK GAMIFICATION, GUEST TRACKING AND ACCESS CONTROL SYSTEM. In the co-pending application, several sources were identified for obtaining sufficient pressure sensing materials. Pressure sensing was shown to be possible using various core technologies, regardless of which it has also been shown in the marketplace that individual footprints 2s-*fs*-1 of shopper/ gamer 2s are detectable using pressure sensing for representation as digital pressure features, from which it is possible to perform 2D locating of the as of yet unknown shopper/gamer 2s with respect to the doormat 4-*sp-dm*. As will also be well understood by those familiar with imaging systems, by calibrating the fixed locations of the one or more cameras 55 with respect to the sales point 4-*sp* and therefore also the doormat 4-*sp-dm*, it is possible to further associate individual footstep pressure features with visual facial or body features of an unknown individual in the list of unknown shoppers/gamers 2s by correlating the calibrated locations of each type of pressure vs. visual feature data. As will also be appreciated, using two or more cameras 55 provides the opportunity to create 3D calculations of the identified facial or body features thus improving the correlation with the 2D pressure data from doormat 4-*sp-dm*.

Still referring to FIG. 10B, it is expected that unknown shopper/gamer 2s will eventually proceed through the sales point 4-*sp* front doorway and therefore also the exciter field(s) 20-*ef*. It is important to understand that no two-unknown shopper/gamers 2s will occupy the same space at the same time as they proceed through the exciter field(s) 20-*ef*. It is also important to understand that the exciter field(s) 20-*ef* may comprise multiple individual constricted exciter fields, wherein each of the multiple constricted fields is associable with some exclusive sub-portion of doormat 4-*sp-dm*, such that it is possible to detect individual RFIDs passing over narrower portions of doormat 4-*sp-dm*. The constricting of an exciter field 20-*ef* is dependent upon the desired expanse of the exciter field 20-*ef*, as is well-known in the art of antenna design, which is one of the key reasons why the prior co-pending application preferred the use of anklets 16 for holding the gamer's 2s RFID. Using anklets 16 vs. wristbands 15-*wb* or electronic tickets 2c provides an assurance that the RFID to be detected will generally be within 6 inches of the doormat 4-*sp-dm*, therefore allowing for the implementation of multiple, more highly constricted emitter fields 20-*ef* that sense perhaps only an area that is roughly half of the typical human body width. As those familiar with object tracking systems will understand, it is preferably that the tracking data has a resolution that is half or less of the size of the object being tracked, where in this case the object is a person. In any case, using the detected RFID information it is possible to begin to associate unknown shopper/gamer's 2s on the unknown shopper gamer list with a unique RFID and therefore at least unique avatar ID. It is also possible that an unknown shopper/gamer 2s is not a gamer 2s and therefore passes through the exciter field 20-*ef* without an RFID being detected. As those familiar with object tracking systems will further understand the determination and accuracy of the unknown shopper list is dependent upon several factor at least including: 1) the total number, positioning and image 55-*img* field-of-view overlap of the one or more cameras 55 with respect to the doormat 4s-*dm*, 2) the total number, positioning and exciter field 20-*ef* overlap of any one or more emitters of exciter fields 20-*ef* with respect to the doormat 4s-*dm*, and 3) the granularity of pressure feature data representative of footsteps 2s-*fs*-1.

Still referring to FIG. 10B, those familiar with object tracking systems will also recognize that it is possible to further adapt or rearrange the combination of RFID sensor 20-*ef*, image sensors 55 and pressure sensor 4s-*dm* to increase the determination and accuracy of the unknown shopper list, as well as the conversion of the unknown shopper list into a known gamer 2s list as RFID data is sufficiently detected and associated with an unknown shopper, or as an unknown shopper is conclusively determined not to be wearing an RFID. One example is to set up a second similar configuration just inside the sales point 4-*sp* doorway, thus continuing to video the unknown shoppers/ gamers 2s an detect their footsteps even after they pass through the first exciter field(s) 20-*ef*, at least up and through a point where they then pass through a second one or more exciter field(s) 20-*ef*. It is also possible that the exciter field(s) 20-*ef* are moved to a location that is at the front of the doormat 4-*sp-dm* where the unknown shopper/gamer 2s is first expected to make contact with the doormat 4-*sp-dm*, as opposed to the back of the doormat 4-*sp-dm* closest to the doorway as depicted in FIG. 10B. While moving the exciter field(s) 20-*ef* is possible, this has the added drawback of sensing an additional number of individuals who are simply passing by the sales point 4-*sp*, rather than walking into the sales point 4-*sp*.

Still referring to FIG. 10B, it is also possible that a partial list of unknown shoppers/gamers 2s that are known to be physically located within sales point 4-*sp* is further maintained past the original sales point 4-*sp* entrance/doorway, where these unknown individuals remain on this partial list until at some other location point and at some later time within the shop 4-*sp*, using any of the same types of sensor data including camera images 55-*img* from cameras 55 positioned within the sales point 4-*sp*, pressure data from floor sensors such as 4-*spf* positioned within the sales point 4-*sp*, and/or RFID data from exciter field(s) 20-*ef* positioned within the sales point 4-*sp*, any one or more of the unknown individuals on the partial list is either confirmed as a gamer 2s or a shopper (i.e. not a gamer 2s,) and therefore removed from the partial list of unknown shoppers detected to be within the sales point 4-*sp*.

Referring now to both FIG. 10A and FIG. 10B, the present invention anticipates that any shopper or gamer 2s coming within the sales point 2s may then also be given, pick up or otherwise obtain a sticker 4-*stk* to be placed ideally somewhere on their upper torso, where the sticker 4-*stk* has a sufficiently unique symbol that is at least relatable to a persona type, for example a wizard, elf, spy, driver, etc. As those familiar with image processing will understand, using any of one or more cameras 55 it is already well known and possible to detect individual shopper/gamers 2*s* as the walk about within a sales point 4-*sp*. What can be more challenging is to individually identify that shopper/gamer 2*s*, or at least identify gamer 2*s*'s persona type or avatar identity, for which the present and prior co-pending teaching has provided useful technology uniquely combining imaging, RFID and pressure sensing. By using one or more cameras 55 alone, and therefore with or without also the use of RFID or pressure sensors, it is still possible to locate individual human shapes, especially for example as they stand in front of a sales point shelf, stand, display, etc., where it is expected that the view of the individual human by at least one camera 55 will not be substantially occluded by other individual humans. As will be further understood, by using stickers 4-*stk* it is straightforward to locate the individual human and associate the persona type of the detected sticker 4-*stk* affixed on that human's upper torso, such that a computing system within the sales point 4-*sp* has persona type information at the same point in time when the associated individual human is standing in front an interior sales point such as a shelf, stand, display. Using this persona type information as determined by detecting sticker 4-*stk*, or the gamer ID as determined by any of the detecting means taught herein or in the related applications, the present invention anticipates creating any of multiple effects at, within, or upon the interior sales point such as a shelf, stand, display, where the any of multiple effects at least includes causing visual output, sound output, tactile output, motion output for example by causing an automated device to move, air pressure output or any form of sensory output noticeable or otherwise effecting the individual human. Regarding sticker 4-*stk*, it is also noted that a shopper who is not a gamer 2*s* may use the sticker 4-*stk* to be temporarily associated with a gamer 2*s* persona while within the sales point 4-*sp*, thus experiencing any of the prior stated multiple effects without actually playing in a game.

Referring next to FIG. 10C, the present inventor anticipates that sales points 4-*sp* are further adapted to include one or more game access points 30 within their premises, where the game access point 30 includes any of the herein taught apparatus and methods for a game access point especially including the use of a secret message output device 22, such as a projector 21-*p* (not depicted,) a mirror/display 20, or a secret message display 20-*d* that is the mirror/display 20 without a mirror component and without an object tracking component (all as prior taught in the co-pending application entitled INTERACTIVE OBJECT TRACKING MIRROR-DISPLAY AND ENTERTAINMENT SYSTEM.) Sales point 4-*sp* game access points 30 may also include any of actuated devices 50 and be selling or displaying any of mobile gaming devices 60. What is important to understand is that as the gamer 2*s*'s avatar identity is tracked within a given sales point 4-*sp*, it is possible to either: 1) create various of the multiple effects (without a game access point 30) as prior described simply to draw better attention to any one or more sales points 4-*sp* products or services, especially those relating to the persona type matching either a shopper or a gamer 2*s*, and 2) continuing the gamer 2*s*'s game experience using any of the game access point 30 teachings as herein provided.

For example, the upcoming FIG. 11 will show an automatic game toy dispenser 30-*gtd* for dispensing any one or more game toys such as sword 62-*swd*, where this automatic dispenser is for example behind a mirror/display 20 that includes an object tracking system camera 55 for detecting the trajectory of the tip of an article 12, such as wand being moved by a gamer 2*s*. It is anticipated in this example, that a gamer 2*s* has been directed to a particular sales point 4-*sp* by the gaming system 48 and is being given a chance to receive for example a surprise game toy such as sword 62-*swd* (see FIG. 11,) or any mobile gaming device 60 or destination product, where the gamer 2*s* must for example complete any one or more "spell" gestures before the automatic dispenser 30-*gtd* will then select a mobile gaming device 60 or at least some product for providing to the gamer 2*s*, where the selection algorithms executed by the automatic dispenser 30-*gtd* rely at least in part upon gaming information provided to the dispenser 30-*gtd* by the gaming system 48. Also depicted in FIG. 10C, any of additional exciter fields 20-*ef*, camera(s) 55 and floor sensors 4-*spf* may be placed around the game access point 30 for the purposes of identifying, confirming or tracking the movements the gamer 2*s*, where identification at least includes the gamer 2*s*'s avatar ID or persona type, where any of the determined information is communicated to the interactive game system 48, where system 48 then provides directives and feedback to at least the game access point 30 that determined the information, in any form as herein taught or will then also be obvious by a careful reading of the present invention, and where the game access point 30 within sales point 4-*sp* provides any of the gaming function herein described for example using any of secret message output devices 22 or actuated devices 50.

Referring next to FIG. 10D, there is shown interactive gaming system 48 providing any of game information to destination sale point 4-*sp*, where preferably any of game information includes the gamer 2*s*'s avatar ID or gamer ID that is at least indicative of an individual gamer's persona type, where for example the avatar or gamer ID is, or is equivalent to, an extended range readable tracking number such as taught in the prior co-pending U.S. Non-Provisional application Ser. No. 16/055,078 entitled THEME PARK GAMIFICATION, GUEST TRACKING AND ACCESS CONTROL SYSTEM (see FIG. 1, element 2*c*-3 of the co-pending application.) As prior taught, the extended range readable tracking number is implemented using a technology such as passive RFID that can be read by an RFID reader emitting an exciter field such as 20-*ef* (see FIGS. 10A, 10B and 10C,) where as is well known in the art, a passive RFID device may optionally include a writeable or re-writable memory that can for example be updated at some point in time after the RFID has been manufactured. This optional writeable or re-writable memory is also available for active RFID solutions like the technology used in the Disney Magic Band. The prior co-pending application further taught that the same tracking number that is associated with a gamer 2*s* as an avatar or gamer ID is embedded in a close-range readable device, such as a near-field communications (NFC) barcode implemented in printed electronics. What is important to understand is that multiple technologies exist for providing a remotely detectable avatar or gamer ID that either matches identification information pre-associated with a gamer 2*s*, or is further associable with this pre-associated information in a computer database, for example a database maintained by either gaming system 48, or by global eco-system 40 and then made available to system 48. The provided and remotely detectable avatar or gamer ID is preferably in a technology form that is easy for the gamer 2*s* to wear or otherwise carry about on their person while within a destination 4-*a* or 4-*b*, and also then interacting with a gaming system 48. Several implementations have been taught in both the present and co-pending applications includes electronic ticket 2*c*, anklet 16 and wristband 16-*wb*, where the implementations may be either or both close-range and extended-range readable, where close range is generally less than 6 inches and extended range is preferably up to 45 feet.

Still referring to FIG. 10D, what is desirable is that either the first tracking number associated with a gamer 2s's avatar or gamer ID, or some second tracking number associable in a database with the first tracking number, is embedded into any one or more mobile gaming devices 60 that are purchased by a given gamer 2s for use with respect to a game being provided by the presently taught game theater 100 or similar. One preferred solution for embedding either the first or second tracking number is to use a passive RFID, for example what is referred to as a micro-RFID, such as sold by Hitachi as a "ultra small package tag" USPT. While the read range of the micro-RFID is close range, it can be extended for example by the inclusion of an antenna. Other passive extended range RFID devices are also usable and are well-known in the art. Regardless of the technology chosen, the present teachings prefer using some form of a readable-writeable ID memory device such as a passive RFID 4-*rfid*, where the ID memory device is included with, attached to or embedded within the mobile gaming device 60, where mobile gaming devices include any of: a) an article 12 such as a wizard's wand that is a game toy for inputting gestures, motions, projections, or otherwise movement related data to gaming system 48, b) persona clothing 19 such as a scarf that is game clothing especially supporting a persona or game theme, c) game activity logging media 13 such as a game log book for indicating game access points 30 visited by the gamer 2s or otherwise recording gaming activities in a non-electronic format, d) secret message imaging devices such as eye glasses 14 and magnifying glass 15, e) a mobile device such as a smart phone running a game app, or e) any object usable in any manner with respect to a game being played by a gamer 2s using the interactive gaming system 48 and any one or more game access points 30.

Still referring to FIG. 10D, the present system then causes mobile gaming device 60 to be associated with gamer 2s preferably at the point-of-sale within sale point 4-*sp*. As is well-known in the art, a sales point 4-*sp* may include a read-write device capable of reading or writing the ID memory device such as a passive RFID 4-*rfid* included with, attached to or embedded within the mobile gaming device 60. This read-write device may either be self-operated by gamer 2s or operated by a sale agent of the sales point 4-*sp*. Using either the same read-write device, or some other electronic computing means, pre-known information regarding the gamer 2s is first determined and then used at least in part for providing information to the read-write device to be written onto the mobile gaming devices 60's ID memory device. The preferred pre-known gamer 2s information includes any of a unique ticket number or tracking number associated with the gamer 2s or the gamer 2s's chosen avatar, as prior taught in relation to the smart ticket 2 described in the co-pending application entitled THEME PARK GAMIFICATION, GUEST TRACKING AND ACCESS CONTROL SYSTEM. The pre-known gamer 2s information is preferably stored within a database maintained on either or both of gaming system 48 or global eco-system 40, where this stored pre-known gamer 2s information is electronically accessible at sales point 4-*sp*, for example accessible by a computing system controlling the read-write device capable of reading or writing to the ID memory device. It is also preferred that information sufficient of uniquely associating the mobile gaming device 60 being purchased by a gamer 2s is then written onto the ID memory device by read-write device at the point of sale, after which sale information such as the product type, produce number, manufacturer, sales point ID, salesperson, time of sale, etc. is preferably provided to either or both of systems 48 and 40 that are responsible for maintaining a database of gamer 2s related information. If the ID memory device is only capable or being read and not written to, it is preferred that the read-write device read a unique ID embedded within the ID memory device and provides this along with any other sales information for storage in the database including gamer 2s related information.

Still referring to FIG. 10D, at some future time after the sale of a mobile gaming device 60 to a gamer 2s, the gamer 2s is anticipated to use the device 60 at a game access point 30. Game access point 30 then uses gamer/device detection sub-component 30-*det* to automatically scan and detect gamer information pre-existing or written onto the ID memory device such as RFID 4-*rfid* included with, attached to or embedded within the mobile gaming device 60. After detecting this ID memory device information, access point 30 provides the information to gaming system 48, where system 48 at least in part uses this information to affect the gaming experience of gamer 2s. The detectable gamer information is also provided to object tracking 30-*ot* if the type of detected mobile device 60 is pre-known to be trackable by tracking system 30-*ot*, where tracking system 30-*ot* then tracks device 60 and provides this tracking information to gaming system 48, where system 48 at least in part uses this information to affect the gaming experience of gamer 2s. Upon receiving detected gamer information from an access point 30, gaming system 48 may also request any additional gamer information that is for example stored or maintained in a database outside of system 48, for example in global eco-system 40, where system 48 at least in part uses this additional gamer information to affect the gaming experience of gamer 2s.

And finally, with respect to FIG. 10D, it is possible that some mobile gaming devices 60 do not include an ID memory device such as RFID 4-*rfid*. For example, gamer 2s may already own products such as clothing 19 or article 12 that were made and purchased prior to or not specifically for use with the present invention 100. The present invention anticipates that these devices 60 that do not include an ID memory device such as RFID 4-*rfid* are still detectable using well-known image analysis algorithms as earlier discussed for analyzing captured images 15-*img* to classify or identify objects. The game access points 30 may therefore include any one or more object tracking cameras 30-*ot-cam* that are capable of capturing images of the gamer 2s and processing these images to classify or identify one or more products being worn or used by the gamer 2s, for example including persona clothing 19, articles 12, secret message imaging devices 14 or 15, or in general any of mobile gaming devices 60 whose images are pre-known to the object tracking system 30-*ot* specifically, or the gaming system 48 generally.

Referring next to FIG. 10E, as is well-known in the art of sale processing, it is typical to provide a purchaser with discounts based for example upon some information presented by the purchaser. The present invention anticipates that a gamer 2s is identifiable to a sales point 4-*sp* through any of several means taught herein or in the related applications, where after identification the sales point 4-*sp* communicates the identification information to either or both the gaming system 48 or the global eco-system 40 and receives back additional gamer information and/or suggested sales benefits, and where the sales point 4-*sp* provides some additional sales benefit to the gamer 2s based at least in part upon any of the additional gamer information or suggested sales benefits. The received additional gamer information for use in determining additional sales benefits includes any of: a) the state of the game with respect to gamer 2*s* including points accumulated, level's achieved, game access points visited, destination objects or symbols captured as images, current assignments, missions accomplished, etc., or b) the gamer 2*s*'s persona, avatar or personal (profile) identifying information, and additional benefits include any of: a) discounts or special pricing, b) special seating at restaurants or shows, c) shorter wait times through preferred access such as a theme park fast lane, d) unique products or services not generally available, e) custom performances or shows of attention at the sales point such as a themed character appearing to give the gamer their product, f) any benefit that is not normally available for some reason or at some price to a non-gamer, g) entrance into a lottery, or h) some special prize product or service that becomes available as a result of competition in an on-going or concluded game.

The sales point 4-*sp* preferably provides information regarding all sales such as products and services purchased to the interactive gaming system 40 or the gaming platform 10, where this sales information can be used as either an actionable game response or as a means of accumulating game rewards or benefits. For example, interactive gaming system 48 decide to enter the gamer into a lottery based upon any of the sales information, where the lottery may be to win a themed game toy or to be given access to a particular destination location or event. As those familiar with destinations will understand, there are virtually limitless number of ways to create incentives for a gamer tied to an on-going game and a destination, such that what is important is that the gaming system 100 maintains both the on-going game state of a gamer and information related to destination purchases and destination locations visited.

Still referring to FIG. 10E, also as is well-known in the art of sale processing, it is typical to provide a purchaser with a sales receipt recording a sales transaction, where often this sales receipt is printed, but may also be provided as an electronic receipt viewable on the purchaser's personal computing device such as a smart phone or tablet. The present invention anticipates that the receipt generating system used by a sales point 4-*sp* receives additional gamer information from either or both the gaming system 48 and global eco-system 40 prior to generating the sales receipt, where the receipt generating system then alters the generated receipt to include additional information at least in part based upon any of the additional gamer information, where the received additional gamer information includes any of: a) the state of the game with respect to gamer 2*s* including points accumulated, level's achieved, game access points visited, destination objects or symbols captured as images, current assignments, missions accomplished, etc., or b) the gamer 2*s*'s persona, avatar or personal (profile) identifying information, and where the additional information included on the generated sales receipt is any of: a) non-encoded information readable by the gamer 2*s* such as text, b) encoded information not readable by the gamer 2*s*, such as a bar code or QR code, and where the generated sales receipt is a printed receipt, c) non-visible information that is either non-encoded or encoded, where the non-visible information is for example printed onto the generated sales receipt using an invisible ink such as is generally available in the marketplace for use at least with ink-jet printers, and where non-visible information is then made visible when it is exposed to a non-visible energy such as ultra-violet light.

The present invention anticipates that the additional information included on the generated sales receipt is a part of the on-going game as being directed by the gaming system 48, and where: a) the additional information is directly useable by the gamer 2*s* as a clue, question, answer, directive, etc., b) the additional information may be captured as images 15-*img* using a secret message imaging device such as eye glasses 14 or magnifying glass 15 for use a gamer's actionable response, or c) if the additional information is non-visible it may be turned into visible information by being exposed to an appropriate non-visible energy such as ultra-violet light being output by using a secret message imaging device such as eye glasses 14 or magnifying glass 15, where the exposed information is then directly usable by the gamer 2*s* or may be captured in an image 15-*img* to be provided to gaming system 48 as the gamer's actionable response.

And finally, still referring to FIG. 10E, there is shown a gamer 2*s*'s game log book 13, where preferably a sales point 4-*sp* agent or machine stamps or prints visible or non-visible, encoded or non-encoded information onto the game log book 13, where this stamped information is then either directly usable by the gamer 2*s* or may be captured in an image 15-*img* to be provided to gaming system 48 as the gamer's actionable response. As will be well understood by those familiar with destinations such as theme parks, in addition to receiving a stamp for visiting a sales point 4-*sp*, it is ideal that gamer 2*s*'s may receive stamps or markings at any of the special interaction points associated with the destination 4-*a*, 4-*b*, and not necessarily associated with the game being directed by the gaming system 48, where these special interaction points can include themed characters that are walking about the destination and where for example the special interaction point such as a themed character stamps or signs the gamer 2's log book after also first receiving information about the gamer 2*s* by communication with the gaming system 48, where the information provided by the special interaction point such as a themed character to the log book 13 is based at least in part upon the received gamer information. For example, a themed character of a destination may be carrying a portable electronic device that allows the character to automatically detect the gamer 2*s* avatar ID, after which gamer information is then also automatically transmitted to the themed character's portable electronic device by either or both the interactive gaming system 48 or global eco system 40, and where the themed character after receiving the gamer information writes or stamps some message onto the gamer's log book 13 based at least in part upon the gamer information and useable as a gaming system clue, question, answer, directive, etc.

Referring next to FIG. 11, there is shown a game access point 30 that includes an actuated device 50 that is a game toy dispenser 30-*gtd* for dispensing any of toys or objects usable or in association with the game being played by a gamer 2*s*, especially including any of mobile gaming devices 60. As previously taught, using any of a number of technologies, as a gamer 2*s* approaches a game access point 30, access point 30 is able to automatically detect gamer 2*s* or a mobile device 60 being carried by gamer 2*s*. The any number of technologies especially include those technologies capable of reading extended range electronic data such as wi-fi, Bluetooth and RFID, where RFID is preferred because the solution has an option to use passive, or powerless means for representing the extended range data. As those familiar with passive UHF RFID will understand, the gamer 2*s* and/or the mobile gaming devices 60 carried by the gamer may include a passive RFID that is detectable by gamer/device detection 30-*det* using an RFID reader and antenna at distances up to and exceeding 45 feet. For mobile gaming devices 60 such as eye glasses 14 or the magnifying glass 15, it is desirable to embed a communications technology such as wi-fi or Bluetooth, especially as taught for eye glasses 14 in the prior co-pending application entitled INTERACTIVE OBJECT TRACKING MIRROR-DISPLAY AND ENTERTAINMENT SYSTEM. While the embedded communications technologies such as wi-fi or Bluetooth do require power in the form of a battery, they also enable the two-way communication of data including images such as 15-*img* herein described. In the case where the gamer 2*s* is using any mobile gaming device 60 such as glasses 14 or 15 that is adapted to include this powered form of communication, then gamer/device detection 30-*det* may also be equipped to automatically detect the proximity of the so equipped mobile gaming device 60, as will be well understood by those skilled in the art of those technologies especially as they apply to local positioning systems. Regardless of the detection apparatus and method, once a gamer 2*s* and/or one of the mobile gaming devices 60 that has been pre-associated with the gamer (see for example the teachings related to prior FIG. 10D,) the game access point 30 communicates the detected gamer information to gaming system 48.

Still referring to FIG. 11, gaming system 48 then transmits gamer information back to the game access point 30, where the game toy dispenser 30-*gtd* at least in part uses any of the transmitted game information to affect the selection or dispensing process of a game toy to the gamer 2*s*. For example, based upon the game information, gamer 2*s* might be required to input a spell using their wizard wand 12, where the trajectory of the tip of article 12 is tracked by the game access point object tracking system 30-*ot* that analyzes images captured by camera 30-*ot-cam*, and where the analysis of the trajectory of the tip of article 12 is interpretable as a spell or command, all as prior discussed especially in relation to the prior co-pending application entitled INTERACTIVE OBJECT TRACKING MIRROR-DISPLAY AND ENTERTAINMENT SYSTEM. In general, gamer 2*s* may be dispensed any game toy available in the dispenser under any condition that at least in part uses the transmitted gamer information, where conditions include: a) that the gamer 2*s* is identified as a specific persona that has achieved a certain amount of points or achievement level, b) that the gamer 2*s* has accomplished a specific task as assigned by the gaming system 48, where tasks include any set of actions, either mental or physical, required by the gamer 2*s* for example answering a question, or collecting stamps from destination locations proving that the gamer has attended the location, where the gamer 2*s* proves the attendance by taking a picture of the stamp for example using their eye glasses 14 or magnifying glass 15, c) that the gamer 2*s* has purchased some other product with a proof-of-purchase being an image of the sales receipt, or d) that the gamer 2*s* has been selected for any other reason to receive a toy, for example by winning a game lottery.

Still referring to FIG. 11, exactly like the teachings related to FIG. 10D, game toy dispenser 30-*gtd* preferably includes read-write apparatus for receiving gamer information for writing onto a memory ID device associated with the dispensed game toy, where for example the gamer information is the gamer 2*s*'s avatar ID and the memory device is a micro-RFID 4-*rfid* that is embedded into a game toy such as sword 62-*swd*. Read-write apparatus can additionally read information such as a unique product code from the memory ID device that is then automatically transmitted to either of the gaming system 48 or the global eco-system 40 for storage in a database in association with the gamer 2*s* ID. In any case, what is desirable is that the game toy that has been dispensed is automatically detectable at any game access point 30 and associable with the gamer 2*s* for which it was dispensed. Like the sale point 4-*sp* teachings described in relation to FIG. 10D, game toy dispenser system 30-*gtd* and/or game access point 30 including the dispenser 30-*gtd*, preferably provide additional transaction information such as date, time, product type, manufacturer's product number, etc. to be stored in association with the gamer 2*s* ID on either or both the gaming system 48 and the global eco-system 40. Access point 30 comprising dispenser 30-*gtd* optionally include sales receipt printing device for outputting sales receipts 4-*pr*1 or 4-*pr*2 as prior taught in relation to FIG. 10E. And finally, with respect to FIG. 11, game access point 30 including dispenser 30-*gtd* optionally includes a secret message output device 22 for outputting secret messages by the gaming system 48 that are relevant to the processes of selecting a toy for dispensing or otherwise directing the gamer 2*s*.

Referring next to FIG. 12, there is shown a game access point 30 including a secret message output device 22 such as projector 21-*p* for projecting a public image including a secret message image or video, for example of an orc that is positioned to interact with a gamer 2*s*. Like all game access points 30, gamer 2*s* is automatically detected when they enter the presence of the game access point 30. It is noted, that for any game access point 30, a gamer 2*s* may either have approached game access point 30 on their own initiative, or may have been summoned to game access point 30 by the gaming system. It is also noted that multiple gamers 2*s* might be approaching a game access point 30 at substantially the same time. The present invention has already taught specific means of limiting the display of the secret messages output by a device 22 to a select one or more gamers 2*s* from a multiplicity of gamers 2*s* detected to be present at the game access point 30, see especially co-pending U.S. Non-Provisional application Ser. No. 15/975, 236 entitled INTERACTIVE OBJECT TRACKING MIRROR-DISPLAY AND ENTERTAINMENT SYSTEM. The present invention anticipates using pressure sensitive flooring also as prior taught in relation to co-pending U.S. Non-Provisional application Ser. No. 16/055,078 THEME PARK GAMIFICATION, GUEST TRACKING AND ACCESS CONTROL SYSTEM such that the flooring area in front of a secret message display 22 might be for example marked off with a circle sufficient for a single gamer 2*s* to be present, or marked of with multiple circles. Using the pressure sensing flooring, the game access point 30 can detect the presence of a person, while then using other prior taught techniques such as causing LEDs to blink on eye glasses 14, the game access point may then use it embedded object tracking system 30-*ot* to decode the flashing LEDs confirming the identity of the gamer 2*s* wearing the glasses 14 (as prior taught in the co-pending application INTERACTIVE OBJECT TRACKING MIRROR-DISPLAY AND ENTERTAINMENT SYSTEM) that is standing within a pre-known and calibrated location such as a circle.

Still referring to FIG. 12, what is most important is that a gamer 2*s* is selected for live interaction with the game access point 30, where live interaction minimally includes: 1) the gamer 2*s* using a secret message imaging device such as eye glasses 14 sees a secret message video, 2) the gamer 2*s* articulates a game toy such as sword 62-*swd*, where the articulations are trackable using the object tracking system 30-*ot* associated with the game access point 30, for example the object tracking system 30-*ot* includes a camera for capturing images of the gamer 2*s* and game toy such as sword 62-*swd*, and where some portion of the game toy is tracked and interpreted as it is articulated (see especially the co-pending application INTERACTIVE OBJECT TRACKING MIRROR-DISPLAY AND ENTERTAINMENT SYSTEM,) and 3) the gaming system 48 or the access point 30 causes updates to the secret message at least in part based upon the game toy articulations. What is further desirable is that: 4) the updates to the secret messages made by the access point 30 in response to the articulations of the game toy such as 62-*swd* are further based at least in part upon any of the game information, for example including gamer 2*s* persona type, avatar ID, points accumulated, achievement level, age, sex, etc. and 5) that the articulated toy such as sword 62-*swd* is capable of actuating affects such as vibration or the output of light, and where at any point after the gamer 2*s* is detected by gamer/device detection 30-*det*, game access point 30 transmits signals using system communications 30-*com* to communications elements embedded with the game toy, where the transmitted signals are processed by a computing element within the game toy in order to start, alter or stop some game toy effect, such as vibration or the output of light.

Referring next to FIG. 13, there is shown a light gun 62-*gun* that is well known in the art for use as a video game controller for aiming and shooting in a video game. The functionality of the light gun includes a gamer 2*s* peering down the scope of the gun at a video screen with moving objects that are targets, where the targets and the surrounding scene as displayed on the video screen are viewable to the naked eye. The present invention further adapts the video screen to be a secret message output device 22 of any taught or anticipated configuration including a display 20 or projector 21-*p*. The present invention also further adapts the traditional light gun to include a secret video scope 15-6, thus becoming light gun 62-*gun*, where the video scope 15-6 is like other variations of magnifying glass 15 herein taught. What is most important is the scope 15-6 includes at least a polarizing lens such as 15-*lp* for transmitting only the secret message image(s) such that the gamer 2*s* is using gun 62-*gun* to shoot at images that cannot otherwise be seen by the naked eye. Optionally, scope 15-6 comprises 15-*lp-as*, where the polarizing lens is further adapted to include an active shutter, the benefits of which have been prior taught within, or where scope 15-6 comprises 15-*lp-as-md*, where the polarizing lens is further adapted to include both an active shutter and a modulator, the benefits of which have also been prior taught within. Using the teaching described in FIG. 13, a gamer 2*s* uses an adapted light gun 62-*gun* to see targets that are secret message images not otherwise perceivable to the naked eye, and then uses the light gun to shoot at these secret targets.

Referring next to FIG. 14, there is shown a game clue symbol 48-*sym* that has been visually divided into a minimum of 2 parts, specifically a symbol key 48-*sym-key* that is displayed on a secret message imaging device such as eye glasses 14 or magnifying glass 15 in response to directives from the gaming system 48, where the display is caused by any means taught herein or within the related co-pending applications, at least including the use of an active shutter layer over the polarization layer of a lens either in eye glasses 14 or magnifying glass 15, or the projection of an image C using an lcd projector such as 15-*lcd* taught in relation to FIG. 6 for use in magnifying glass 15, or the projection of an image in any form of a augmented reality device further adapted to eye glasses 14 as is well-known in the art. Alternatively, rather than gaming system 48 providing the image directly, or directives to provide the image of key 48-*sym-key* to the gamer 2*s* via their mobile gaming device, it is also anticipated that gamer 2*s* capture an image of markings found either specifically within a game access point 30 or otherwise upon or within any surface or object found within a destination 4-*a* or 4-*b*, where an object, or destination symbol, might include a painting, a page in a book, or markings on a wall or floor of the destination. What is important is that gamer 2*s* using their mobile gaming device such as 14 or 15 sees an image of key 48-*sym-key*. If captured by the gamer 2*s*, it is further anticipated that the captured image is transmitted to the gaming system 48, where the gaming system 48 uses the prior taught subcomponents including image clue processing 48-*icp* and object classification and identification 48-*oci* to first analyze the captured image to confirm for the gamer 2*s* that they have found a key to a secret symbol 48-*sym*, where the confirmation is provided to the gamer 2*s* preferably by using of any of the UI elements and teachings herein described for magnifying glass 15, or prior described for eye glasses 14 in the co-pending application.

Still referring to FIG. 14, gamer 2*s* then searches throughout the multiplicity of game access points 30 or through destinations 4-*a* or 4-*b* to find a matching lock symbol 48-*sym-lock*, which when properly aligned with key symbol(s) 48-*sym-key*, combine to form 48-*key-lock* that is substantially similar to secret symbol 48-*sym*. In order to determine if a gamer 2*s* has found the required lock 48-*sym-lock*, gamer 2*s* views the lock through their mobile gaming device such as 14 or 15, attempting to align the key 48-*sym-key* and the lock 48-*key-lock*, where once aligned the gamer 2*s* takes a picture of the lock 48-*sym-lock* that is transmitted to gaming system 48 along with the key 48-*sym-key* or related information currently displayed on the gamer 2*s*'s device 14 or 15. Gaming system 48 then uses image clue processing 48-*icp* and object classification and identification 48-*oci* to first analyze the captured lock image 48-*sym-lock* in combination with the currently display key image 48-*sym-key* to confirm for the gamer 2*s* that they have found a valid key and lock 48-*key-lock* representative of a secret symbol 48-*sym*. Once confirmed, gaming system 48 uses the confirmation as an actionable response from gamer 2*s*, where the confirmed key and lock 48-*key-lock* is used at least in part to effect any change in the gamer 2*s*'s gaming experience. The lock symbol 48-*sym-lock* may be visually apparent to the naked eye, or may be presented by a game access point 30 as a secret message. Where the lock symbol 48-*sym-lock* is visually apparent, a gamer 2*s* using their smart phone with an appropriate gaming app, may perform all the necessary steps herein described in relation to FIG. 14 for finding, viewing and using key(s) 48-*sym-key* to align with visible locks 48-*sym-lock* for creating valid key-lock combinations 48-*key-lock*. Anticipated responses by the gaming system 48 to the successful finding of a key-lock combination 48-*key-lock* by a gamer include unlocking an object such as a secret door into a room or a door on a safe, while any directive issued by the gaming system 48 at least in part based upon the finding of a key-lock combination 48-*key-lock* by a gamer is otherwise considered to be within the scope of the present invention.

Referring next to FIG. 15A, there is shown levitating device 63 that is an actuated device 50 capable of receiving controlling signals from a game access point 30, where the received controlling signals actuate device 63 causing the apparent effect of levitating an object such as reflective screen 21-*rsf*-2. Levitating devices 63 are well known in the art and typically comprise a base 63-*bse* with sufficient electronics for converting electrical power into a variable strength magnetic field 63-*mf*, where the magnetic field 63-*mf* causes the magnetic repulsion of a metal plate 63-*plt*, and where plate 63-*plt* is in some way connected to an object such as reflective screen 21-*rsf*-2 such that as plate 63-*plt* is repulsed and therefore levitates the connected object also levitates. It is also well known that the magnetic field is variable in such a way as to cause the metal plate 63-*plt* to spin about a vertical axis perpendicular to the horizontal floating plane of the plate 63-*plt*, with the visual effect of causing the connected object such as screen 21-*rsf*-2 to spin. Preferably, controlling signals for levitating device 63 are based at least in part upon any combination of: a) game information related to a gamer 2*s* detected to be within the proximity of base 63-*bse*, or b) mobile gaming device 60 movements, for example the movements of an article 12 as determined by object tracking system 30-*ot* using camera 30-*ot-cam* as preferably caused by a gamer 2*s* detected to be within the proximity of base 63-*bse*.

Referring now to FIGS. 15A and 15B, game access point 30 uses any of sensing technologies such as herein described or as described in any of the co-pending applications to detect the proximity of either or both a gamer 2*s* or any of mobile gaming devices 60 such as article 12, eye glasses 14 or sword 62-*swd*. Also, as prior taught, once a gamer 2*s* or a mobile gaming device 60 is detected by game access point 30, detected gamer 2*s* and device 60 information is preferably communicated to gaming system 48, whereupon gaming system 48 provides to game access point 30 game information for directing an interaction with gamer 2*s* in accordance with the current game datum as maintained by system 48. Game access point 30 at least in part uses the game information communicated by system 48 for directing an interaction with gamer 2*s* to actuate any of a secret message output device 22 or an actuated device 50. Regarding the configuration of the game access point 30 as depicted in the present FIGS. 15A and 15B, preferably game access point 30 controls actuated device 50 that is a levitating device 63 for levitating a spherically shaped reflective screen 21-*rsf*-2 and further comprises both a secret message output device 22 and an object tracking system 30-*ot*. Secret message output device 22 preferably comprises one or more projectors such as 21-*p*-1 and 21-*p*-2 for projecting secret message images A and complimentary image B as herein taught in especially in relation to FIGS. 3 and 4, where images A and B are projected onto and reflect off of spherically shaped reflecting screen 21-*rsf*-2, where the composition of reflecting screen of 21-*rsf*-2 is metallic versus non-metallic paint for reflecting images A and B while minimally effecting the polarization of either image, all as is well known in the art especially as it relates to movie theater screens for displaying 3D movies. As prior discussed herein, the reflected A and B images will be perceived by the naked eye as a public image, whereas a gamer 2*s* viewing the spherically shaped reflective screen 21-*rsf*-2 will substantially perceive only secret message image(s) A.

Still referring to FIGS. 15A and 15B, game access point 30 as depicted further comprises object tracking system 30-*ot* for tracking the movements of any mobile gaming device 60, such as article 12 a wizard's wand being moved about my gamer 2*s*. Especially as prior taught in the co-pending application entitled INTERACTIVE OBJECT TRACKING MIRROR-DISPLAY AND ENTERTAIN-MENT SYSTEM for inclusion with mirror/display 20, object tracking system 30-*ot* for tracking article 12 preferably includes camera 30-*ot-cam* for capturing images of article 12 as it is moved and determining from these images at least the trajectory of the tip of article 12, where the determined trajectories are interpretable as controlling signals. As those familiar with entertainment and gaming systems will understand, while it is preferred that game access point 30 further includes object tracking system 30-*ot* for determining controlling signals based upon article 12 movements, where article 12 movement based controlling signals are used at least in part in combination with game information to determine the actuation of levitating device 63, where the actuation includes the levitating movement up and down, and/or spinning of reflective sphere 21-*rsf*-2, the determination and inclusion of device 60 such as article 12 movement based control signals is optional and should therefore be considered as exemplary, rather than a limitation of the present invention. As will also be clear to the careful reader, its is possible to apply the present teachings to any number of physical objects and not just for example reflective sphere 21-*rsf*-2, where for example another object could be a mock feather including magnetic material that appears to be levitated based upon the gamer's tracked article 12 movements.

Still referring to FIGS. 15A and 15B, there is shown the preferred use of two or more secret message projectors 21-*p*-1 and 21-*p*-2. As will be well understood by those familiar with the operation of 3D projection systems especially as used in a movie theater, by using two projectors 21-*p*-1 and 21-*p*-2 it is possible to create a 3D secret messages A, where the complementary image B can be chosen such that the resulting public image 21-*img* is either in 2D or 3D. What is important to see is that a 3D effect is creating by causing the gamer 2*s*'s left eye to receive a "left" scene image while at substantially the same time the gamer 2*s*'s right eye is receiving a "right" scene image. For this effect, it is necessary for gamer 2*s* to be viewing a reflective screen 21-*rsf* or 21-*rsf*-2 using eye glasses 14 rather than magnifying glass 15, since eye glasses 14 provide separate control over the transmission of images into the gamer 2*s*'s left eye vs. right eye. As will also be well understood by those familiar with 3D imaging systems and as taught in the prior co-pending application INTERACTIVE OBJECT TRACKING MIRROR-DISPLAY AND ENTERTAIN-MENT SYSTEM with respect to glasses 14, glasses 14 are further adapted to include an active shutter layer such that it is possible to control the actuation of the active shutters in each left and right lens of glasses 14 so as to block or transmit temporally alternating projected left and right scene images, all of which is well-known in the art as a means for creating the perception of 3D for a viewer such as gamer 2*s*.

Still referring to FIG. 15B, the present invention teaches a new means for interacting with left and right projected scene secret images A for the perception of a gamer 2*s* that the scene is three dimensional. Specifically, glasses 14 and all of the variants as taught in the co-pending prior application may be further adapted to include a second modulator 15-*md* as taught herein in relation to FIG. 5C. In FIGS. 5A and 5B, lens 15-*lp-as* comprising a combination of a polarizer layer, such as either a linear or circular polarizer, and an active shutter layer, was shown to always transmit through the polarizer layer only selected polarized rays from a secret message image A, and by controllably actuating the active shutter layer, the secret message image A was blocked or transmitted in coordination with the projection of the image A by projectors 21-*p*. This same combination of functionality was taught in the prior co-pending application with respect to eye glasses 14. What was additionally taught in FIG. 5C was that lens 15-*lp-as* was further adapted to include an electronically controllable second modulator 15-*md* thus forming new lens 15-*ls-as-md*, where each of left and right lens of prior taught eye glasses 14 are herein taught to be further adapted as well.

The purpose and use of the second modulator layer 15-*md* is to controllably alter the polarization orientation of the light rays incoming into the lens 15-*lp-as-md*, such that by altering the polarization orientation of the incoming rays, it is possible to cause the rays to be either transmitted or blocked by polarizer 15-*lp*. As will be well understood by those familiar with linear polarizers and light modulators, by adapting eye glasses 14 to include a second modulator, it is possible to modulate either the rays coming into the left or right lens of glasses 14 such that the linear polarization angle of the rays are effectively rotated by 90 degrees, where the so rotated rays will then be orthogonal to the underlying linear polarizer layer and as such will be substantially block from transmission to the wearer of glasses 14 such as gamer 2*s*. The net effect is that glasses 14 are electronically adjustable for switching between left and right lenses with identical transmission of incoming light rays based upon the polarization angle of the incident rays, to left and right lenses with orthogonal transmission of incoming light rays based upon the polarization angle of the incident rays, where identical transmission supports simultaneous viewing of a 2D projected image scene and orthogonal transmission supports simultaneous viewing of a 3D projected left and right eye scenes. Simultaneous viewing of 3D left and right images is an alternative to the alternating viewing of left and right image as afforded by the alternating actuating of left and right active shutters, all as is well known in the art and as prior described.

Still referring to FIG. 15B, when projecting images onto a non-flat surface it is preferred that the secret message output device 22 comprising one or more projectors such as 21-*p*-1 and 21-*p*-2 implement a well-known method referred to as either projection mapping, spatial augmented reality or video mapping, where instead of projecting on a flat screen, light is mapped onto any shape surface, turning common objects of any 3D shape into interactive displays. More formally, projection mapping is the display of an image on a non-flat or non-white surface and is herein preferred so that the gamer 2*s* has the perception that the secret image being viewed is being spherically emitted from the reflecting surface 21-*rsf*-2. The use of projection mapping is considered to be herein incorporated into any of the anticipated or possible uses of projectors 21-*p*, whether projecting onto a spherical ball or the façade of a building. The present invention offers the unique ability to use projection mapping on a non-flat or non-white surface to create for example a static public image while at the same time create a dynamically moving secret image A, whereas the projected secret image A changes, the complimentary image B is sufficiently altered such that the combination of images A and B provides a static public image, all was will be well understood by those skilled in the art of projection systems and by a careful reading of the present invention.

CONCLUSION AND RAMIFICATIONS

Thus, the reader will see that the present game theater provides for a physical-virtual gaming system with many benefits to destinations such as theme and amusement parks, museums, resorts, casinos, airports, universities, etc. The overall benefits include a physical-virtual gaming system that draws the gamer throughout the destination while integrating tightly with the destination's existing themes, encouraging the gamer to visit specific destination locations, to purchase destination products and services, and to other-wise more deeply engage with the destination. The physical-virtual games are meant to be short interactions intermittently mixed with the gamer's total experience, where the interactions are physically spread throughout the destination. Unlike a traditional gaming system such as a computer or gaming console, gamers are required to move about to multiple game access points, sometimes choosing the next access point and other times being summoned. Unlike AR games played using for example a smart phone, the gamer is more deeply immersed as the game content includes real-world objects as opposed to real-world objects with overlaid "augmented" digital information. The real-world objects, as game access points, can output game content, where the game content can be seen by the naked eye, or can only be seen as a secret message through a secret message imaging device. In the present physical-virtual gaming system gamers are automatically identified and tracked, including determining which destination products and services they have purchased and/or are wearing, where this information leads to more fun as gamers engage the destinations themes to advance in the physical-virtual game.

The herein described game access points can provide differing gamer experiences at any time to any gamer playing in any of multiple possible games, where even a single gamer may receive a different experience during a subsequent interaction with a same game access point, where indeed the game can be "never ending" and the gamer's current game state is tracked indefinitely, even beyond the normal destination physical and time of access boundaries. Therefore, the physical-virtual gaming system can extend across multiple destination visits and even multiple destinations, where for example the destinations are a group of museums and the game continues as a gamer visits a different museum.

The present invention teaches significant apparatus and methods and presents only some of the many possible example uses of the present game theater. Many more uses are possible as will be apparent from a careful reading of the present and related co-pending applications. In general, unlike a movie theater with a single larger screen that involves the viewer with a single storyline, a game theater distributes the single screen as a multiplicity of screens strategically located throughout the destination. The game theater screens comprise the secret message output displays as prior taught by the present inventor, and as further taught herein especially in relation to projector systems. Also, unlike a movie theater, in the presently taught game theater, viewers move about to the various screens in either a self-directed or game directed sequence, and in this regard, they are autonomously traversing the character storyline. As they physically traverse the storyline throughout the destination, viewers also become doers as they stop at game access points comprising any type and kind of physical props and devices and engage in physical and mental challenges. For example, the gamer might be presented with an actuated device that is a look-a-like bomb that must be defused with 60 seconds or the gamer is "blown up," where successes increase game points and peer recognition and failures do the opposite. In another example, one or more gamers who may or may not know each other are inside of a room that is crafted to look like the bridge of the USS Enterprise from Star Trek, and they must together negotiate with a Klingon war lord or be destroyed. The Klingon war load could be an animation being displayed on a screen and responding using and AI system, or it could be an actor being videoed in another studio who is listening to the gamer(s) and responding accordingly.

The results of each gamer's interaction with these various game access points is used to provide scoring, indications of mastery of levels, player health, etc., all similar to today's video games. By using displays and projectors capable of providing secret messages to the gamers, each gamer partakes upon an individualized quest while at the same time public images are presented that continue to be appropriate for the existing destination that has been gamified using the concepts herein and prior taught.

Another significant benefit of the present teachings is the integration of the physical-virtual gaming system with the destinations guest services, where for example gamers use a mobile gaming device comprising a camera to image objects or symbols located throughout the destination that serve to give the gamer a "you are here" registration with respect to the destination. Using the same mobile gaming device, the system can provide information to the gamer directly related to the game, such as finding another game access point, or generally related to the destination but not specifically the game, for example finding a destination service or facility or even determining walking time between the present gamer location and some other desired game or non-game related destination location. Game destination locations are not just interactive game access points but can also be any of destination game parts including objects or symbols located throughout the destination, where an object is any physical structure of any size or form and a symbol is any marking on any object.

This functionality allows a destination to pre-establish a significant list of themed objects and symbols for creating a seek-and-find element to a physical-virtual game, where in one example gamers solve riddles to help locate an object or symbol and in other cases they use a mobile gaming device such as the herein described magnifying glass or their smart phone and game app to receive "warmer"/"colder" general direction hints for locating the object or symbol. This in turn provides a significant opportunity for the system to assist the destination in the leveling of crowd flow throughout the destination as gamers are summoned to specific destination locations or otherwise encouraged to explore different areas of the destination based upon current crowd sizes. Especially for theme parks, it is typical that themed characters are walking about the destination and that gamers would like to find these characters. Using the present system, it is possible to track the location of the themed characters as a moving target and then direct a gamer to the themed character, where for example once the gamer finds the character they take a selfie image using a mobile game device comprising a camera and the selfie image is usable as a gamer's actionable game response. Like objects and symbols, a moving target such as a themed character then also becomes a game part, or part of the game.

In another advantage of the present system, especially when used at a theme park including additional locations such as resorts and resort rooms, the system can learn various gamer information including for example their competency with respect to an aspect of a game, such as making gestures with wand or answering theme-based questions. Using this learned gamer information, the system can suggest training options to a gamer for practicing when the theme park is either closed or whenever the gamer prefers. Training options can include practicing spells using a wand and an interactive mirror-display or watching themed content on a display that will be useful for the gamer to answer questions or solve challenges with respect to the game. It is also possible for the system to arrange social gatherings for example at a destination restaurant at a certain time, where the invited gamers share important qualities such as a game persona, level of achievement or current state in the game.

In yet another example of the uses and benefits of the present game theater, it is possible to incentivize gamers to achieve a certain level of mastery or accomplishments in the physical-virtual destination game, where the gamers are competing with other gamers and the results are provided through for example the gaming system's social media platform or public displays located throughout the destination. In this contest, one or more winners may be announced that are invited to a public location such as a shop where they are given a physical challenge to perform, such as casting a certain difficult spell using their wand or interacting with a physical interface such as a mock nuclear control panel where the gamer must press the right button sequence to stop the nuclear explosion in a limited amount of time. If they succeed in the physical challenge they are immediately rewarded, where for example a box opens and inside is a highly sought-after toy relevant to the game. Other physical challenges can simply be available all the time for any gamer to take on, where in one example there is a sword being magnetically held with a certain amount of force in a mock rock, and the gamer attempts to raise the sword a certain distance out of the rock, the distance of which is tracked by the system on a leader board, where a threshold distance wins a prize or some advantage in the physical-virtual game. Another physical challenge would be a spell caster display located in a ride line at a theme park, where as gamers are waiting in line they can cast a spell as prompted by the system. Over time, as the gamer goes through more ride lines they can build up spell points and value in the physical-virtual game, also providing a distraction for the longer ride lines.

As a careful reader will see, the present invention and the related applications provide many apparatus and methods, some of which are novel and useful by themselves or in various combinations, as will be obvious to those skilled in the various arts. Those skilled in the various arts herein described will also understand that newer implementation of technology will become available for providing the same functions as herein described for any given apparatus. As such, the present invention and all its preferred and alternative embodiments should be considered both as apparatus and as functions that are exemplary and not limitations of the present invention. Furthermore, the present invention has uses well beyond theme and amusement parks, museums, resorts, casinos, airports, universities, etc. including: sporting and music venues, convention centers, retirement communities, air ports and even secure office buildings.

While only certain features of the invention have been illustrated and described herein, many modifications and changes will occur to those skilled in the art. It is, therefore, to be understood that the appended claims are intended to cover all such modifications and changes as fall within the true spirit of the invention.

We claim:

1. An interactive gaming system for tracking, directing, and otherwise guiding a gamer-guest throughout a destination to any of a multiplicity of game parts each for providing at least one guest experience to the gamer-guest while participating in a destination game, comprising: gamer-guest identification means being caried or worn by the gamer-guest within the destination while participating in the destination game and comprising any of electronically or optically detectable gamer-guest identity data; a mobile gaming device comprising computing and communication means, where the mobile gaming device is carried by the gamer-guest while participating in the destination game, where the mobile gaming device is in communications with the interactive gaming system, and where the mobile gaming device comprises a display; a multiplicity of game parts distributed across different locations throughout the destination, where each game part provides or otherwise comprises at least one of the game experiences, where each game part comprises or otherwise uses gamer-guest presence detection means for either electronically or optically detecting the gamer-guest identity data when the gamer-guest identification means is in the presence of the each game part, where the electronic presence detection means comprise any of global positioning systems, location positioning systems, or otherwise wireless communication means comprising any one of or any combination of RFID, Bluetooth, and Wi-Fi for use in detecting any electronically detectable gamer-guest identity data, where the optical presence detection means comprise any of image sensors for use in detecting any optically detectable gamer-guest identity data, where the presence is a sufficient proximity for the gamer-guest identity data to be either of electronically or optically sensed by the detection means, and where the each game part communicates the gamer-guest identity data to the interactive gaming system in combination or otherwise associated with game part identity data, and the interactive gaming system comprising: game part location data comprising descriptions of the different destination locations associated with identity data for identifying the each game part; gamer-guest experience tracking data comprising information regarding the detected presence of the gamer-guest identification means at any of the multiplicity of game parts; game directives data comprising any one of or any combination of game rules, game tasks, game clues, and game part experience content, and where: the interactive gaming system either receives a request for directions to a next game part from the mobile gaming device as indicated by the gamer-guest or selects a next game part to be visited by the gamer-guest using at least in part any one of or any combination of the gamer-guest identity data, the gamer-guest experience tracking data, the game directives data, gamer-guest game responses received from the mobile gaming device, tracked game part information, and pre-known game part information, where tracked game part information comprises any one of or any combination of the current location of the specific game part, the number of gamer-guests or non-gamer-guests scheduled to be present, present, or estimated present at the specific game part, where pre-known game part information comprises access or otherwise availability times of the specific game part, the environment type of the specific game part including indoors or outdoors, the gamer profile of the specific game part comprising age ranges, languages spoken or available, or interest types, and where the interactive gaming system using at least in part the next game part identity data and the next game part location data determines and communicates any of directional information to the mobile gaming device for directing the gamer-guest to the next game part, and where the mobile gaming device provides visual direction indications to the gamer-guest using at least in part the mobile gaming device display and based at least in part upon any of the directional information.

2. The system of claim 1 where the mobile gaming device comprises a display for emitting images representing a current view of the gamer-guest and where either or both (1) the mobile gaming device is further adapted to comprise a camera for capturing the representing images, and (2) the mobile gaming device emitting display is further adapted to be or otherwise function as a direct-view display through which the gamer-guest looks directly to see the current view, where the further adapted mobile gaming device (1) and (2) allows the gamer-guest to see a current view of a current game part, where the direct-view display is substantially transparent over at least some duration of operational time and over at least some spatial portion of the display allowing the gamer-guest to directly see the current view of the current game part by looking through the direct-view display, where the mobile gaming device (2) comprises either a single-lens direct-view display for hand-held use or dual-lens direct-view display to be worn as glasses, where the mobile gaming device (1) and (2) provides one or more visual augmentations to the current view of the current game part using the emitting display or the direct-view display and oriented to the current view of the current game part, and where the one or more visual augmentations are directional indications based at least in part upon the directional information provided by the interactive gaming system.

3. The system of claim 2 where the current game part comprises one or more non-visible marks, where the mobile gaming device is further adapted to emit energy causing the non-visible marks to either or both become detectable by the camera or visible to the gamer-guest while looking through the direct-view display.

4. The system of claim 2 where the current game part is a portable map carried by the gamer-guest, where the gamer-guest uses the mobile gaming device to see a current view of the portable map, and where the one or more visual augmentations are oriented to the current view of the portable map.

5. The system of claim 4 where the presence and identity of the gamer-guest is detected at a reference game part, where the reference game part communicates the gamer-guest identity data to the interactive gaming system in combination or otherwise associated with reference game part identity data, where the interactive gaming system at least in part uses the reference game part identity data and the game part location data to determine the destination location of the reference game part, where the interactive gaming system selects the next game part and determines the directional information for directing the gamer-guest substantially from the reference game part to the selected next game part based at least in part upon the reference destination location and the next game part destination location, where the interactive gaming system communicates the directional information to the mobile gaming device, and where either of:

the gamer-guest uses the mobile device to determine a current view of the reference game part and the visual direction indications are oriented with respect to the reference game part, or the gamer-guest uses the mobile device to determine a current view of the portable map and the visual direction indications are oriented with respect to the portable map.

6. The system of claim 2 wherein:

the mobile gaming device is at least further adapted to comprise the camera;

the multiplicity of game parts further comprises one or more image-identifiable game parts;

the game part location data further comprises one or more pre-known images in relation to each of the one or more image-identifiable game parts, and where the gamer-guest uses the mobile gaming device to capture one or more images of an image-identifiable game part for communication to the interactive gaming system, where the interactive gaming system determines the game part identity data of the image-identifiable game part based at least in part upon a comparison of the one or more captured images with the one or more pre-known images, and where the interactive gaming system uses the game part identity data for any one of or any combination of (i) determining a current location of the gamer-guest as being the destination location of the image-identified game part, (ii) determining the next game part to which the gamer-guest is directed, and (iii) updating the gamer-guest experience tracking data.

7. The system of claim 1 wherein: the gamer-guest identity data is indicative of or otherwise at least in part used to determine or be associated with themed persona information for use by the interactive gaming system in any one of or any combination of (i) determining at least one experience to be received by or otherwise provided to the gamer-guest when interacting with at least one game part, (ii) selecting at least one next game part to which the gamer-guest is subsequently provided the direction indications, and (iii) updating the gamer-guest experience tracking data, where the themed persona information is associated with one or more themed merchandise worn or carried by the gamer-guest when entering or moving about within the destination, where the themed merchandise comprises any one of or any combination of clothing, passive articles, and active mobile gaming devices, where the themed merchandise comprises electronically detectible merchandise identity data or is otherwise visually indicative of the merchandise identity data, where the merchandise identity data comprises, is indicative of, or at least in part is used to determine or otherwise update any one of or any combination of the themed persona information and the gamer-guest experience tracking data, and where one or more of the multiplicity of game parts further comprises a merchandise identity data detection zone, where the detection zone comprises any one of or any combination of electronic communication means and one or more cameras, where the gamer-guest enters or otherwise passes through the detection zone wherein either or both the electronic communication means scans the themed merchandise for determining the electronically detectible merchandize identity data and the one or more cameras capture one or more images of the gamer-guest for image processing to determine the visually indicative merchandize identity data, where any one of or any combination of the one or more game parts comprising the detection zone and the interactive gaming system determines the themed persona information relating to the gamer-guest based at least in part upon the merchandise identity data.

8. The system of claim 1 wherein the display of the mobile gaming device comprises a direct-view system for transmitting light directly from the scene through the display to the eyes of the gamer-guest without substantially refracting or transducing the light, and where the mobile gaming device comprises the form of either a single-lens direct view system for handheld use or a dual-lens direct view system to be worn as glasses.

9. The system of claim 1 further comprising:

a secret message output device for emitting visible light comprising a secret message, where the secret message is substantially not visible to the naked eye, where the secret message output device is either of a display or a projector;

a secret message viewing device comprising either a single lens or a dual lens for filtering the emitted visible light to reveal the secret message, and wherein:

at least one game part of the multiplicity of game parts is a secret message game part comprising a secret message output device, and at least gamer-guest views the emitted visible light using the secret message viewing device to visually perceive the secret message.

10. The system of claim 9 wherein the mobile gaming device is further adapted to be the secret message imaging device, where the either single lens or dual lens comprise an active filtering component for controllably allowing the gamer-guest to perceive or not perceive the secret message based at least in part upon a control signal provided to the mobile gaming device by any of the secret message output device, the secret message game part, or the interactive gaming system, where the further adapted mobile gaming device is constructed in the form of a single-lens spy glass or a dual-lens glasses and optionally comprises the gamer-guest identification means.

11. The system of claim 1 wherein the mobile gaming device comprises the gamer-guest identification means or otherwise comprises either or both of the gamer-guest identity data or mobile gaming device identity data, where the mobile gaming device identity data is prior associated by the interactive gaming system with the gamer-guest identity data, and where the gamer-guest carries the mobile gaming device while within the destination for interfacing with the multiplicity of game parts and identifying the gamer-guest.

12. The system of claim 1 wherein each game part of the multiplicity of game parts is either of a fixed game part with a non-changing game part location or a moving game part with a changing game part location, where the each moving game part comprises electronic communication means, and where the system 1 further comprises:

a game part tracking system comprising wireless tracking means for remotely communicating with the electronic communication means of the each moving game part to determine, maintain, and otherwise update the game part location data related to the each moving game part with a current game part destination location.

13. The system of claim 1 wherein one or more game parts of the multiplicity of game parts comprises a multiplicity of individual unique locations into which the gamer-guest is seated, standing, or otherwise situated while substantially receiving the at least one of the game experiences, where the gamer-guest presence detection means of the one or more game parts are further adapted to determine the individual unique location at which the gamer-guest is presently seated, standing, or otherwise situated for providing to the interactive gaming system as gamer-guest experience tracking data, and where based at least in part upon the individual unique location the interactive gaming system performs any one of or any combination of (i) selecting, altering, or otherwise providing a customized game experience to the gamer-guest, and (ii) updating the gamer-guest experience tracking data.

14. The system of claim 1 further comprising:

an article carried by the gamer-guest for use in gesticulating game commands;

one or more article tracking zones where the gamer-guest is situated while gesticulating with the article, where each of the one or more article tracking zones comprise electronic sensing and detection means for determining gamer-guest article inputs comprising gestures and otherwise any of movement paths and orientations of the article, and where gamer-guest enters a given article tracking zone and gesticulates one or more article inputs, where any one of or any combination of the given article tracking zone, a given game part, or the interactive gaming system determines one or more gamer-guest game commands or otherwise game responses using at least in part the gamer-guest article inputs, and where based at least in part upon the one or more of the gamer-guest game commands or otherwise the game responses the interactive gaming system performs any one of or any combination of (i) determining the next game part to which the gamer-guest is directed, (ii) selecting, altering, or otherwise providing a customized game experience to the gamer-guest, and (iii) updating the gamer-guest experience tracking data.

15. The system of claim 14 wherein at least one game part is further adapted to comprise a game-reward dispensing system optionally comprising the given article tracking zone, where the game-reward dispensing system dispenses at least one object of a multiplicity of possible objects to a gamer-guest detected as being present at the game-reward dispensing game part, and where the determination of the at least one dispensed object is based at least in part upon any one of or any combination of (i) the gamer-guest identity data, (ii) the game part location data, (iii) the gamer-guest experience tracking data, (iv) the game directives data, and (v) one or more of the gamer-guest game commands or otherwise game responses or the article inputs.

16. An interactive gaming system for tracking, directing, and otherwise guiding a gamer-guest throughout a destination to any of a multiplicity of game parts each for providing at least one guest experience to the gamer-guest while participating in a destination game, comprising: a mobile gaming device comprising computing and communication means, electronically detectable device-gamer identity data, a camera for capturing one or more images of a current view of the destination, and a display for allowing the gamer-guest to see the current view of the destination; a multiplicity of game parts distributed across different locations throughout the destination, where each game part provides or otherwise comprises at least one of the game experiences; game part location data comprising descriptions of the different destination locations associated with identity data for identifying the each game part and one or more pre-known images of the each game part; game directives data comprising any one of or any combination of game rules, game tasks, game clues, and game part experience content; game state data for relating the device-gamer identity data with gameplay data, where the gameplay data comprises any one of or any combination of game responses provided by the gamer-guest, indications of game tasks completed by the gamer-guest, indications of game parts visited by or otherwise game experiences received by the gamer-guest, and where: (1) the gamer-guest uses the mobile gaming device to capture one or more images of a current game part for transmission to the interactive gaming system in combination with or otherwise for association with the device-gamer identity data; (2) the interactive gaming system determines the destination location of the current game part by at least in part comparing the one or more current images and with the one or more pre-known images comprising the game part location data; (3) the interactive gaming system selects a next game part for providing the next game experience to the gamer-guest using at least in part any one of or any combination of the device-gamer identity data, the game directives data, and the game state data; (4) the interactive gaming system determines next game part directional information based at least in part upon the destination location associated with the current game part and the destination location associated with the selected next game part, and (5) the interactive gaming system summons the gamer-guest to the selected next game part by communicating any of the directional information to the mobile gaming device for directing the gamer-guest to the selected next game part, and where the mobile gaming device provides visual direction indications to the gamer-guest using at least in part the mobile gaming device display and based at least in part upon any of the directional information.

17. The system of claim 16 wherein one or more of the multiplicity of game parts are further adapted to comprise electronic gamer-guest presence detection means for detecting the device-gamer identity data when the mobile gaming device is in the presence of each of the one or more game parts, where the presence is a sufficient proximity to or otherwise detectable engagement with the each game part, where the each game part communicates the device-gamer identity data to the interactive gaming system in combination or otherwise associated with the game part identity data, further comprising: gamer-guest experience tracking data comprising information regarding the presence of the mobile gaming device at any of the multiplicity of game parts, where the presence is determined by any one of or any combination of using the one or more current images of (2), and using the device-gamer identity as detected by the electronic gamer-guest presence detection means of the game part, and where the selection of the next game part is based upon any one of or any combination of the device-gamer identity data, the game directives data, the game state data, and the gamer-guest experience tracking data.

18. The system of claim 17 further comprising:
one or more themed merchandise worn or carried by the gamer-guest when entering or moving about within the destination, where the themed merchandise comprises any one of or any combination of clothing, passive articles, and active mobile gaming devices, where the themed merchandise comprises electronically detectible merchandise identity data or is otherwise visually indicative of the merchandise identity data, where the merchandise identity data comprises, is indicative of, or at least in part is used to determine or otherwise update any one of or any combination of gamer-guest themed persona information, the gamer-guest experience tracking data, and the current game state data for use by the interactive gaming system, and
wherein the electronic gamer-guest presence detection means comprises any one of or any combination of electronic communication means and one or more cameras forming a merchandise identity data detection zone, where the gamer-guest enters or otherwise passes through the detection zone wherein either or both the electronic communication means scans the gamer-guest for determining the electronically detectible merchandize identity data and the one or more cameras capture one or more images of the gamer-guest for image processing to determine the visually indicative merchandize identity data, whereafter any one of or any combination of the one or more game parts comprising the detection zone and the interactive gaming system determines any of gamer-guest related information sufficient for determining the current gamer-guest themed persona, where the gamer-guest related information comprises any one of or any combination of the device-gamer identity data and the merchandise identity data.

19. The system of claim 17 where the mobile device display is a direct-view display for substantially allowing the gamer-guest to see the current view of the destination by looking directly through the direct-view display, where the direct-view display is substantially transparent over at least some duration of operational time and over at least some spatial portion of the display allowing the gamer-guest to directly see the current view of the current game part by looking through the direct-view display, where the mobile gaming device provides one or more visual augmentations using the display and oriented to the current view of the current game part, where the one or more visual augmentations are directional indications based at least in part upon the directional information provided by the interactive gaming system, and where the current game part is any of a fixed game part with a non-changing game part location, a moving game part with a changing game part location, or a portable game part comprising a map of at least some portion of the destination.

20. The system of claim 19 where the moving game part comprises electronic communication means, further comprising:

a game part tracking system comprising wireless tracking means for remotely communicating with the electronic communication means of the each moving game part to determine, maintain, and otherwise update the game part location data related to the each moving game part with a current game part destination location, and where any of the fixed or moving game parts comprises either or both:

a multiplicity of individual unique locations into which the gamer-guest is seated, standing, or otherwise situated while substantially receiving the at least one of the game experiences, where the electronic gamer-guest presence detection means are further adapted to determine the individual unique location at which the gamer-guest is presently seated, standing, or otherwise situated for providing to the interactive gaming system as gamer-guest experience tracking data, and where based at least in part upon the individual unique location of the gamer-guest the interactive gaming system performs any one of or any combination of selecting, altering, or otherwise providing a customized game experience to the gamer-guest, and updating the game state data, and a secret message output device for emitting public light comprising a private secret message, where the private secret message is substantially not visible to the naked eye, where the direct-view display of the mobile gaming device is further adapted to controllably filter the emitted public light for revealing the private secret message based at least in part upon a secret message control signal provided by either of the game part or the interactive gaming system, where the interactive gaming system determines the control signal for enabling the direct-view display to reveal the private secret message based at least in part upon any one of or any combination of the device-gamer identity data, the game directives data, the game state data, the gamer-guest experience tracking data, and the individual unique location.

\* \* \* \* \*